(12) United States Patent
Irie et al.

(10) Patent No.: US 8,158,039 B2
(45) Date of Patent: Apr. 17, 2012

(54) METHOD FOR PRODUCING OPTICAL FILM

(75) Inventors: Yasushi Irie, Inagi (JP); Koichi Saito, Kawagoe (JP); Kenzo Kasahara, Hachioji (JP)

(73) Assignee: Konica Minolta Opto Inc., Tokyo (JP)

( * ) Notice: Subject to any disclaimer, the term of this patent is extended or adjusted under 35 U.S.C. 154(b) by 362 days.

(21) Appl. No.: 11/974,545

(22) Filed: Oct. 15, 2007

(65) Prior Publication Data
US 2008/0122128 A1    May 29, 2008

(30) Foreign Application Priority Data

Nov. 25, 2006   (JP) .................... 2006-317875

(51) Int. Cl.
*B29D 11/00* (2006.01)
*B29D 7/00* (2006.01)
*C09K 15/32* (2006.01)

(52) U.S. Cl. ....... 264/1.6; 264/1.1; 264/217; 252/400.2; 106/139.1; 106/162.7; 106/162.71

(58) Field of Classification Search .......... None
See application file for complete search history.

(56) References Cited

U.S. PATENT DOCUMENTS

| | | | | |
|---|---|---|---|---|
| 2,622,026 A | * | 12/1952 | Hunter et al. | 430/519 |
| 2,931,802 A | * | 4/1960 | Touey et al. | 536/119 |
| 3,313,639 A | * | 4/1967 | Davis et al. | 106/162.7 |
| 2006/0202366 A1 | * | 9/2006 | Murakami et al. | 264/1.7 |

FOREIGN PATENT DOCUMENTS

| JP | A 2000-352620 | | 12/2000 |
|---|---|---|---|
| JP | A 2003-270442 | | 9/2003 |
| WO | WO 9205213 A | * | 4/1992 |

OTHER PUBLICATIONS

I Bauer, W. D. Habicher, S. Korner, S. Al-Malaika, Antioxidant interaction between organic phosphites and hindered amine light stabilizers: effects during photoxidation of polypropylene—II, Polymer Degradation and Stability, vol. 55, Issue 2, 1997, pp. 217-224.*
JP 2000-352620 A (translation).*

\* cited by examiner

*Primary Examiner* — Christina Johnson
*Assistant Examiner* — Benjamin Schiffman
(74) *Attorney, Agent, or Firm* — Holtz, Holtz, Goodman & Chick, PC

(57) ABSTRACT

A method for producing an optical film is disclosed. A cellulose ester, a sugar ester prepared by esterification of a sugar compound formed by 1 to 12 of structures selected by a furanose structure and a pyranose structure and an acryl type polymer having a weight average molecular weight of from 5,000 to 30,000 are subjected to melt-casting.

14 Claims, 5 Drawing Sheets

METHOD FOR PRODUCING OPTICAL FILM

This application is based on Japanese Patent Application No. 2006-317875 filed on Nov. 25, 2006, in Japanese Patent Office, the entire content of which is hereby incorporated by reference.

FIELD OF THE INVENTION

The invention relates to a production method of an optical film, and in detail to a production method of a cellulose ester film useful for polarization plate protection film or retardation film to be used in a crystal liquid displaying apparatus.

BACKGROUND OF THE INVENTION

Cellulose ester film is used in a liquid crystal displaying apparatus as a polarization plate protection film or a retardation film.

A melting production method using thermally melted cellulose ester is investigated for inhibiting the increasing of consumption of solvent accompanied with rapid raising of the demand of the film though the cellulose ester film is usually produced by a solution casting method.

In the melt-casting film formation, the melted cellulose ester having high viscosity is caste onto a cooling drum through a die; therefore the leveling of the cellulose ester is made insufficient and a problem such as that the fluctuation of the retardation tends to be caused and the optical property is inferior to that of the film produced by the solution cast method (cf. Patent Publications 1, 2 and 3).

Moreover, the cellulose ester film produced by melt-casting film forming method is large in variation of the retardation depending on the humidity variation and the bad influence of such the phenomenon is appeared as ununiformity of the image contrast when the film is used as the polarization plate protection film.

Patent Publication 1: WO92/05213
Patent Publication 2: JP-A 2000-352620
Patent Publication 3: JP-A 2003-270442

DISCLOSURE OF THE INVENTION

An object of the invention is to provide a method for producing a film which is sufficient in the leveling so as to be small in the fluctuation of retardation and in the variation depending on the humidity variation even when the cellulose ester optical film is produced by the melt-casting film formation method.

In one of the embodiment of this invention the method of preparing an optical film comprises steps of preparing a mixture of components, preparing a film by melt-cast method, and drying the film, wherein the component comprises; a cellulose ester, a sugar ester compound formed by esterification of a sugar compound composed of 1 to 12 structures selected from a furanose structure and a pyranose structure, and an acryl resin.

In the other embodiment of this invention an optical film is produced by a melt-casting method using a cellulose ester, a sugar ester compound formed by esterification of a sugar compound composed of one to twelve of structure selected from a furanose structure and a pyranose structure and an acryl type polymer having a weight average molecular weight of from 500 to 30,000.

A film can be obtained by the invention which is small in the fluctuation of retardation and in variation depending on the humidity since leveling is suitably carried out even when the film is produced by the melt-casting method.

THE PREFERABLE EMBODIMENT OF THE INVENTION

Figure 1:
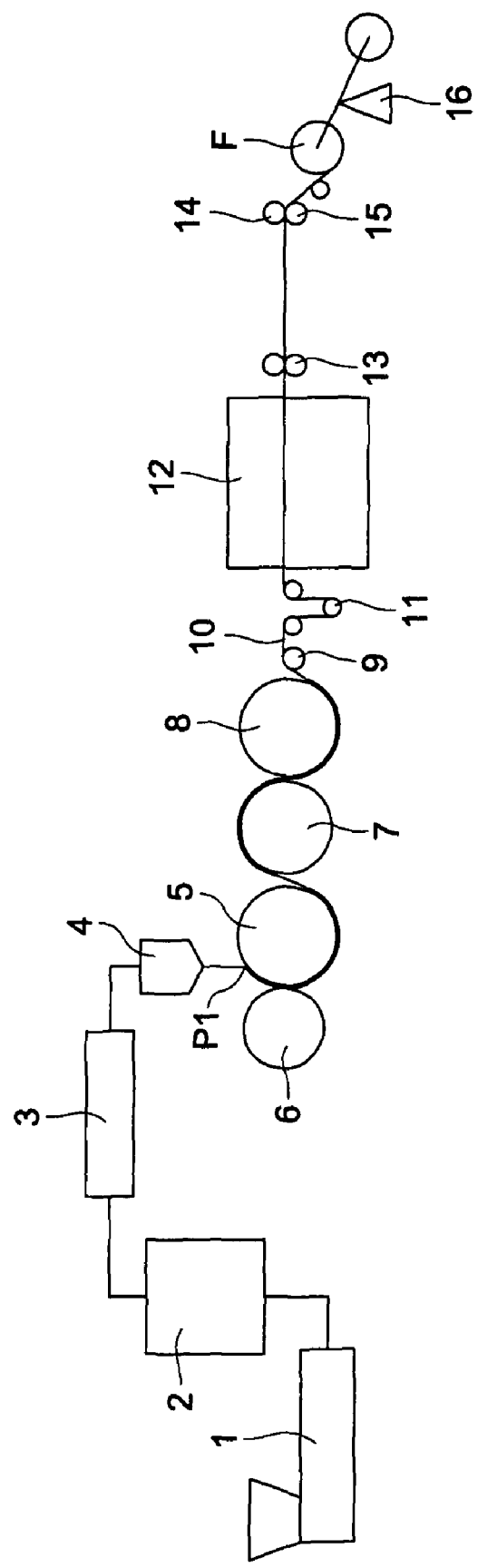
FIG. 1 shows a schematic flow sheet of an embodiment of the equipment for embodying the polarization plate protection film production method of the invention.

The preferable embodiment of the invention is described below.

The optical film prepared by this invention contains cellulose ester, a sugar ester compound, acrylic resin and other additive as necessity. The composition containing those compounds is melt and cast to prepare the optical film (cellulose ester film). The raw material of the cellulose ester film is described.

<Cellulose Ester>

The cellulose ester to be used in the invention is a carboxylate having about 2 to 22 carbon atoms which may be an aromatic carboxylate and a lower fatty acid ester is particularly preferred though the cellulose ester is not specifically limited.

The lower carboxylic acid in the lower carboxylate of cellulose is a fatty acid having six or less carbon atoms. The acyl group bonding with the hydroxyl group may have a linear-chain or a branched chain, and may form a ring. The acyl group may have another substituent.

An acyl group having 2 to 6 carbon atoms is preferably selected because the large number of the carbon atoms causes lowering in the double refractivity when the substitution degree is the same.

Cellulose ester preferable according to the invention is one simultaneously satisfying the following formulas A1 and A2.

$$2.0 \leq X+Y \leq 3.0 \quad \text{A1}$$

$$0.3 \leq Y \leq 3.0 \quad \text{A2}$$

In the above formulas X is a substitution degree of acetyl group and Y is that of propionyl group or butyryl group.

Among the above, triacetyl cellulose and cellulose acetate propionate are preferably used, and cellulose acetate propionate is particularly preferable. It is preferable that $2.4 \leq X+Y \leq 3.0$, and $0.7 \leq Y \leq 2.0$, and further $1.0 \leq Y \leq 1.5$ is preferable. The substitution degree of the acyl group can be measured according to ASTM-D817-96.

It is preferable that $1.0 \leq X \leq 2.5$, $0.1 \leq Y \leq 1.5$ and $2.0 \leq X+Y \leq 3.0$ in the cellulose acetate propionate in the other embodiment.

The number average molecular weight of the cellulose ester to be used in the invention is preferably from 60,000 to 300,000 since the mechanical strength of the obtained film is strong. One having a molecular weight of from 70,000 to 20,000 is more preferably used.

The number average molecular weight of the cellulose ester can be measured as follows.

The measurement is carried out by a high-performance liquid chromatography under the following conditions.

Solvent: Acetone
Column: MPW×1 (manufactured by Tosoh Corp.)
Concentration of sample: 0.2 (w/v) %
Flowing rate: 1.0 ml/minute
Injection amount of sample: 300 µl
Reference sample: Standard polystyrene
Temperature: 23° C.

Cotton linter, wood pulp and kenaf can be cited as the raw material of cellulose though the raw material is not specifically limited. Cellulose esters obtained from these raw materials can be combined in an optional ratio for use.

The cellulose ester relating to the invention is produced by a reaction using an organic acid such as acetic acid, an organic solvent such as methylene chloride and a proton catalyst such as sulfuric acid when the acylation agent is an acid anhydride such as acetic anhydride, propionic anhydride and butyric anhydride.

When the acylation agent is an acid chloride, the reaction is carried out by using a basic compound such as an amine is used for the catalyst. Concretely, the cellulose ester can be synthesized referring the method described in JP-A 10-45804.

A primary hydroxyl group having high reactivity exists at 6-position, different from 2- and 3-position, of the glucose unit constituting the cellulose ester, and the primary hydroxyl group is preferentially forms sulfuric ester.

Therefore, the average substitution degree at the 2- and 3-position of the glucose unit can be made higher than that at the 6-position by increasing the amount of sulfuric acid of catalyst in the course of esterification reaction.

Furthermore, the hydroxyl group at the 6-position of the glucose unit can be selectively protected by tritylation of cellulose; therefore, the average substitution degree of the 2- and 3-position of the glucose can be made higher that that at the 6-position by protecting the hydroxyl group at the 6-position by tritylation and then releasing the trityl group (Protective group) after esterification. In concrete, the cellulose ester prepared by the method described in JP-A 2005-281645 can be also preferably used.

Moreover, it is preferable that the synthesized cellulose ester is preferably subjected to a purification treatment for removing low molecular weight ingredients or to filtration for removing non- or low-acetylated ingredients.

The mixed acid cellulose ester can be obtained by the method described in JP-A 10-45894.

The cellulose ester influenced by a slight amount of metal contained in the cellulose ester. It can be considered that the metal is related to water used in the production process, and a substance capable of forming nuclei preferably does not exist. An ion of metal such as iron, calcium and magnesium is preferably little since such the ion forms an insoluble material sometimes by forming a salt together with a polymer decomposition product possibly containing an organic acid group.

<Sugar Ester Compound>

The sugar ester compound used in this invention is formed by esterifying the hydroxyl group of a sugar compound formed by bonding 1 to 12 structures at least one selected from a furanose structure and a pyranose structure. It is preferred that the sugar compound is composed of 1 to 3 furanose structure and/or a pyranose structure.

Glucose, galactose, mannose, fructose, xylose, arabinose, lactose, sucrose, cellobiose, cellotriose, maltotriose and raffinose can be cited as the sugar compound of the invention; and one having both of the furanose structure and the pyranose structure is particularly preferable. An example of that is sucrose.

The sugar ester compound used in this invention is one in which a part or entire of the hydroxyl groups of the sugar compound are esterified or a mixture thereof.

Mono-carboxylic acid to be used for synthesizing the sugar ester compound used in this is not specifically limited and the sugar ester compound to be used in the invention can be synthesized by esterifying the sugar compound by a known aliphatic mono-carboxylic acid, an alicyclic mono-carboxylic acid or an aromatic mono-carboxylic acid. The carboxylic acid may be used singly or in combination of two or more kinds of them.

Examples of preferable aliphatic mono-carboxylic acid include an saturated fatty acid such as acetic acid, propionic acid, butyric acid, isobutyric acid, valeric acid, enanthic acid, caprylic acid, paregoric acid, a capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid, and a unsaturated fatty acid such as undecylic acid, oleic acid, sorbic acid, linolic acid, linolenic acid, arachidonic acid and octenic acid.

Preferable examples of the alicyclic mono-carboxylic acid include cyclopentene carboxylic acid, cyclohexane carboxylic acid, cyclooctane carboxylic acid and a derivative of them.

Examples of preferable aromatic mono-carboxylic acid include an aromatic mono-carboxylic acid formed by introducing one to five substituents to the benzene ring of benzoic acid such as benzoic acid and toluic acid, an aromatic mono-carboxylic acid having two or more benzene ring such as cinnamic acid, benzilic acid, biphenyl carboxylic acid, naphthalene carboxylic acid and a derivative of them. Benzoic acid is particularly preferable.

For producing these compound can be performed referring JP-A 62-42996 and JP-A 10-237084.

The sugar ester compound can be used in a ratio of from 0.5 to 35%, preferably from 1 to 30%, by weight of the cellulose ester.

Concrete examples of the sugar ester of the invention are shown below.

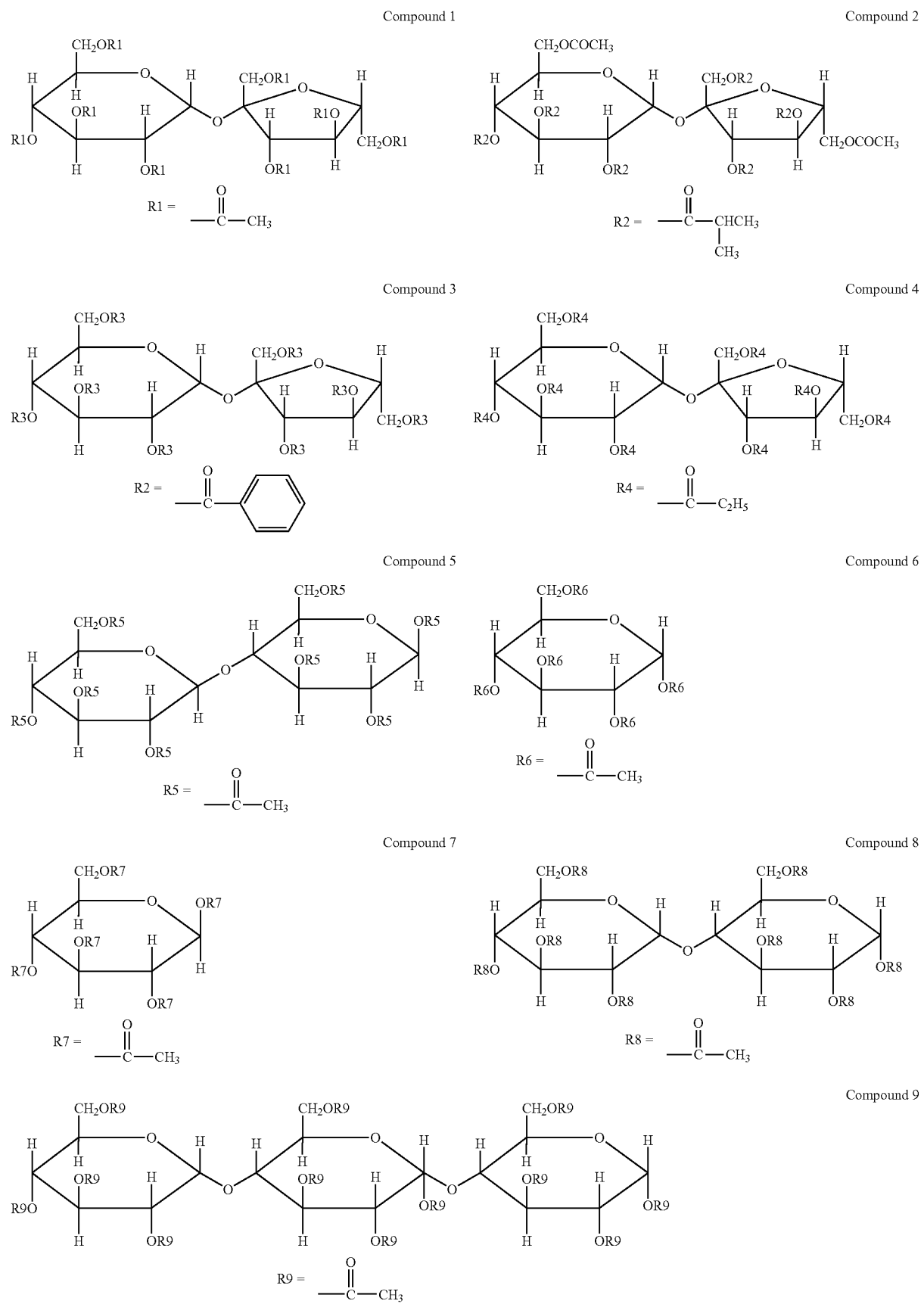

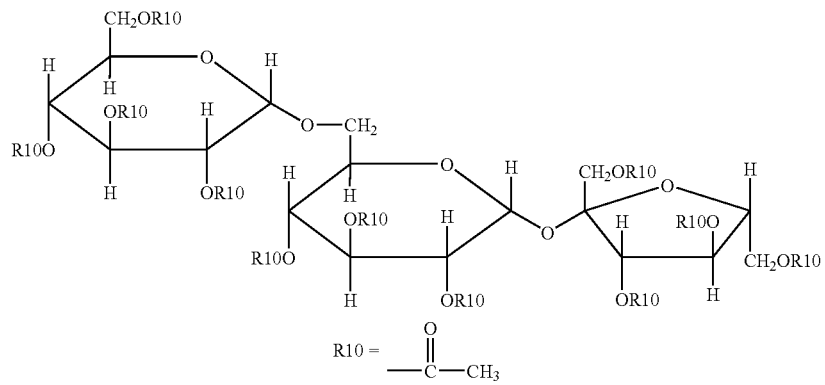

Compound 10

<Acrylic Resin>

A weight average molecule weight of an acrylic resin (or acrylic polymer) employed in this invention is preferably from 500 to 70,000. The acrylic resin is employed preferably in an amount of 0.5 to 35% by weight, and more preferably 1 to 30% by weight of the cellulose ester.

The acrylic resin X having a weight average molecular weight of from 5,000 to 70,000, preferably from 5,000 to 30,000, which is obtained by copolymerizing an unsaturated ethylenic monomer Xa having neither aromatic ring nor hydrophilic group in the molecule thereof and an unsaturated ethylenic monomer Xb having a hydrophilic group are usable as the acryl type polymer of the invention.

It is more preferable that the polymer X is used together with a polymer Y having a weight average molecular weight of from 500 to 3,000 which is formed by polymerizing an unsaturated ethylenic monomer Ya having no aromatic ring.

The above mentioned polymer X is a polymer having a weight average molecular weight of from 5,000 to 30,000, preferably from 5,000 to 30,000, which is formed by copolymerizing the unsaturated ethylenic monomer Xa having no aromatic ring or hydrophilic group in the molecule thereof and an unsaturated ethylenic monomer Xb having a hydrophilic group.

It is preferable that Xa is an acryl monomer or methacryl monomer each having neither aromatic ring nor hydrophilic group in the molecule thereof and the Xb is an acryl monomer or a methacryl monomer each having a hydrophilic and no aromatic ring in the molecule thereof.

The polymer X is represented by the following Formula P1.

$$-(Xa)_m\text{-}(Xb)_n\text{-}(Xc)_p\text{-} \qquad \text{Formula P1:}$$

The polymer X is more preferably a polymer represented by the following Formula P1-1.

$$-[CH_2-C(-R^1)(-CO_2R^2)]_m-[CH_2-C(-R^3)(-CO_2R^4-OH)-]_n-[Xc]_p- \qquad \text{Formula P1-1:}$$

In the above formula, $R^1$ and $R^3$ are each an H or a $CH_3$, $R^2$ is an alkyl group having 1 to 12 carbon atoms or a cycloalkyl group. $R^4$ is a $-CH_2-$ group, a $-C_2H_4-$ group or a $-C_3H_6-$ group. Xc is a monomer capable of polymerizing with Xa or Xb. Symbols m, n and p each represents a mole ratio provided that m≠0, n≠0, k≠0 and m+n+p=100.

Examples of monomers as the monomer unit constituting the polymer X are described below.

The hydrophilic group is a group having a hydroxyl group or an ethylene oxide group.

Examples of the unsaturated ethylenic monomer Xa having neither aromatic ring nor hydrophilic group include methyl acrylate, ethyl acrylate, i- or n-propyl acrylate, n-, i-, s- or t-butyl acrylate, n-, i- or s-pentyl acrylate, n- or i-hexyl acrylate, n- and i-heptyl acrylate, n- or i-octyl acrylate, n- or i-nonyl acrylate, n- or i-myristyl acrylate, 2-ethylhexyl acrylate, ε-caprolactone acrylate, and those formed by replacing the above acrylate by methacrylate.

Among them, methyl acrylate, methyl methacrylate, ethyl methacrylate and i- and n-propyl methacrylate are preferable.

The unsaturated ethylenic monomer Xb having the hydrophilic group and no aromatic ring as the monomer unit is preferably an acrylate or a methacrylate. Examples of such the acrylate and methacrylate include 2-hydroxyethyl acrylate, 2-hydroxypropyl acrylate, 3-hydroxypropyl acrylate, 4-hydroxybutyl acrylate, 2-hydroxybutyl acrylate, and those formed by replacing the above acrylate by methacrylate; and 2-hysroxyethyl acrylate, 2-hydroxyethyl methacrylate, 2-hydroxypropyl acrylate and 3-hydroxypropyl acrylate are preferred.

Xc is preferably one having no aromatic ring though it may be an unsaturated ethylenic monomer other than Xa and Xb as long as which is copolymerizable with Xa or Xb.

The molar ratio m:n of Xa and Xb is preferably from 99:1 to 65:35 and more preferably from 95:5 to 75:25, and p of Xc is from 0 to 10. Xc may contain plural kinds of monomer unit.

It is preferable that the molar ratio of Xa and Xb is suitably decided for optimizing the compatibility with the cellulose ester and the optical properties.

The weight average molecular weight of the polymer X is from 5,000 to 70,000, preferably from 5,000 to 30,000, and more preferably from 8,000 to 25,000.

The weight average molecular weight of the polymer X can be controlled by a known molecular weight controlling method. A method by adding a chain-transfer agent such as carbon tetrachloride, laurylmercaptane, and octyl thioglycolate can be cited as the molecule weight controlling method.

The polymer Y is a polymer having a weight average molecular weight of from 500 to 3,000 which is obtained by polymerizing the unsaturated ethylenic monomer Ya. Remaining monomer is preferably reduced when the weight average molecular weight of not less than 500. It is preferable to make the weight average molecular weight to not more than 3,000 for maintaining the retardation value Rth lowering property. Ya is preferably an acryl monomer or a methacryl monomer each having no aromatic ring.

The monomer Y of the invention is represented by the following Formula P2.

$$-(Ya)_k\text{-}(Yb)_q\text{-} \qquad \text{Formula P2:}$$

The Polymer Y is more preferably a polymer represented by the following Formula P2-1.

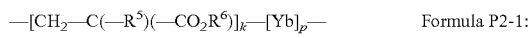
$$—[CH_2—C(—R^5)(—CO_2R^6)]_k—[Yb]_p—$$ Formula P2-1:

In the above formula, $R^5$ is an H or $CH_3$. $R^6$ is an alkyl group having 1 to 12 carbon atoms or a cycloalkyl group. Yb is a monomer unit copolymerizable with Ya. k and q represents molar ratio provided that k≠0 and k+q=100.

Yb is not specifically restricted so long as which is an unsaturated ethylenical monomer unit copolymerizable with Ya. Yb may include plural kinds of monomer. k+q=100, and q is preferably from 0 to 30.

The unsaturated ethylenic monomer Ya constituting the polymer Y which is obtained by unsaturated ethylenic monomer having no aromatic ring is, for example, an acrylate such as methyl acrylate, ethyl acrylate, i- and n-propyl acrylate, n-, i-, s- and t-butyl acrylate, n-, i- and s-pentyl acrylate, n- and i-hexyl acrylate, n- and i-heptyl acrylate, n- and i-octyl acrylate, n- and i-nonyl acrylate, n- and i-myristyl acrylate, cyclohexyl acrylate, 2-ethylhexyl acrylate, ε-caprolactone acrylate, 2-hydroxyethyl acrylate, 2-hydroxypropyl acrylate, 3-hydroxypropyl acrylate, 4-hydroxybutyl acrylate, 2-hydroxybutyl acrylate, and a methacrylate such as those formed by replacing the above acrylate by methacrylate, and a unsaturated acid such as acrylic acid, methacrylic acid, maleic anhydride, crotonic acid and itaconic acid.

Yb is not specifically limited as long as which is an unsaturated ethylenic monomer copolymerizable with Ya. Preferable examples of Yb include vinyl acetate, vinyl propionate, vinyl butylate, vinyl propionate, vinyl varelate, vinyl pivalate, vinyl caproate, vinyl caprylate, vinyl laurate, vinyl myristate, vinyl palmitate, vinyl stearate, vinyl cyclohexanecarbonate, vinyl octate, vinyl methacrylate, vinyl crotonate, vinyl sorbate and vinyl cinnamate. Yb may include plural kinds of the monomer.

In usual synthesis of the polymer X or Y, the molecular weight is difficultly controlled. Therefore, a method is preferably used, by which the molecular weight is not made to so large and the uniformity of the molecular weight can be made as uniform as possible.

The following methods can be cited as such the method; a method using a peroxide compound as the polymerization initiator such as cumene peroxide and t-butyl hydroperoxide, a method using a chain-transfer agent such as a mercapto compound or carbon tetra chloride additionally to the polymerization initiator, a method using a polymerization stopping agent such as benzoquinone and nitrobenzene, and a method described in JP-A 2000-128911 or 2000-344823 in which bulk polymerization is performed by using a compound having one thiol group and a secondary hydroxyl group or a combination of such the compound and an organic metal compound is used as a polymerization catalyst.

The method using the compound having a thiol group and a secondary hydrogen atom in the molecule thereof as the chain-transfer agent is particularly preferred for the polymer Y. In such the case, the polymer Y has a hydroxyl group or a thioether derived from the chain-transfer agent at the terminal thereof. The compatibility of the polymer Y with the cellulose ester can be controlled by the residue group at the terminal.

The weight average molecular weight can be measured by the following method.

(Weight Average Molecular Weight Measuring Method)
The weight average molecular weight Mn was measured by gel permeation chromatography.

The measuring method was as follows.
Solvent: Methylene chloride
Column: Three columns, Shodex K806, K805 and K803G manufactured by Showa Denko K. K., were joined for measuring.
Column temperature: 25° DC
Sample concentration: 0.1% by weight
Detector: RI Model 504, manufactured by GL Science Inc.
Pump: L6000, manufactured by Hitachi Ltd.
Flowing rate: 1.0 ml/min
Calibration curve: A calibration curve according to 13 samples of Standard polystyrene TSK within the Mw range of from 1,000,000 to 500, manufactured by Tosoh Corp.; the samples approximate equally differed from each other in Mw.

The hydroxyl group value of the polymer X and Y is preferably from 30 to 150 mg/g.

The measurement of the hydroxyl group value is carried out according to JIS K 0070 (1992). The hydroxyl group value is defined by the value of milligrams of potassium hydroxide necessary for neutralizing the acetic acid bonded with the hydroxyl group when 1 g of the sample is acetylated. Concretely, X grams (about 1 g) of the sample is exactly weighed in a flask and 20 ml of acetylation agent prepared by adding pyridine to 20 ml of acetic anhydride to make the volume to 400 ml is exactly added to the weighed sample. An air cooling pipe is attached to the mouth of the flask and the flask is heated in a glycerol bath at a temperature of from 95 to 100° C. After one and half hours, the system is cooled and 1 ml of purified water is added through the air cooling pipe for decomposing the acetic anhydride to acetic acid. Then the reaction liquid was titrated by a 0.5 mole/L potassium hydroxide methanol solution using a potentiometric titration apparatus and the inflection point of thus obtained titration curve is defined as the end point. On the other hand, the same procedure is carried out without any sample as the reference. The hydroxyl group value is calculated by the following formula.

$$\text{Hydroxyl group value} = \{(B-C) \times f \times 28.05/X\} + D$$

In the formula, B is the amount of the 5 mole/L potassium hydroxide methanol solution in ml used in the reference test, C is the amount of the 5 mole/L potassium hydroxide methanol solution in ml used in the measurement, f is the factor of the 5 mole/L potassium hydroxide methanol solution, D is the acid value and 28.05 is ½ of molecular weight of potassium hydroxide of 56.11.

The contents of the polymer X and the polymer Y in the cellulose ester film is preferably within the range satisfying the following Formulas (i) and (ii). In the formulas, Xg is the content of the polymer X in weight-percent (weight of polymer X/weight of cellulose ester×100) and Yg is the content of the polymer Y in weight-percent.

$$5 \leq Xg + Yg \leq 35 \text{(weight-percent)} \qquad \text{Formula (i)}$$

$$0.05 \leq Yg/(Xg+Yg) \leq 0.4 \qquad \text{Formula (ii)}$$

Preferable range or Formula (i) is from 10 to 25 weight-percent.

<Additives>
The cellulose ester film relating to this invention may contain additives such as anti-oxidant, plasticizer, UV absorber, and fine particles.

<Antioxidant, Thermal Degradation Prevention Agent>
Antioxidants can be used as the antioxidant and thermal degradation prevention agent in the cellulose acetate film. Particularly, compounds of lactone type, sulfur type, phenol type, double bond type, hindered amine type and phosphor type are preferably usable.

Compounds represented by the following Formula R are preferable as the above lactone type compound.

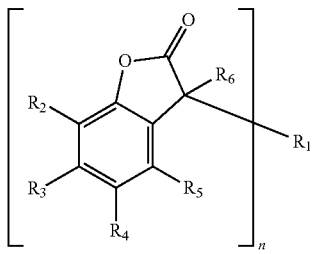

Formula R

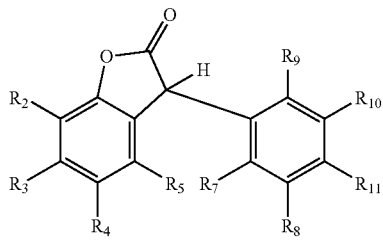

Formula R-1

In Formula R, $R_2$ to $R_5$ are each independently a hydrogen atom or a substituent, $R_6$ is a hydrogen atom or a substituent, and n is an integer of from 1 to 4. $R_1$ is a substituent when n is 1, and $R_1$ is two to four valent bonding group when n is 2 to 4.

It is preferable that the compound represented by Formula R has at least one hindered type substituent such as a t-butyl group, and particularly preferable that $R_2$ is the hindered type substituent.

The compounds represented by Formula R are preferably compounds represented by Formula R-1.

In the above formula, $R_2$ and $R_5$ are each independently a hydrogen atom or a substituent. The substituent is preferably an alkyl group having 1 to 18 carbon atoms, and more preferably an alkyl group having 1 to 8 carbon atoms.

$R_7$ to $R_{11}$ are each independently a hydrogen atom, an alkyl group having 1 to 18 carbon atoms or an alkoxy group having 1 to 18 carbon atoms.

The compounds represented by formula R-1 are preferably have at least one of a hindered type substituent such as t-butyl group, and it is particularly preferable that $R_2$ is a hindered type substituent.

101

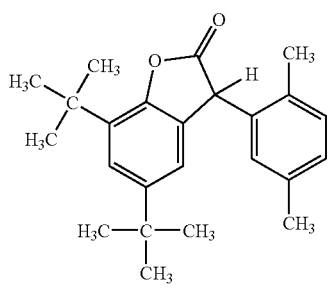

102

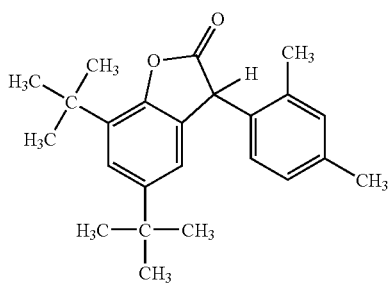

103

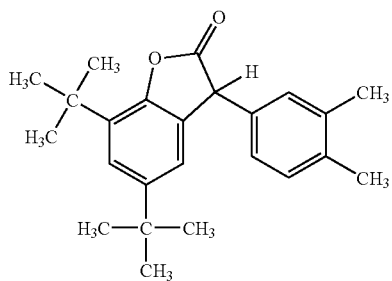

104

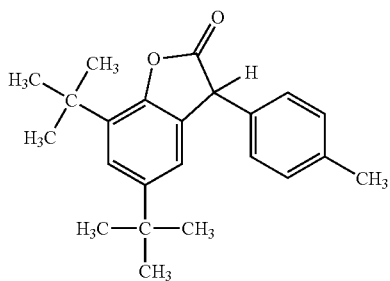

105

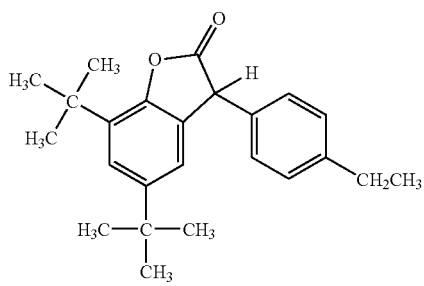

106

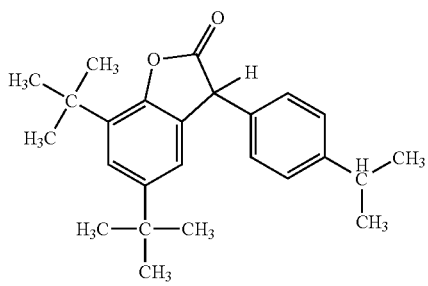

107 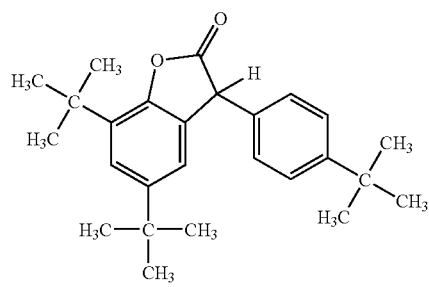
108 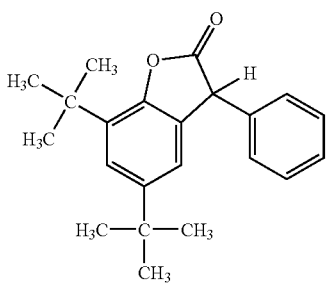
109 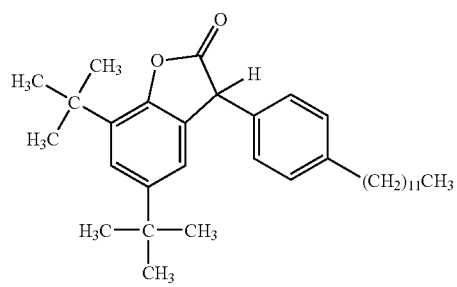
110 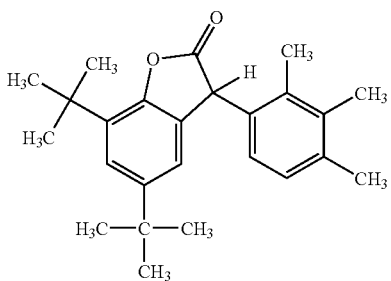
111 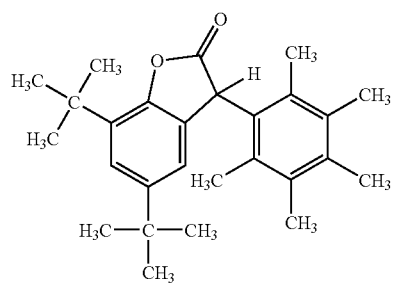
112 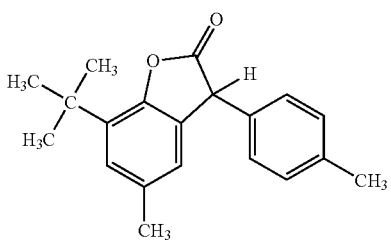
113 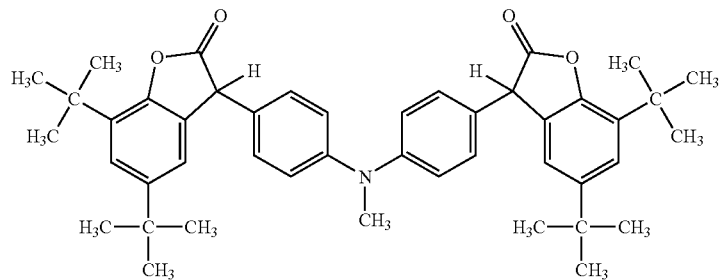
114 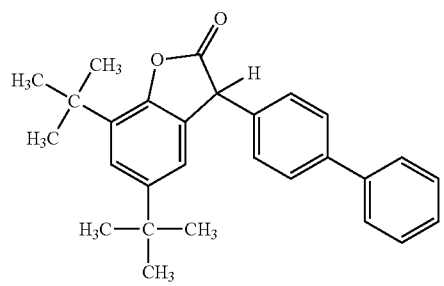
115 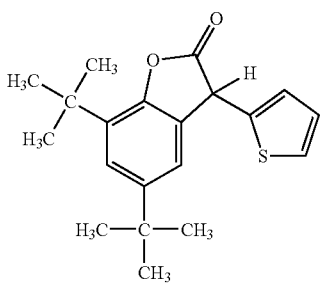

-continued
116
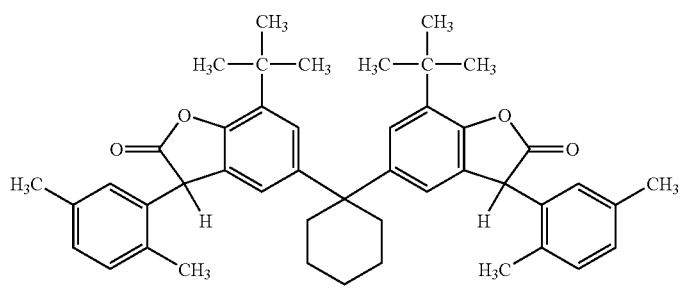
117
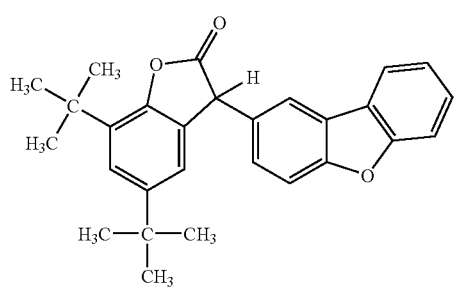
118
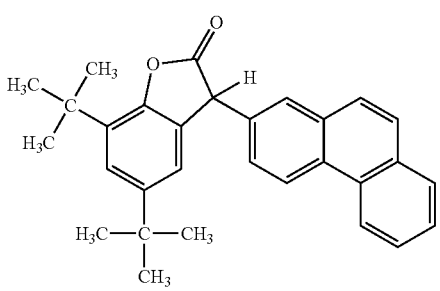
119
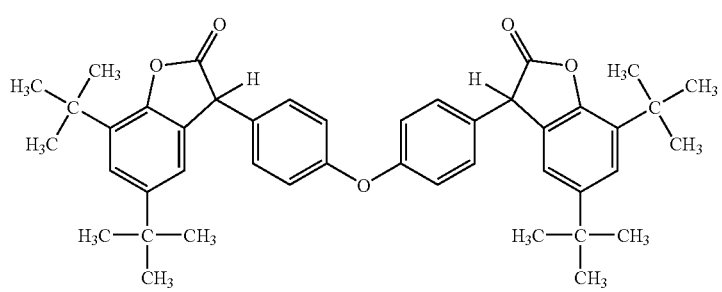
120
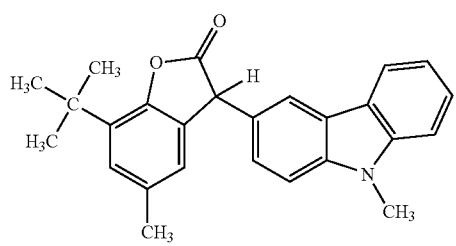
121
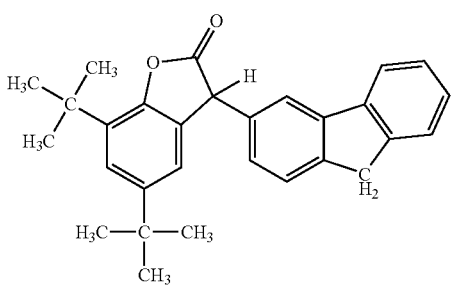
122
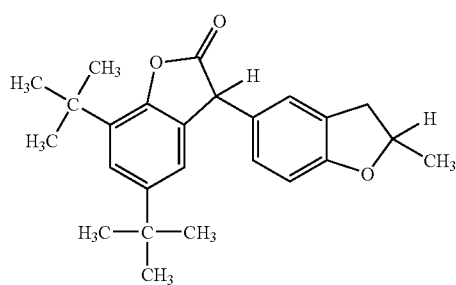
123
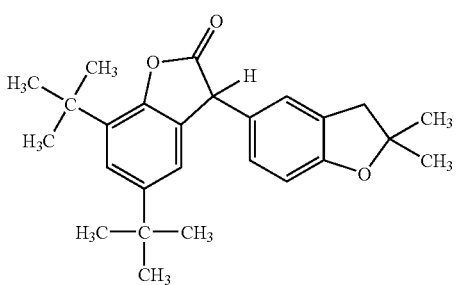

-continued
124 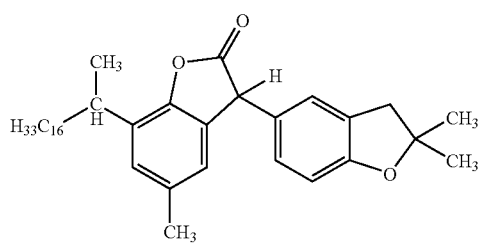 125 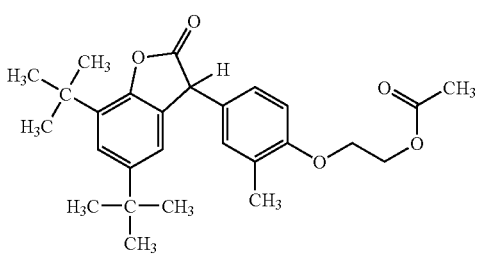
126 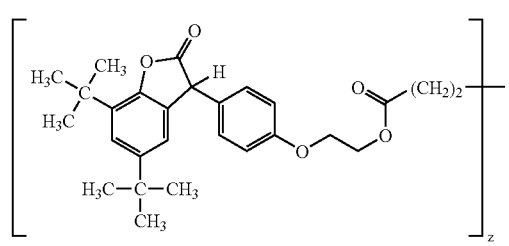 127 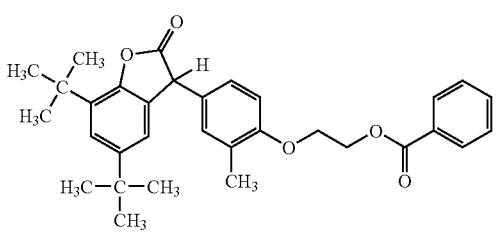
128 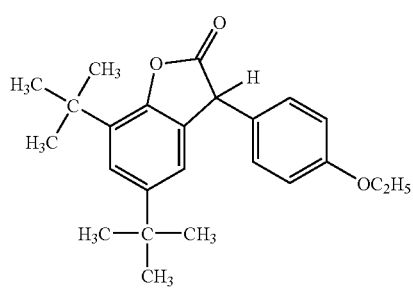 129 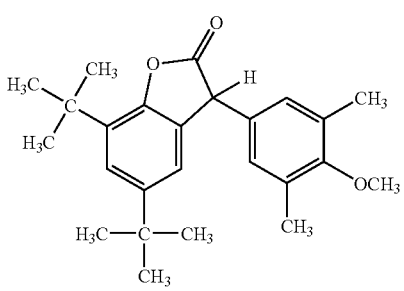
130 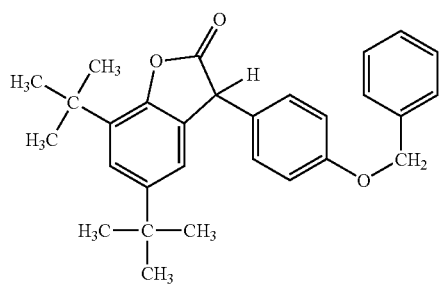 131 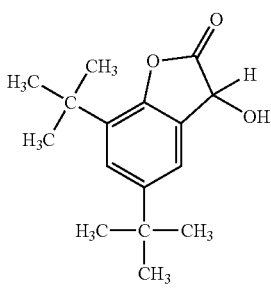
132 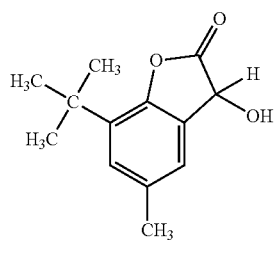 133 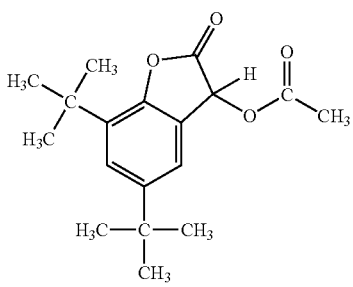

-continued
| | |
|---|---|
| 134 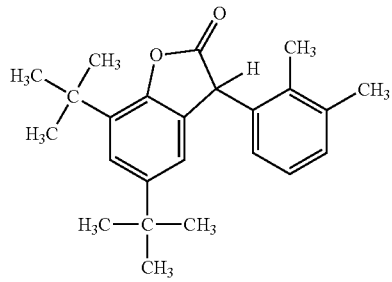 | 135 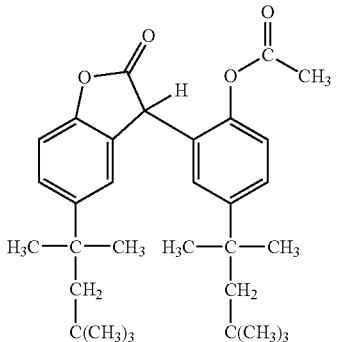 |
| 136 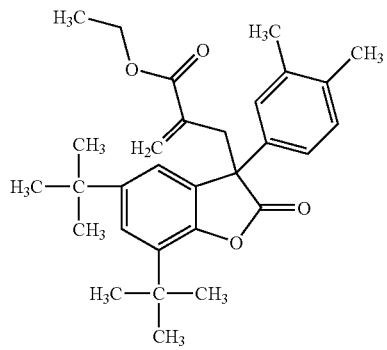 | 137 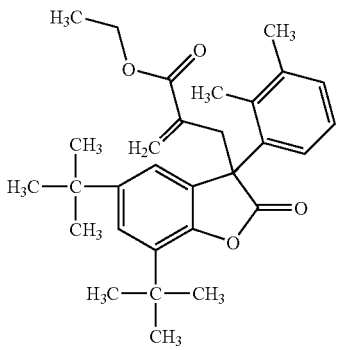 |
| 138 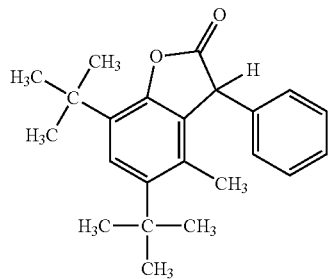 | 139 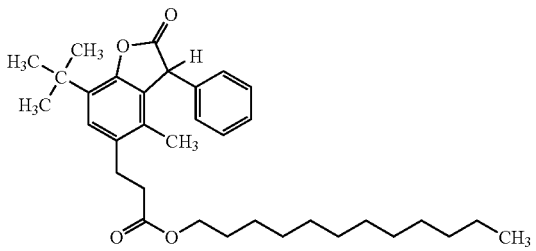 |
| 140 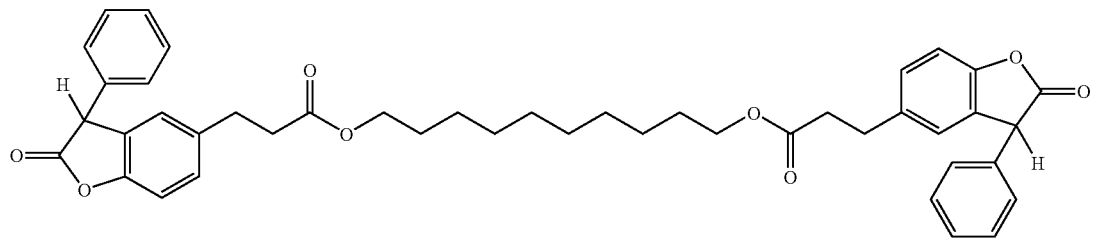 | |
| 141 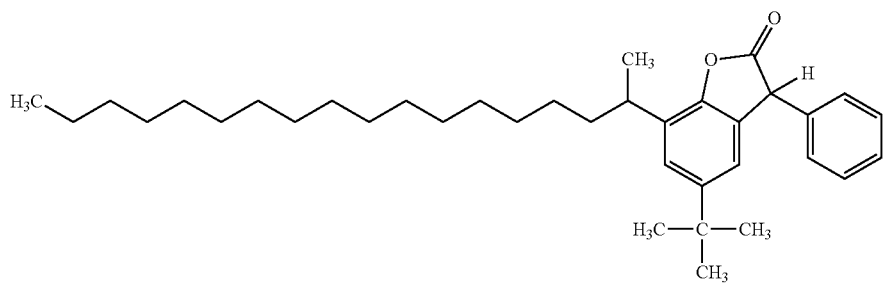 | |

-continued
142
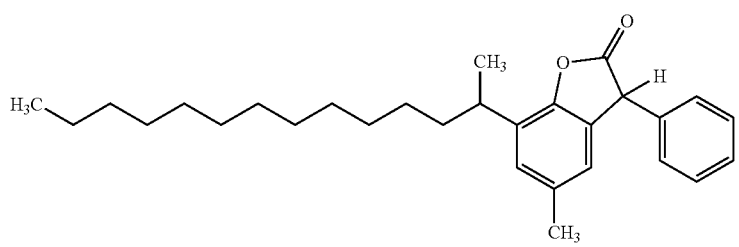
143
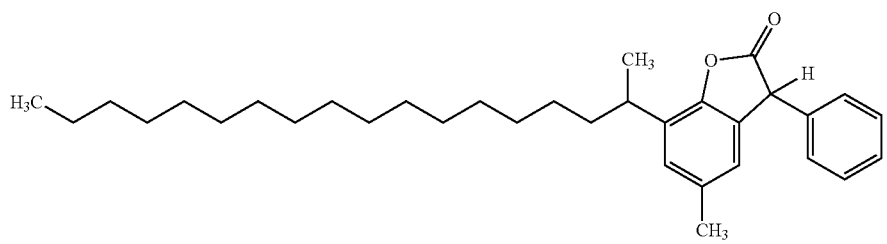
144
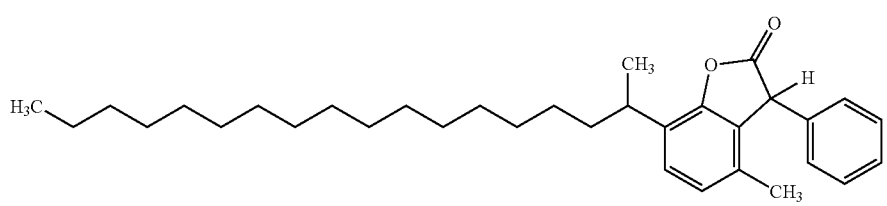
145
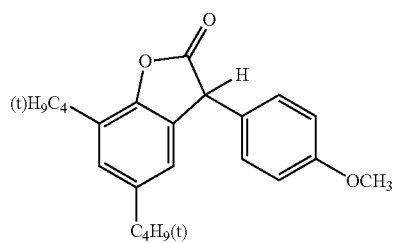
146
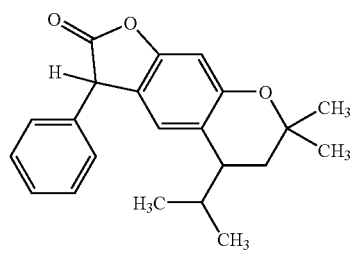
147
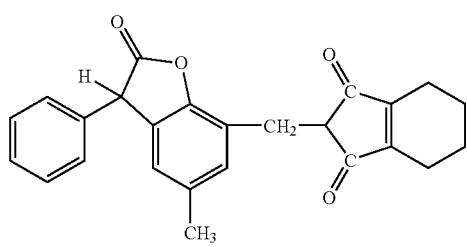
148
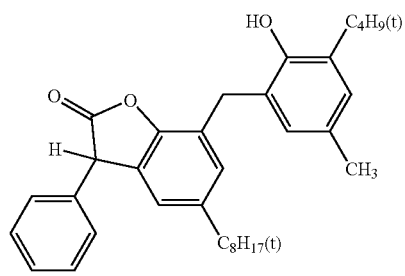
149
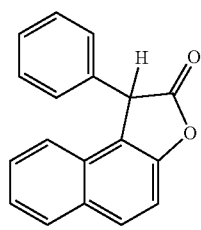
150
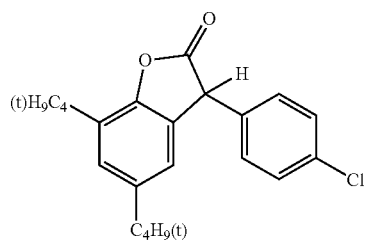

-continued

151 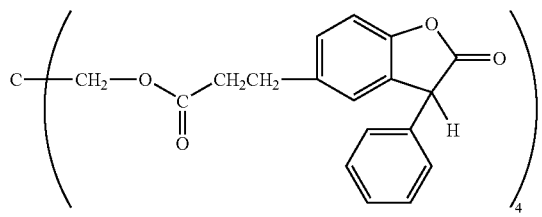

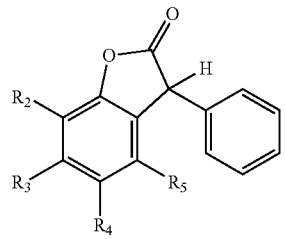

| Compound No. | R$_2$ | R$_3$ | R$_4$ | R$_5$ |
|---|---|---|---|---|
| 152 | —CH$_3$ | —H | —C$_4$H$_9$(s) | —H |
| 153 | —C$_4$H$_9$(s) | —H | —C$_4$H$_9$(t) | —H |
| 154 | —C$_4$H$_9$(s) | —H | —C$_5$H$_{11}$(t) | —H |
| 155 | —C$_5$H$_{11}$(t) | —H | —C$_5$H$_{11}$(t) | —H |
| 156 | —C$_4$H$_9$(t) | —H | —C$_5$H$_{11}$(t) | —H |
| 157 | —C$_4$H$_9$(s) | —H | —C$_4$H$_9$(s) | —H |
| 158 | —C$_4$H$_9$(t) | —H | —(CH$_2$)$_2$CO$_2$C$_8$H$_{17}$(n) | —H |
| 159 | —C$_4$H$_9$(t) | —H | —(CH$_2$)$_2$CO$_2$C$_8$H$_{17}$(i) | —H |
| 160 | —C$_4$H$_9$(t) | —H | —(CH$_2$)$_2$CO$_2$(CH$_2$)$_2$OC$_4$H$_9$(n) | —H |
| 161 | —C$_{12}$H$_{25}$ | —H | —CH$_3$ | —H |
| 162 | —C$_8$H$_{17}$ | —H | —CH$_3$ | —H |
| 163 | —C$_{16}$H$_{33}$ | —H | —CH$_3$ | —H |
| 164 | —C$_{24}$H$_{49}$ | —H | —CH$_3$ | —H |
| 165 | —C$_4$H$_9$(t) | —H | —Cl | —H |
| 166 | —C$_4$H$_9$(t) | —H | —OCH$_3$ | —H |
| 167 | —C$_4$H$_9$(t) | —H | —O—C$_8$H$_{17}$(n) | —H |
| 168 | 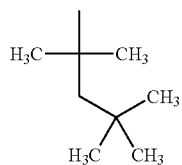 | —H | 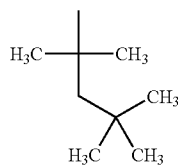 | —H |
| 169 | —H | —H | —OC$_4$H$_9$(n) | —H |
| 170 | —H | —H | —OCH$_3$ | —H |
| 171 | —H | —H | —CH$_3$ | —H |
| 172 | —H | —H | —C$_4$H$_9$(t) | —H |
| 173 | —H | —H | —C$_6$H$_{11}$(t) | —H |
| 174 | —H | —H | —C$_8$H$_{17}$(t) | —H |
| 175 | —C$_4$H$_9$(t) | —H | —CH$_3$ | —H |
| 176 | 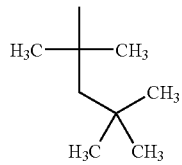 | —H | —C$_8$H$_{17}$(t) | —H |
| 177 | 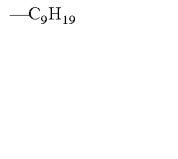 | —H | —C$_9$H$_{19}$ | —H |

-continued

| # | R1 | R2 | R3 | R4 |
|---|---|---|---|---|
| 178 | (H₃C)₃C-CH₂-C(CH₃)₂- | —H | —C₁₂H₂₅ | —H |
| 179 | (H₃C)₃C-CH₂-C(CH₃)₂- | —H | —(CH₂)₂CO₂C₈H₁₇(n) | —H |
| 180 | —H | —H | (H₃C)₃C-CH₂-C(CH₃)₂- | —H |
| 181 | —H | —O—C₈H₁₇(n) | —H | —H |
| 182 | —H | —O—C₈H₁₇(i) | —H | —H |
| 183 | —H | —NHCOC₄H₉(n) | —H | —H |
| 184 | —H | —O—C₈H₁₇(n) | —Cl | —H |
| 185 | —CH₃ | —O—C₈H₁₇(n) | —H | —H |
| 186 | —CH₃ | —O—C₈H₁₇(i) | —H | —Cl |
| 187 | —H | —O—C₈H₁₇(n) | —H | —Cl |
| 188 | —H | —N(CH₃)₂ | —H | —H |
| 189 | —NH—C(=O)—C₆H₅ | —H | —C₈H₁₇(t) | —H |
| 190 | —H | —CH₃ | —CH₃ | —H |
| 191 | —H | —H | —(CH₂)₂OH | —H |
| 192 | —H | —H | —(CH₂)₂OCOC₇H₁₅(n) | —H |
| 193 | —H | —H | —(CH₂)₃OH | —H |
| 194 | —C₄H₉(t) | —H | —(CH₂)₂OH | —H |
| 195 | —C₄H₉(t) | —H | —(CH₂)₂OCOCH₃ | —H |
| 196 | —H | —O(CH₂)₂OH | —C₄H₉(t) | —H |
| 197 | —H | —H | —C₃H₇(i) | —H |
| 198 | —H | —O(CH₂)₂OCH₃ | —H | —H |
| 199 | —OC₂H₅ | —H | —H | —H |
| 200 | —H | —H | —O—CH(H)(C₆H₅) | —H |
| 201 | —H | —H | —C₆H₅ | —H |
| 202 | —Cl | —H | —Cl | —H |
| 203 | —H | —Cl | —Cl | —H |
| 204 | —C₄H₉(t) | —H | —H | —H |
| 205 | —H | —H | —F | —H |
| 206 | —H | —H | —CN | —H |
| 207 | —CH₃ | —H | —CH₃ | —H |
| 208 | —OCH₃ | —H | —C₂H₅ | —H |
| 209 | —H | —H | —COCH₃ | —H |
| 210 | —H | —H | —CO₂C₄H₉(n) | —H |
| 211 | —H | —H | —O—C₆H₅ | —H |
| 212 | —H | —H | —CH₂OH | —H |
| 213 | —H | —H | —CH₂OH | —H |
| 214 | —H | —H | —SO₂C₈H₁₇(i) | —H |

-continued

| | | | | |
|---|---|---|---|---|
| 215 | —H | —C₁₅H₃₁(n) | —H | —H |
| 216 | —C₉H₁₉ | —H | —C₉H₁₉ | —H |
| 217 | —CF₃ | —H | —H | —H |
| 218 | —CH(H)(CH₂Ph) | —H | —Cl | —H |
| 219 | —H | —H | —cyclohexyl | —H |
| 220 | —H | —C₄H₉(t) | —H | —C₄H₉(t) |
| 221 | —H | —H | —NHC(O)-C₆H₄-C(CH₃)₃ | —H |
| 222 | —H | —H | —H | —H |
| 223 | —H | —C₄H₉(t) | —H | —H |
| 224 | —H | —CH₃ | —H | —CH₃ |
| 225 | —H | —H | —(CH₂)₂CO₂C₁₈H₃₇(n) | —H |
| 226 | —C₄H₉(t) | —H | —H | —C₄H₉(t) |
| 227 | —H | —CH₃ | —H | —H |
| 228 | —C₆H₅ | —H | —H | —H |
| 229 | —H | —OCH₃ | —H | —H |
| 230 | —H | —OH | —H | —H |
| 231 | —H | —OCOC₁₇H₃₅ | —H | —H |
| 232 | —H | —OH | —COPh | —H |
| 233 | —C₈H₁₇(t) | —H | —C₈H₁₇(t) | —H |

234

235

236

237

| 238 | 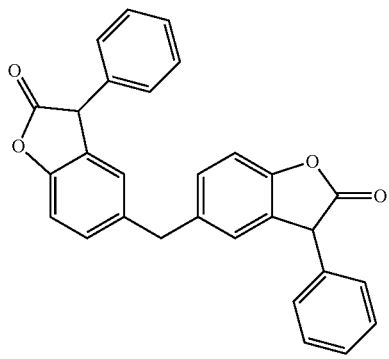 | 239 | 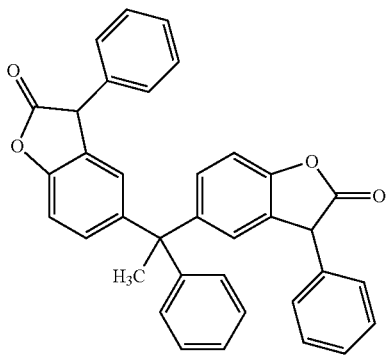 |
| --- | --- | --- | --- |
| 240 | 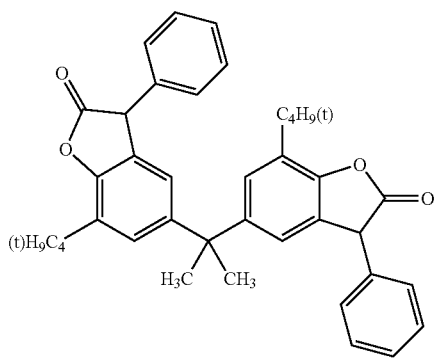 | 241 | 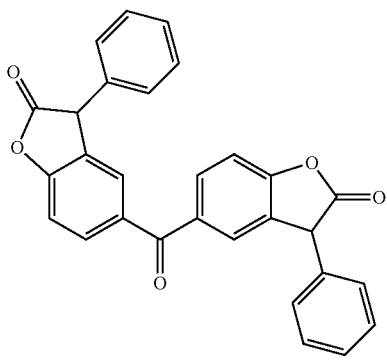 |
| 242 | 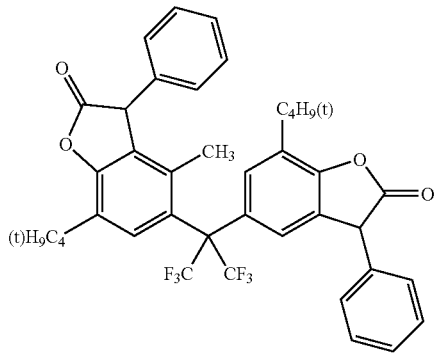 | 243 | 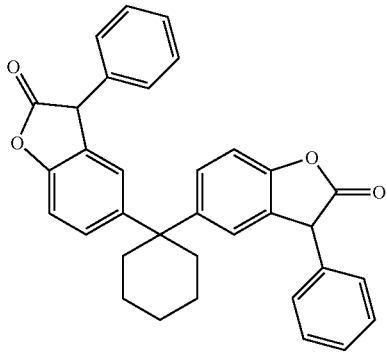 |
| 244 | 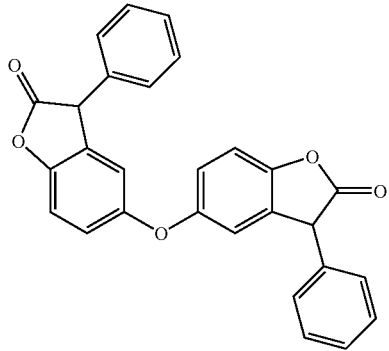 | 245 | 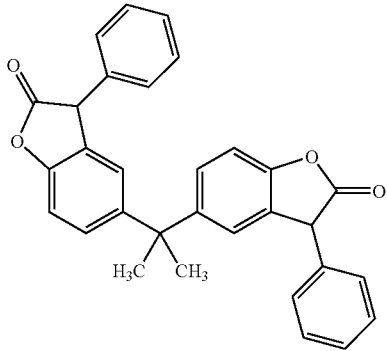 |

246 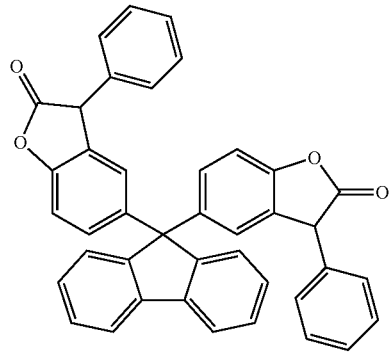
247 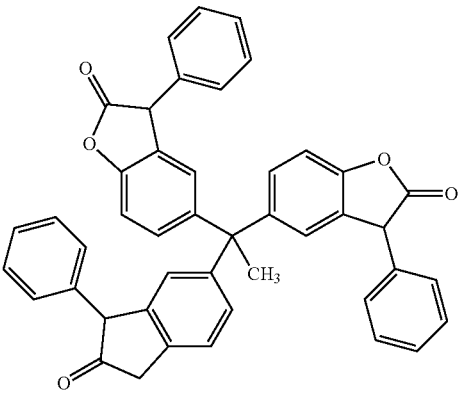
248 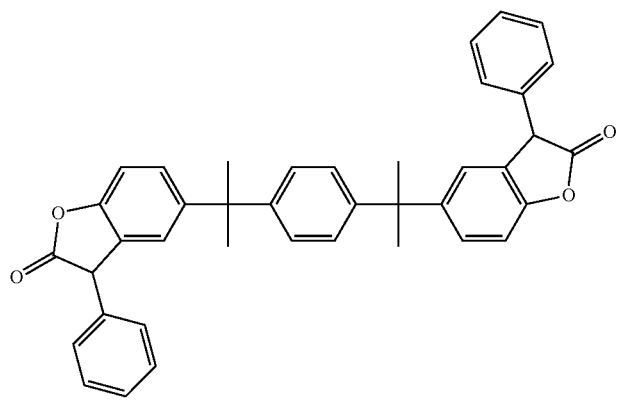
249 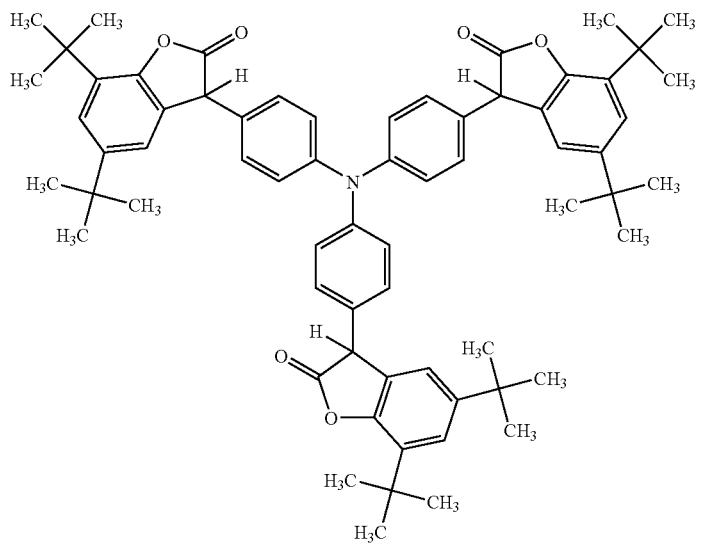

250 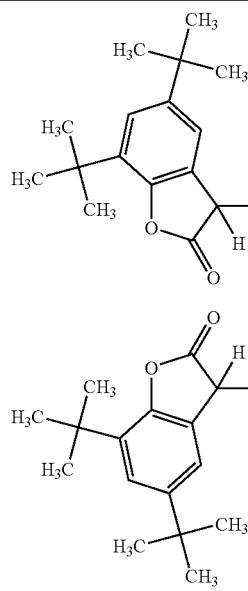 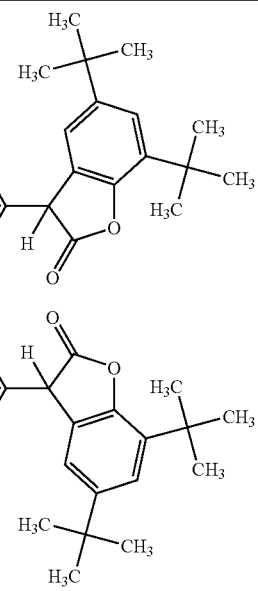

For example, one containing IRGANOX XP40® or IRGANOX XP60® marketed by Ciba Specialty Chemicals Inc. is preferable.

As the above phenol type compound, one having a 2,6-dialkylphenol structure such as IRGANOX 1076® and IRGANOX 1010® marketed by Ciba Specialty Chemicals Inc. is preferable.

(Phosphor Type Compound)

Compounds having partial structure represented by the following Formula C-1, C-2, C-3, C-4 or C-5 in the molecule thereof are preferable.

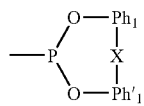

Formula C-1

In the formula, $Ph_1$ and $Ph'_1$ are each a substituent.

As the substituent, a hydrogen atom, a halogen atom such as a fluorine atom and a chlorine atom; an alkyl group such as a methyl group, an ethyl group, an isopropyl group, a hydroxyethyl group, a methoxymethyl group, a trifluoromethyl group and a t-butyl group; a cycloalkyl group such as a cyclopentyl group and a cyclohexyl group; an aralkyl group such as a benzyl group and a 2-phentyl group; an aryl group such as a phenyl group, a naphthyl group, a p-tolyl group and a p-chlorophenyl group; an alkoxy group such as a methoxy group, an ethoxy group, an isopropoxy group and a butoxy group; an aryloxy group such as a phenoxy group; a cyano group; an acylamino group such as a acetylamino group and a propionylamino group; an alkylthio group such as a methylthio group, an ethylthio group and a butylthio group; an arylthio group such as a phenylthio group; a sulfonylamino group such as a methanesulfonylamino group and a benzenesulfonylamino group; a ureido group such as a 3-methylureido group, 3,3-dimethylureido group and 1,3-dimethylamino group; a sulfamoylamino group such as a dimethylsulfamoyl group; a carbamoyl group such as methylcarbamoyl group, an ethylcarbamoyl group and a dimethylcarbamoyl group; a sulfamoyl group such as an ethylsulfamoyl group and a dimethylsulfamoyl group; an alkoxycarbonyl group such as a methoxycarbonyl group and an ethoxycarbonyl group; an aryloxycarbonyl group such as a phenoxycarbonyl group; a sulfonyl group such as a methanesulfonyl group, a butansulfonyl group and a phenylsulfonyl group; an acyl group such as an acetyl group, a propanoyl group and a butyloyl group; an amino group such as a methylamino group, an ethylamino group and a dimethylamino group; a hydroxyl group; a nitro group; a nitro group; an amine oxide group such as a pyridine oxide group; an imido group such as a phthalimido group; a disulfide group such as a benzene disulfide group and enzothiazolyl-2-sidulfide group; a carboxyl group; a sulfo group; and a heterocyclic group such as a pyrrole group, a pyrrolidyl group, a pyrazolyl group, an imidazolyl group, a benzimidazolyl group, a benzothiazolyl group and a benzoxazole group are cited. These substituents further may have a substituted.

$Ph_1$ and $Ph'_1$ are each more preferably a phenylene group, and the hydrogen atom of the phenylene group may be substituted by a phenyl group, an alkyl group having 1 to 8 carbon atoms, a cycloalkyl group having 5 to 8 carbon atoms, an alkylcycloalkyl group having 6 to 12 or an aralkyl group having 7 to 12 carbon atoms. $Ph_1$ and $Ph'_1$ may be the same or different.

X is a single bond, a sulfur atom or a —$CHR_6$— group. $R_6$ is a hydrogen atom, an alkyl group having 1 to 8 carbon atoms, or a cycloalkyl group having 5 to 8 carbon atoms, and these groups may be substituted by the foregoing substituents.

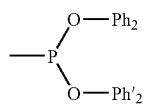

Formulas C-2

In the above formula, Ph$_2$ and Ph'$_2$ are each a substituent. The substituent is synonymous with the foregoing substituent. Ph$_2$ and Ph'$_2$ are each preferably a phenyl group or a biphenyl group and the hydrogen atom of the phenyl group and the biphenyl group may be substituted by an alkyl group having 1 to 8 carbon atoms, a cycloalkyl group having 5 to 8, an alkylcycloalkyl group having 6 to 12 carbon atoms or an aralkyl having 7 to 12 carbon atoms. Ph$_1$ and Ph'$_1$ may be the same or different, and these groups each may be further substituted by a substituent synonymous with the foregoing substituents.

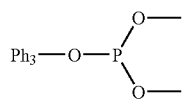

Formula C-3

In the above formula, Ph$_3$ is a substituent synonymous with the foregoing substituents. Ph$_3$ is preferably a phenyl group or a biphenyl group and the hydrogen atom of the phenyl group and the biphenyl group may be substituted by an alkyl group having 1 to 8 carbon atoms, a cycloalkyl group having 5 to 8, an alkylcycloalkyl group having 6 to 12 carbon atoms or an aralkyl having 7 to 12 carbon atoms. These groups each may be further substituted by a substituent synonymous with the foregoing substituents.

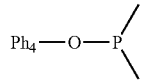

Formula C-4

In the above formula, Ph$_4$ is a substituent which is synonymous with the foregoing substituents. Ph$_4$ is preferably an alkyl group having 1 to 20 carbon atoms or a phenyl group and the alkyl group and the phenyl group may be substituted by the substituted synonymous with the foregoing substituents.

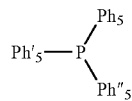

Formula C-5

In the above formula, Ph$_5$, Ph'$_5$ and Ph''$_5$ are each a substituent synonymous with the foregoing substituents. Ph$_5$, Ph'$_5$ and Ph''$_5$ are each preferably an alkyl group having 1 to 20 carbon atoms or a phenyl group and the alkyl group and the phenyl group may be substituted by the substituted synonymous with the foregoing substituents.

Concrete examples of the phosphor compound include a monophosphite type compound such as triphenyl phosphite, diphenylisodecyl phosphite, phenyldiisodecyl phosphite, tris (nonylphenyl)phosphite, tris(dinonylphenyl)phosphite, tris (2,4-di-t-butylphenyl)phosphite, 10-(3,5-di-t-butyl-4-hydroxybenzyl)-9,10-dihydro-9-oxa-10-phosphophenanthrene-10-oxide, 6-[3-(3-t-butyl-4-hydroxy-5-methylphenyl)-propoxy]-2,4,8,10-tetra-t-butyldibenzo[d,f][1,3,2]dioxaphosphepine and tridecyl phosphite; a diphosphite type compound such as 4,4'-butylidene-bis(3-methyl-6-t-butylphenyl-di-tridecyl phosphite) and 4,4'-isopropylidene-bis(phenyl-di-alkyl($C_{12}$-$C_{15}$) phosphite; a phosphonite type compound such as triphenyl phosphonite, tetrakis(2,4-di-tert-butylphenyl-[1,1-biphenyl]-4,4'-diyl bisphosphonite and tetrakis(2,4-di-tert-butyl-5-methylphenyl) [1,1-biphenyl]-4,4'-diyl bisphosphonite; and a phosphine type compound such as triphenylphosphine and tris(2,6-dimethoxyphenyl)phosphine.

The above phosphor type compounds are marketed, for example, by Sumitomo Chemical Co. Ltd. under the commercial name of "Sumilizer GP", by ADEKA Corp. under the commercial name of "ADK STAB PEP-24G", "ADK STAB PEP-36" and "ADK STAB 3010", by Ciba Specialty Chemicals Inc. under the commercial name of "IRGAFOS P-EPQ", and by Yoshitomi Fine Chemicals Ltd. under the commercial name of "GSY-P101".

Moreover, the following compounds can be cited.

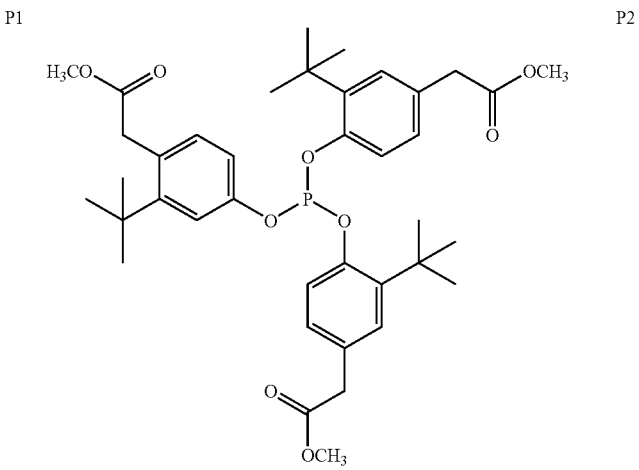

-continued
P3
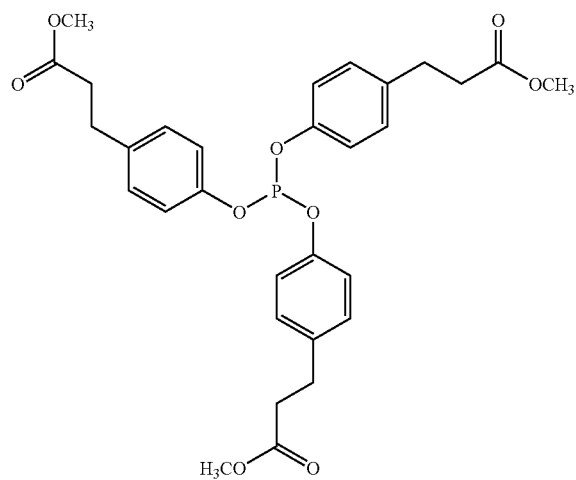
P4
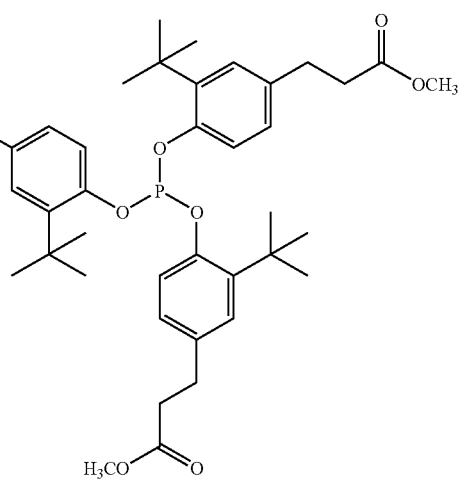
P5
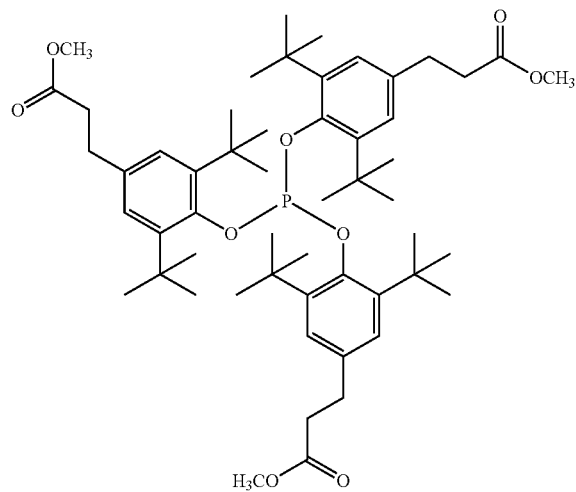
P6
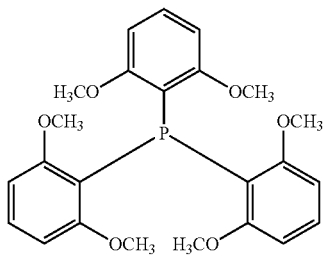
P7
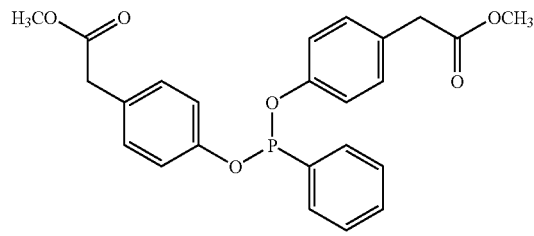
P8
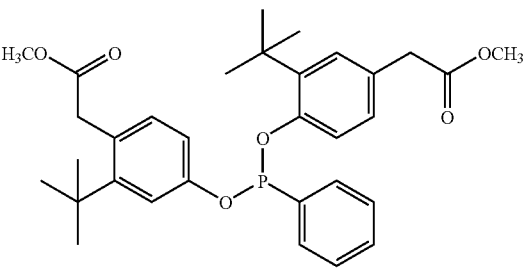
P9
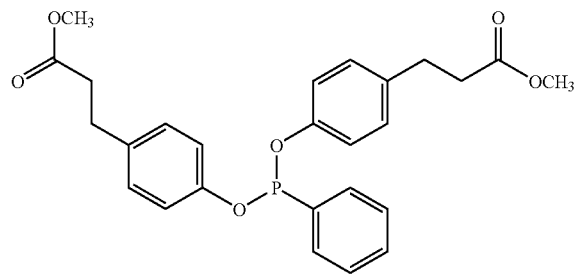
P10
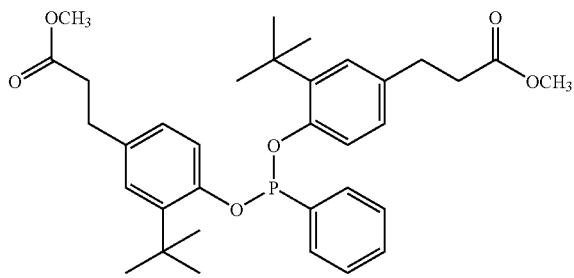

-continued
P11
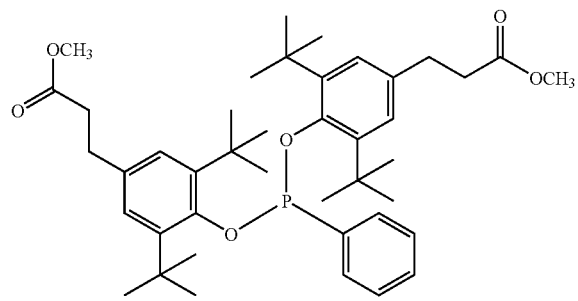
P12
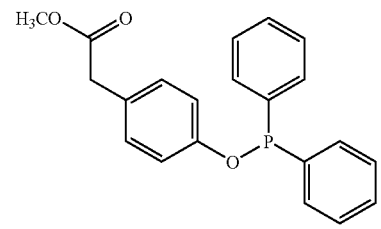
P13
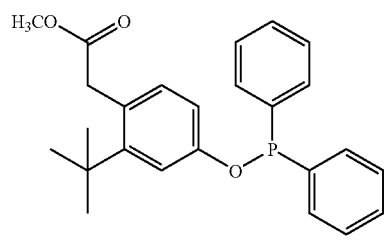
P14
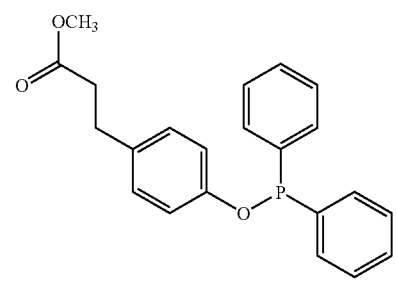
P15
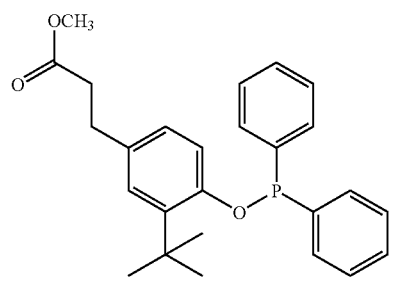
P16
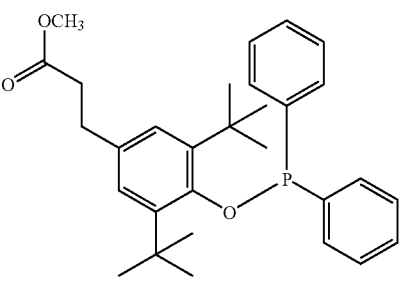
P17
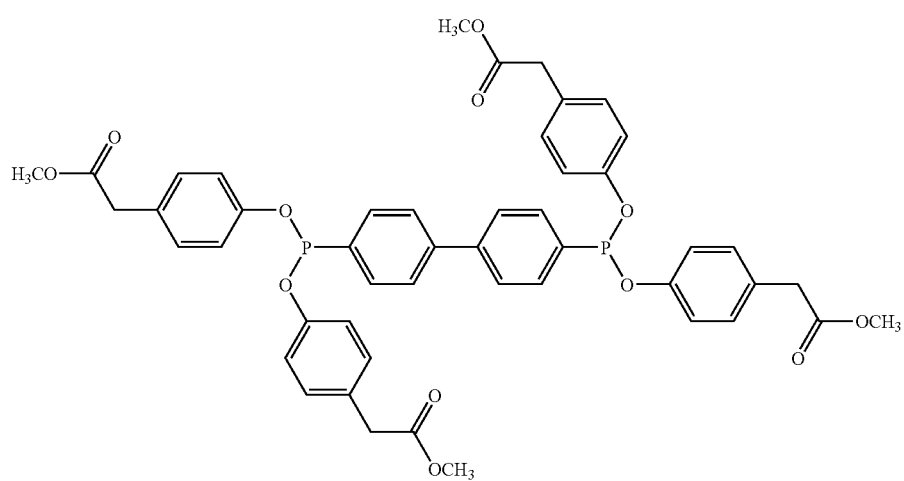

-continued
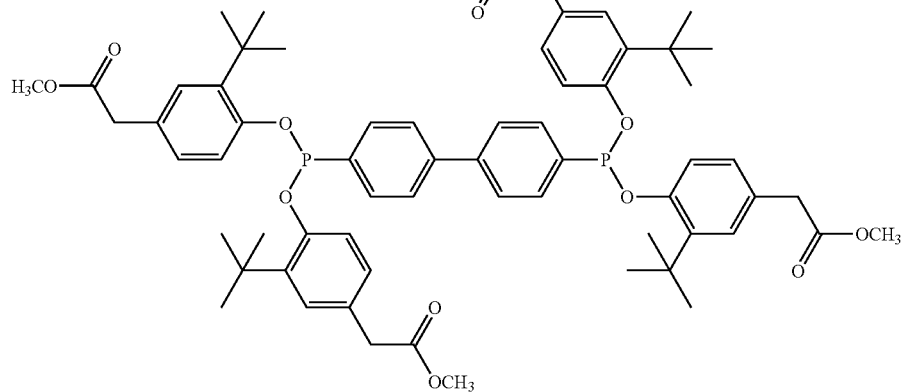
P18
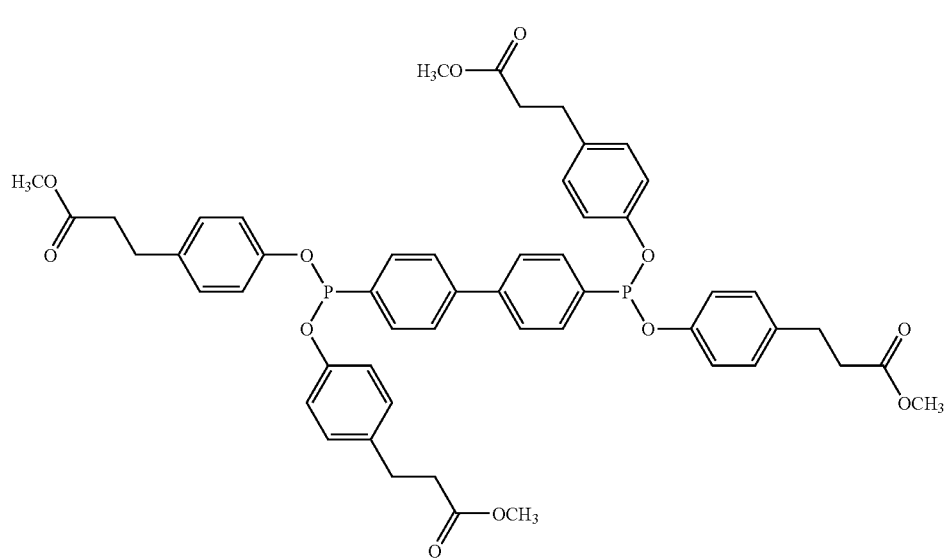
P19
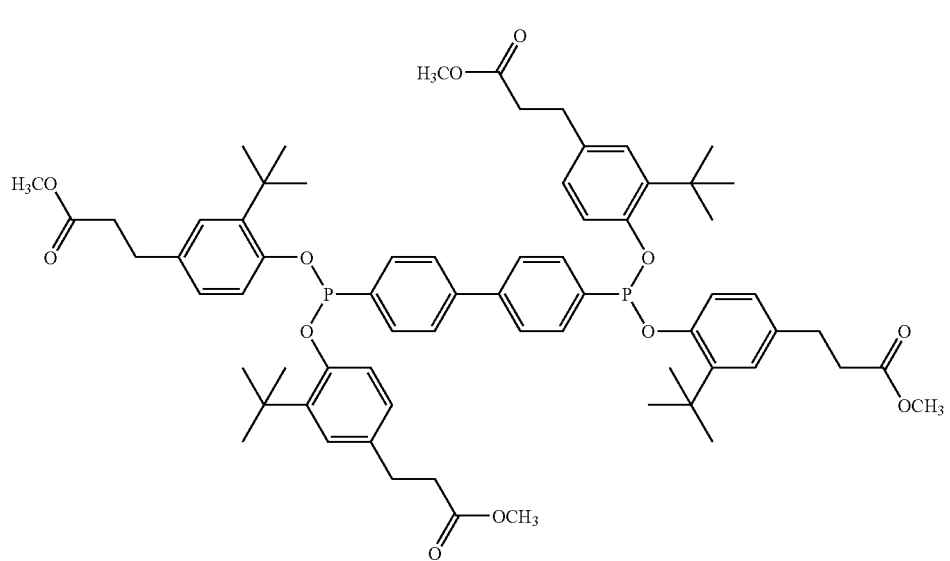
P20

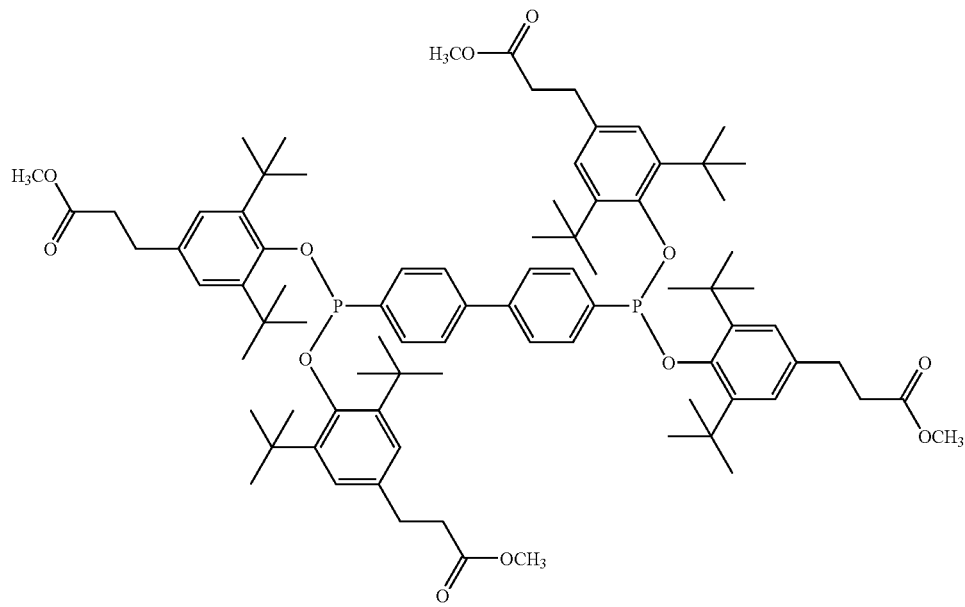

P21

As the above phosphor type compound, "Sumilizer" marketed by Sumitomo Chemical Co., Ltd., "ADK STAB PEP-24G", "ADK STAB PEP-36" and "ADK STAB 3010" marketed by ADEKA Corp., "IRGAFOS P-EPQ" marketed by Ciba Specialty Chemicals Inc., and GSY-P101 marketed by API Corporation are preferable, for example.

As the above hindered amine compound, for example, "Tinuvin 144" and "Tinuvin 770" marketed by Ciba Specialty Chemicals Inc. and "ADK STAB LA-52" marketed by ADEKA Corp. are preferable.

the sulfur type compound, for example, "Sumilizer TPL-R" and "Sumilizer TP-D" marketed by Sumitomo Chemical Co., Ltd. are preferable.

As the double bond type compound, for example, "Sumilizer GM" and "Sumilizer GS" marketed by Sumitomo Chemical Co., Ltd. are preferable.

The concrete double bond type compound is preferably a compound having an acrylate group or a methacrylate group together with a phenolic hydroxyl group in the same molecule, and compounds represented by the following Formula II are preferable.

Formula II

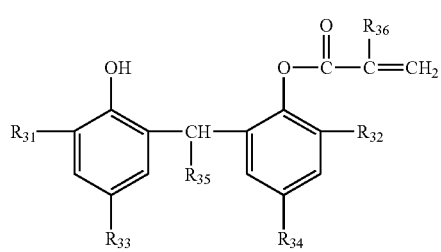

In Formula II, $R_{31}$ to $R_{35}$ are each an alkyl group having 1 to 10, preferably 1 to 5, carbon atoms, which may be the same as or different from each other. The alkyl group is decided considering the effect as the stabilizer and the easiness of production. Concrete examples of alkyl group represented by each of R31 to R35 include a methyl group, an ethyl group, an n-propyl group, an isopropyl group, an n-butyl group, a sec-butyl group, an isobutyl group, a tert-butyl group and a 1,1-dimethylpropyl group. Bulky alkyl groups causing steric hindrance such as the isopropyl group, sec-butyl group, tert-butyl group and 1,1-dimethylpropyl group are particularly preferable as the group represented by R31 to Ras from the stabilizing effect and easiness of the production. Among them, the tert-butyl group and 1,1-dimetylpropyl group are preferred. $R_{33}$ and $R_{34}$ is each preferably the tert-butyl group or 1,1-dimetyl propyl group considering the quinoide structure forming reaction accompanying dehydrogenation though the methyl group, ethyl group, n-propyl group, isopropyl group, n-butyl group, sec-butyl group, isobutyl group, tert-butyl group, 1,1-dimethylpropyl group are usable from the easiness of the production. As $R_{35}$, an alkyl group difficultly causing steric hindrance such as the methyl group, ethyl group, propyl group and n-butyl group are preferable from the viewpoint of production. $R_{36}$ is a hydrogen atom or a methyl group.

Concrete examples of the compound having an acrylate group or methacrylate group together with a phenyl group in the molecule thereof are shown below.

45                                                                                              46
1
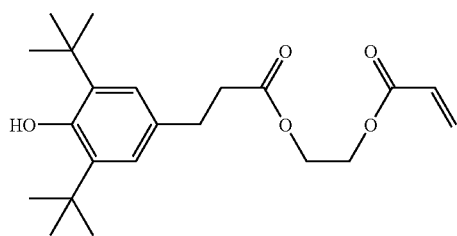
2
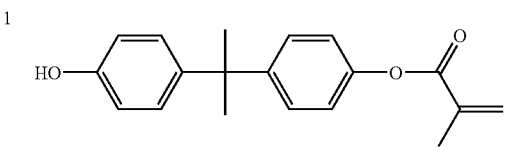
3
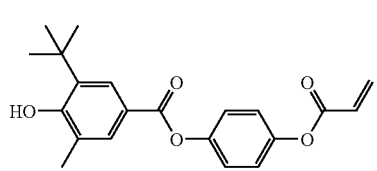
4
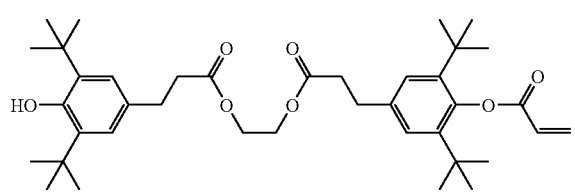
5
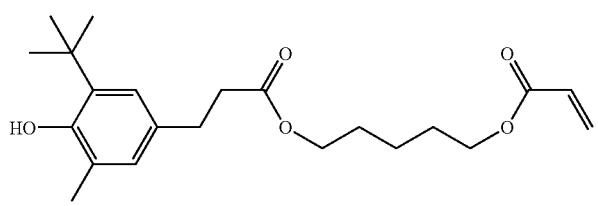
6
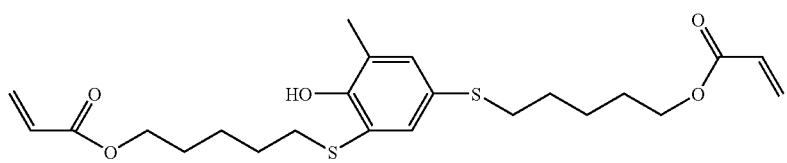
7
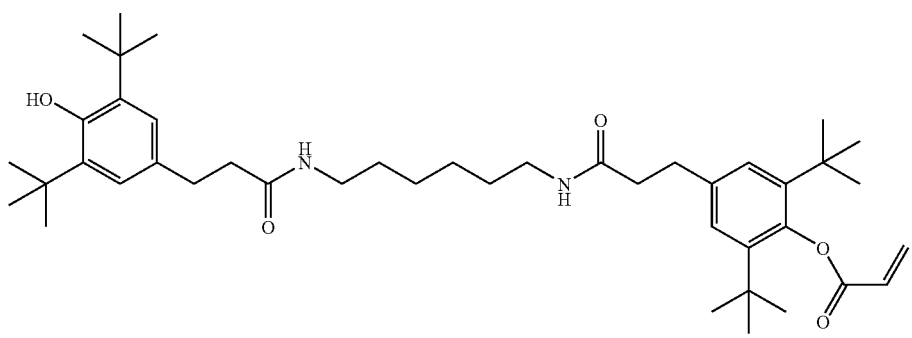
8
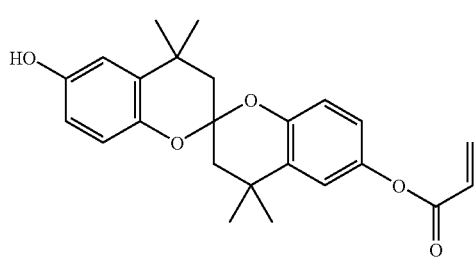
9
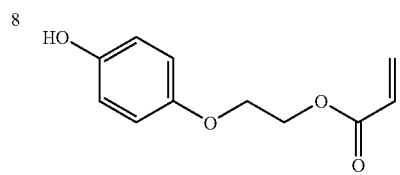

-continued
10
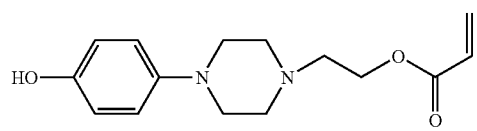
11
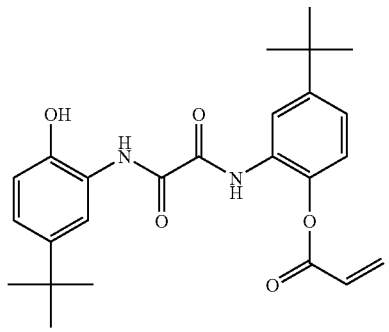
12
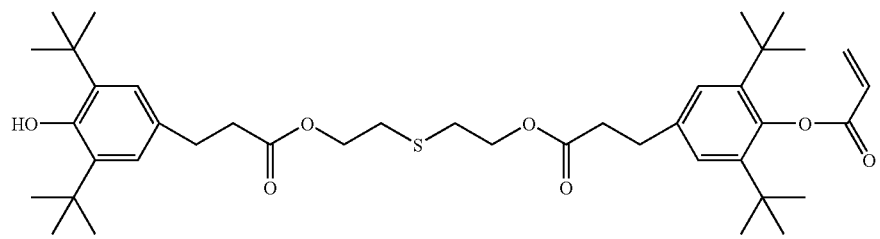
13
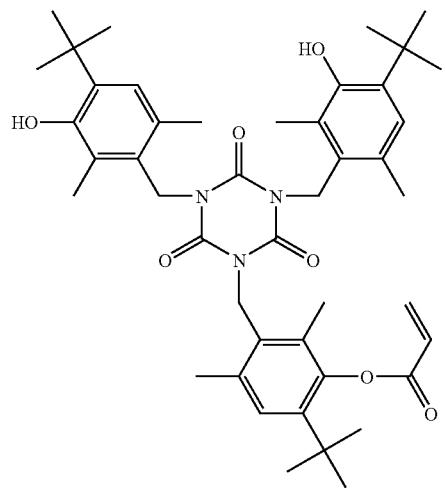
14
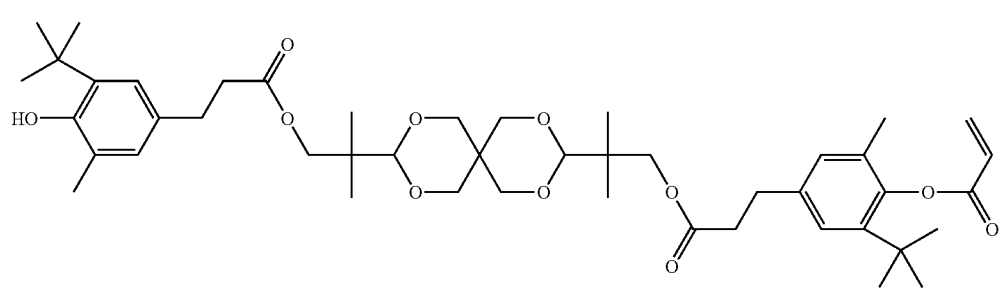

-continued
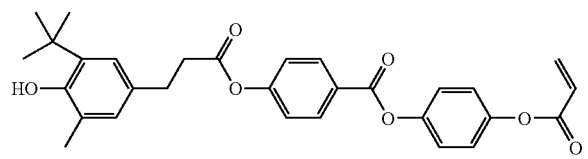
15
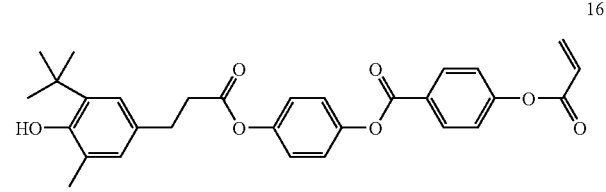
16
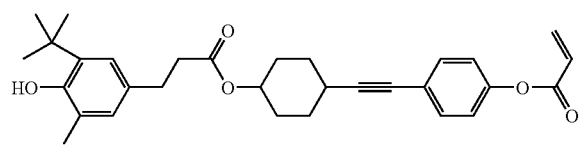
17
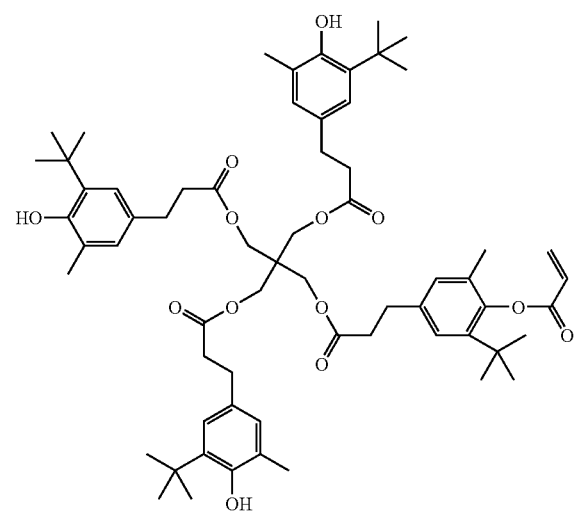
18
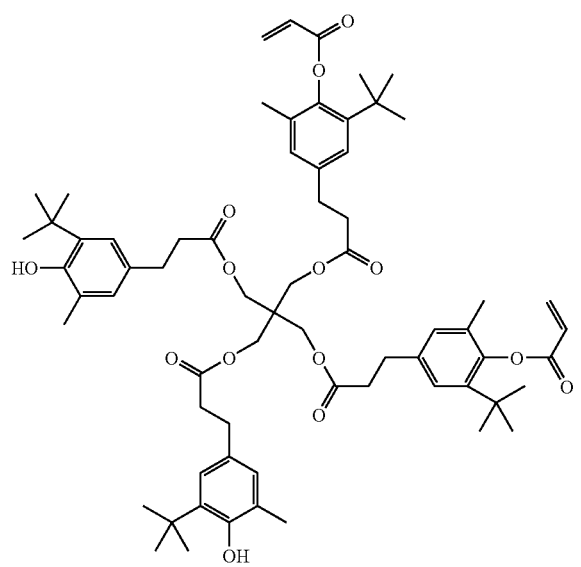
19
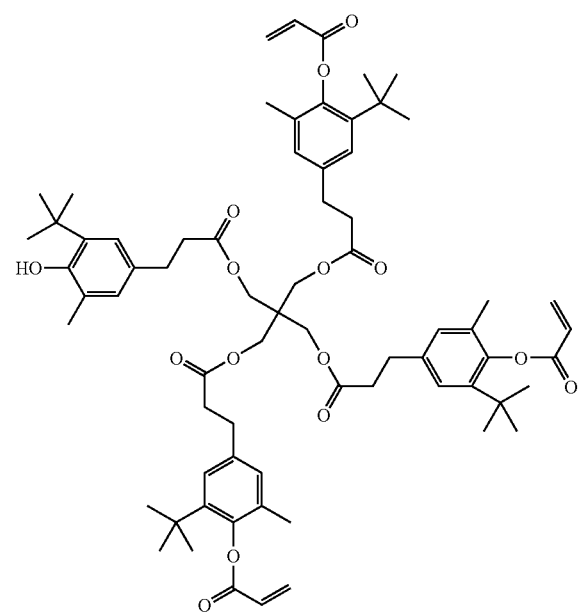
20

The compound having the acrylate group or methacrylate group together with the phenolic hydroxyl group in the same molecule is preferably a compound represented by the above Formula II and particularly preferred compounds are available on the market under the commercial name of Sumilizer GS and Sumilizer GM, each manufactured by Sumitomo Chemical Co., Ltd.

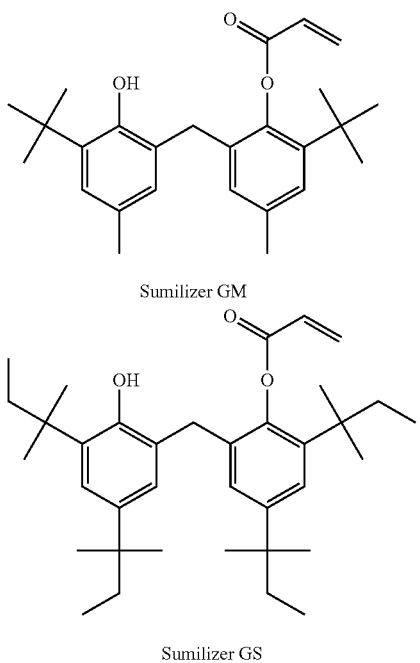

Sumilizer GM

Sumilizer GS

The compound having the acrylate group or methacrylate group together with the phenolic hydroxyl group in the same molecule is preferably used in an amount of from 0.01 to 5.0, more preferably from 0.1 to 3.0, particularly preferably from 0.5 to 1.0, parts by weight to 100 parts by weight of the cellulose ester resin.

Compounds having an epoxy group such as those described in U.S. Pat. No. 4,137,201 may be contained as an acid capturing agent.

The antioxidant may be added from 0.05 to 20% by weight of the principal material resin of the film though the adding amount of that is suitably decided for suiting with the process for recycling.

These antioxidants and the thermal degradation preventing agents give a synergy effect by using in combination of plural compounds each different from each other in the structural system comparing with the single use. For example, a combination use of the lactone type, phosphor type, phenol type and double bond type compounds is preferable.

<Another Additive>

Any additives which can be added to usual cellulose ester film may be contained in the optical film according to the invention additionally to the above described compounds.

A plasticizer, UV absorbent and fine particle can be cited.

An oxybenzophenone type compound, a benzotriazole type compound, a salicylate type compound, a cyanoacrylate type compound, a triazine type compound, a nickel complex type compound and an inorganic powder are usable as the UV absorbent though the UV absorbent is not specifically limited. The above compounds each may be usable in a form of polymer UV absorbent.

Examples of inorganic compound usable as the fine particle in the invention include silicon dioxide, titanium dioxide, aluminum oxide, zirconium oxide, calcium carbonate, talk, clay, baked kaolin, baked calcium silicate, hydrated calcium silicate, aluminum silicate, and calcium phosphate can be cited as the fine particle to be used in the invention. The fine particle containing silicon is preferable since the turbidity is lowered, and silicon dioxide is particularly preferred.

The average diameter of primary particles of the fine particle is preferably from 5 to 50 nm, and more preferably from 7 to 20 nm. The particles are preferably contained in a state of secondarily coagulated particles having a diameter of from 0.05 to 0.3 µm. The content of the fine particle in the cellulose ester film is preferably from 0.05 to 1%, particularly from 0.1 to 0.5%, by weight. In the case of a multi-layered cellulose ester film formed by a co-casting method, the fine particles are preferably contained in the surface layer.

The fine particle usable in the invention is available on the market, for example, under the commercial name of Aerosil R972, R972V, R974, R812, 200, 200V, 300, R202, OX50, TT600, R976 and R811, each manufactured by Nippon Aerosil Co., Ltd.

Silicone resin, fluororesin and acryl resin can be cited as examples of the polymer. The silicone resin, particularly one having a three dimensional network structure, is preferable. Such the usable polymer is available on the market under the commercial name of TOSPEARL 103, 105, 108, 120, 145, 3120 and 40, each manufactured by Momentive Performance Materials Inc.

Among them, Aerosil 200V and 972V are particularly preferably used because the effect of lowering the frictional coefficient is large while maintaining the low turbidity of the cellulose film.

<<Plasticizer>>

In the production process of the optical film, at least one kind of plasticizer is incorporated in the film forming material in an amount of from 1 to 30% by weight.

The plasticizer is generally an additive displaying effects of improving the friability and giving the flexibility by adding it into a polymer. In the invention, the plasticizer is added to made lower the melting point than that of the cellulose ester resin itself and to make lower the viscosity of the melted film constitution materials containing the plasticizer than that of the cellulose ester resin itself at the same temperature. The plasticizer is added also to improve the hydrophilicity of the cellulose ester and the moisture permeation ability; therefore, it has a function of moisture permeation preventing agent.

The melting temperature of the film constitution material is a temperature at which the material is melted and displays fluidity. It is necessary for melting and giving the fluidity to the cellulose ester that the cellulose ester is heated at least to a temperature higher than the glass transition point thereof.

At the temperature higher than the glass transition temperature, the elasticity and viscosity are lowered by heat absorption and the fluidity is appeared. It is necessary, however, to melt the cellulose ester at a temperature as lower as possible because the molecular weight of the cellulose ester is lowered by thermal decomposition caused by melting of the cellulose ester at high temperature so that the molecular weight of the cellulose ester is lowered and kinetic properties of the film tends to be received bad influence.

The melting temperature of the film constitution material can be lowered by addition of the plasticizer having a melting point or a glass transition temperature lower than the glass transition temperature.

The optical film preferably contains 1 to 25% by weight of an ester compound having a structure of condensate of an organic acid represented by the following Formula I and a trivalent or more alcohol. An effect of improving in the flatness of the film is observed by addition in an amount of 1% by weight or more, and the bleed out of the plasticizer is difficultly caused and the stability of the film is superior when the amount is 25% by weight or less. The cellulose ester film containing from 3 to 20% by weight of the plasticizer is more preferable and that containing from 5 to 15% by weight is further preferable.

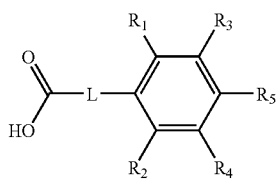

Formula 1

In the formula, $R_1$ to $R_5$ are each a hydrogen atom, a cycloalkyl group, an aralkyl group, an alkoxy group, a cycloalkoxy group, an aryloxy group, an aralkyloxy group, an acyl group, a carbonyloxy group, an oxycarbonyl group or an oxycarbonyloxy group, which may further have a substituent. L is a bonding group, a substituted or unsubstituted alkylene group, an oxygen atom or a direct bond.

As the cycloalkyl group represented by $R_1$ to $R_5$ is preferably a cycloalkyl group having 3 to 8 carbon atoms and concretely a cyclopropyl group, a cyclopentyl group and a cyclohexyl group. These groups may be substituted by a substituent. Examples of preferable substituent include a halogen atom such as a chlorine atom, a bromine atom and a fluorine atom, a hydroxyl group, an alkyl group, an alkoxy group, a cycloalkoxy group, an aralkyl group (the phenyl group may be further substituted by an alkyl group or a halogen atom), an alkenyl group such as a vinyl group and an allyl group, a phenyl group (the phenyl group may be further substituted by an alkyl group or a halogen atom), an acyl group having 2 to 8 carbon atoms such as an acetyl group and a propionyl group, and a unsubstituted carbonyloxy group having 2 to 8 carbon atoms such as an acetyloxy group and a propionyloxy group.

The aralkyl group represented by $R_1$ to $R_5$ includes a benzyl group, a phenetyl group and a γ-phenylpropyl group, these groups may be substituted by a substituent. As preferable substituent, groups the same as the groups capable of substituting to the above cycloalkyl group can be cited.

As the alkoxy group represented by $R_1$ to $R_5$, an alkoxy group having 1 to 8 carbon atoms, concretely a methoxy group, an ethoxy group, an n-propoxy group, an n-butoxy group, an n-octyloxy group, an isopropoxy group, a 2-ethylhexyloxy group and a t-butoxy group are cited. These groups may be further substituted by a substituent. Examples of the substituent include a halogen atom such as a chlorine atom, a bromine atom and fluorine atom, a hydroxyl group, an alkoxy group, a cycloalkoxy group, an aralkyl group (the phenyl group may be further substituted by an alkenyl group or a halogen atom), an alkenyl group, a phenyl group (the phenyl group may be further substituted by an alkenyl group or a halogen atom), an aryloxy group such as a phenoxy group (the phenyl group may be further substituted by an alkenyl group or a halogen atom), an acyl group such as an acetyl group and a propionyl group, a unsubstituted acyloxy group having 2 to 8 carbon atoms such as an acetyloxy group and a propionyloxy group, and an arylcarbonyloxy group such as a benzoyloxy group.

As the cycloalkoxy group represented by $R_1$ to $R_5$, an unsubstituted cycloalkyl group having 1 to 8 carbon atoms is cited. Concretely, a cyclopropyloxy group, a cyclopentyloxy group and a cyclohexyl group are exemplified. These groups may be further substituted by a substituent. As preferable substituent, groups the same as the groups capable of substituting to the above cycloalkyl group can be cited.

As the aryloxy group represented by $R_1$ to $R_5$, a phenoxy group is cited. The phenyl group of the phenoxy group may be substituted by groups the same as the groups capable of substituting to the above cycloalkyl group.

As the aralkyloxy group represented by $R_1$ to $R_5$, a benzyloxy group, and phenetyloxy group can be cited. These substituents each may be further substituted by a substituent. As the preferable substituent, groups the same as those capable of being the substitute of the cycloalkyl group are cited.

As the acyl group represented by $R_1$ to $R_5$, an unsubstituted acyl group having 2 to 8 carbon atoms is applicable; the hydrocarbon group of the acyl group includes an alkyl group, an alkenyl group and an alkynyl group. The substituent further may have a substituent. As the preferable substituent, groups the same as those capable of being the substitute of the cycloalkyl group are cited.

As the carbonyloxy group represented by $R_1$ to $R_5$, an unsubstituted acyloxy group having 2 to 8 carbon atoms is applicable; the hydrocarbon group of the acyl group includes an alkyl group, an alkenyl group and an alkynyl group. An arylcarbonyloxy group such as a benzoyloxy group is also cited. The substituent further may have a substituent. As the preferable substituent, groups the same as those capable of being the substitute of the cycloalkyl group are cited.

The oxycarbonyl group represented by $R_1$ to $R_5$ is an alkoxycarbonyl group such as a methoxycarbonyl group, an ethoxycarbonyl group and propyloxycarbonyl group, and an aryloxycarbonyl group such as a phenoxycarbonyl group. The substituent further may have a substituent. As the preferable substituent, groups the same as those capable of being the substitute of the cycloalkyl group are cited.

The oxycarbonyloxy group represented by $R_1$ to $R_5$ is an alkoxycarbonyloxy group having 1 to 8 carbon atoms such as a methoxcarbonyloxy group. The substituent further may have a substituent. As the preferable substituent, groups the same as those capable of being the substitute of the cycloalkyl group are cited.

Any ones of $R_1$ to $R_5$ may be form a ring structure by bonding with together.

The bonding group represented by L is substituted or unsubstituted alkylene group, an oxygen atom or a direct bond. As the alkylene group, a methylene group, an ethylene group and a propylene group are cited. These groups may be substituted by the substituted cited as groups capable of substituting to the foregoing groups represented by $R_1$ to $R_5$.

Among them, the direct bond and an aromatic carboxylic acid is particularly preferable as the bonding group represented by L.

As the organic acid represented by Formula 1 constituting the ester compound usable as the plasticizer in the invention, ones having an alkoxy group, an acyl group, an oxycarbonyl group, a carbonyloxy group or an oxycarbonyloxy group are preferable. Compounds having plural substituents are also preferable.

In the invention, the organic acid substitutable with the hydroxyl groups of the tri- or more-valent alcohol may be single kind or plural kinds.

As the tri- or more-valent alcohol compound for forming a polyvalent alcohol ester compound by reacting with the organic acid represented by Formula 1 is preferably a polyvalent alcohol having 3 to 20 carbon atoms. In the invention, the tri- or more-valent alcohol is preferably ones represented by the following Formula 3.

$$R'—(OH)_m \qquad \text{Formula 3}$$

In the formula, R' is an m-valent organic group, m is an integer of 3 or more and OH is an alcoholic hydroxyl group. A polyvalent alcohol in which m is 3 or 4 is particularly preferable.

As examples of the polyvalent alcohol, the following can be cited but the invention is not limited to them. The examples include adonitol, arabitol, 1,2,4-butanetriol, 1,2,3-hexanetriol, 1,2,6-hexanetriol, glycerol, diglycerol, erythritol, pentaerythritol, dipentaerythritol, tripentaerythritol, galactitol, inositol, mannitol, 3-methylpentane-1,3,5-triol, pinacol, sorbitol, trimethylolpropane and xylitol. Glycerol, trimethylolethane, trimethylolpropane and pentaerythritol are particularly preferable.

The ester of the organic acid represented by Formula 1 and the poly-valent alcohol of tri- or more-valent can be synthesized by a know method. A method in which the organic acid represented by Formula 1 and the polyvalent alcohol are condensed in the presence of acid for esterification, a method in which the organic acid is previously converted to acid chloride or acid anhydride and then made to react with the polyvalent alcohol and a method in which a phenyl ester of the organic acid is made to react with the polyvalent alcohol, are applicable. It is preferable to select suitable method giving high yield according to the objective ester compound.

Compounds represented by the following Formula 2 are preferable as the plasticizer of the ester of the organic acid represented by Formula 1 and the tri- or more-valent alcohol.

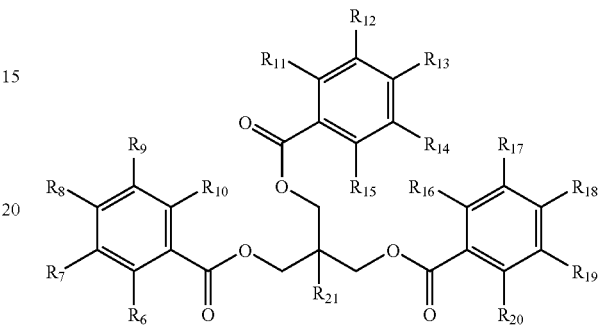

Formula 2

In the formula, $R_6$ to $R_{20}$ each represents a hydrogen atom, a cycloalkyl group, a cycloalkyl group, an aralkyl group, an alkoxy group, a cycloalkoxy group, an aryloxy group, an aralkyloxy group, an acyl group, a carbonyloxy group, an oxycarbonyl group or an oxycarbonyloxy group, which may have further a substituent. $R_{21}$ is a hydrogen atom or an alkyl group.

The groups the same as those represented by $R_1$ to $R_5$ are applicable as the cycloalkyl group, cycloalkyl group, aralkyl group, alkoxy group, cycloalkoxy group, aryloxy group, aralkyloxy group, acyl group, carbonyloxy group, oxycarbonyl group and oxycarbonyloxy group, represented by $R_6$ to $R_{20}$.

The molecular weight of thus obtained polyvalent alcohol ester is preferably from 300 to 1,500 and more preferably from 400 to 1,000 though the molecular weight is not specifically limited. A larger molecular weight is preferable since the compound is difficulty volatized and a smaller molecular weight is preferable from the view points of moisture permeation and the compatibility with cellulose ester.

Concrete examples of the polyvalent alcohol ester relating to the invention are listed below.

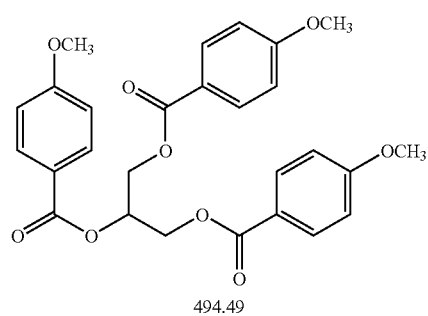

1

494.49

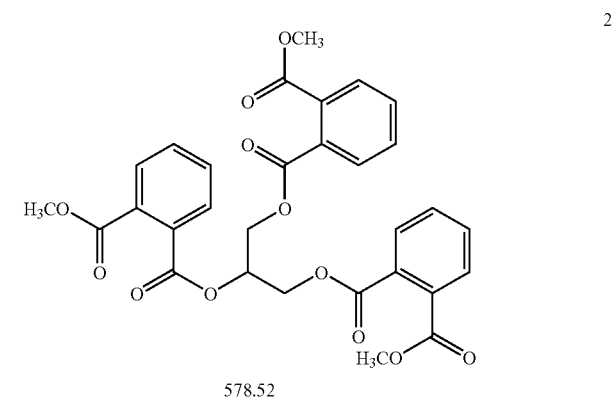

2

578.52

-continued
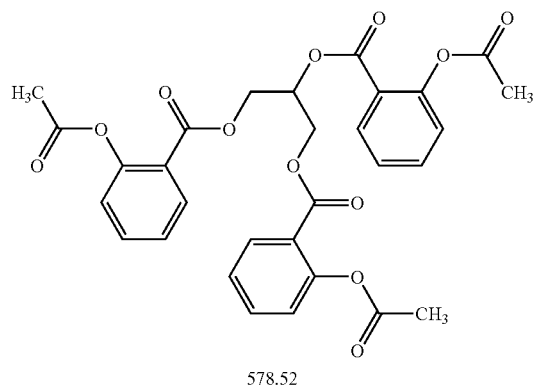
578.52
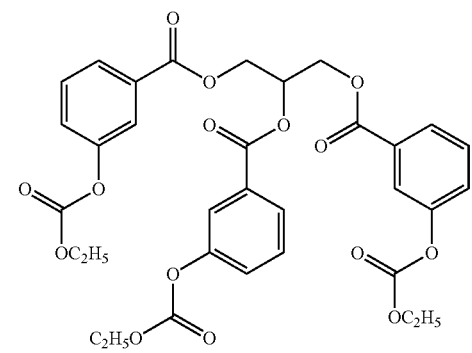
668.60
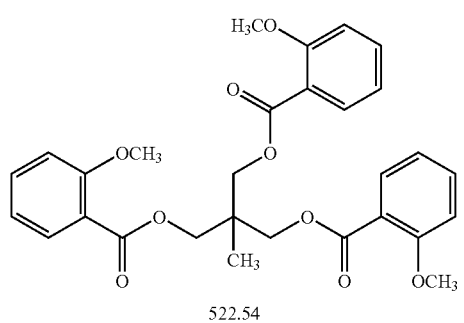
522.54
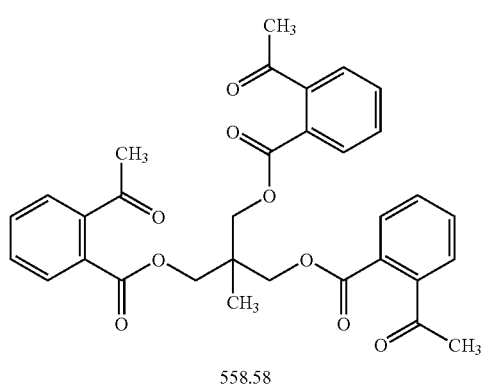
558.58
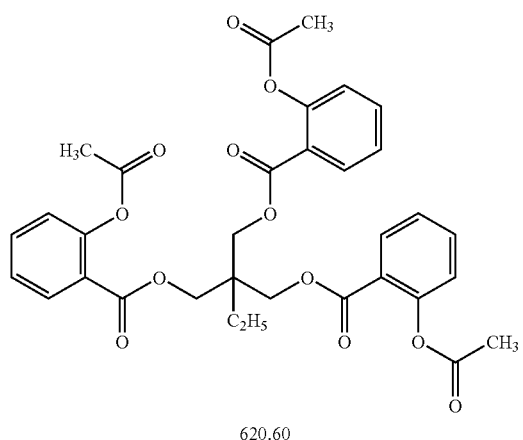
620.60
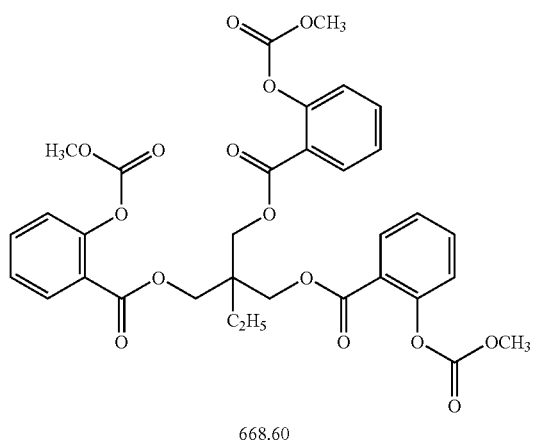
668.60
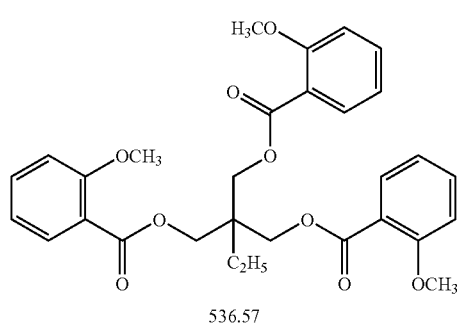
536.57
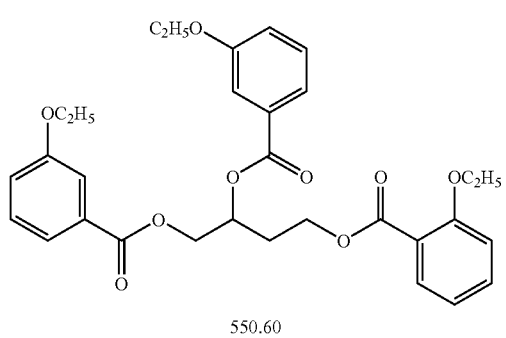
550.60

-continued
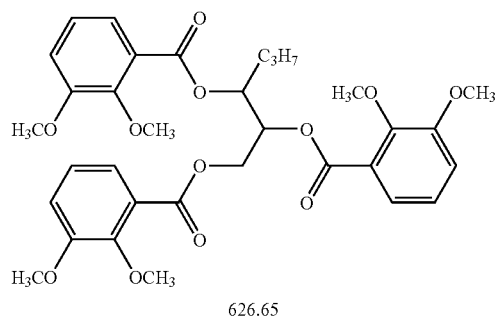
626.65
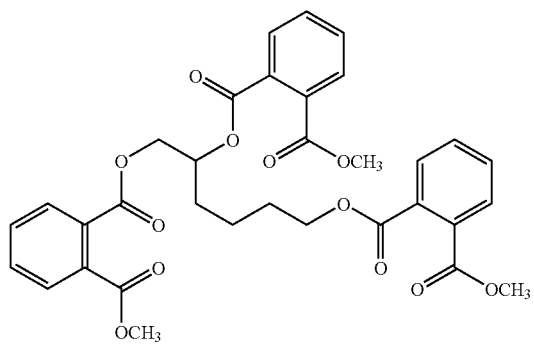
620.60
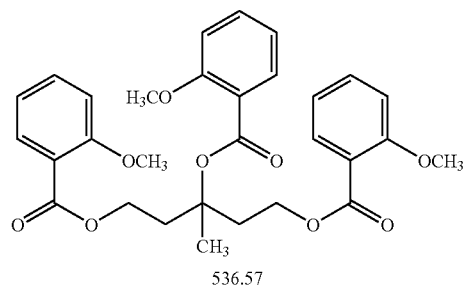
536.57
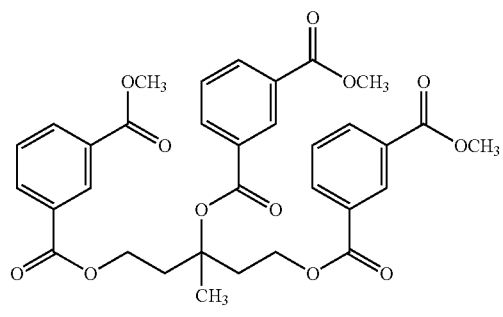
620.60
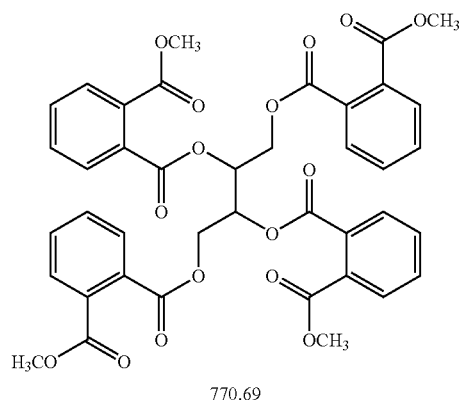
770.69
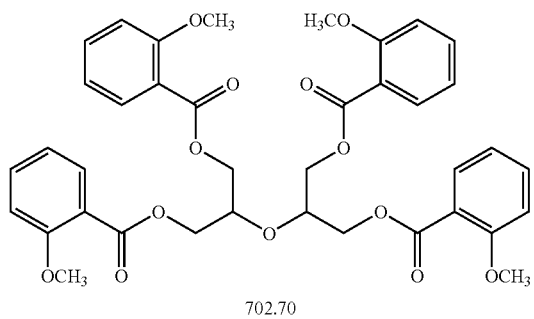
702.70
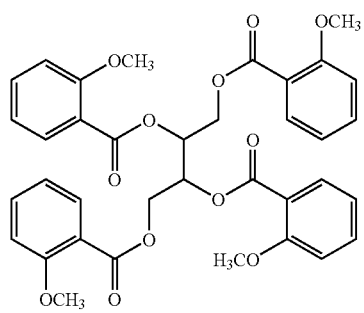
658.65
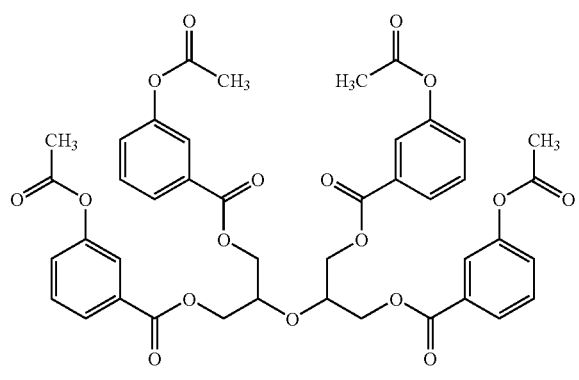
814.74

-continued
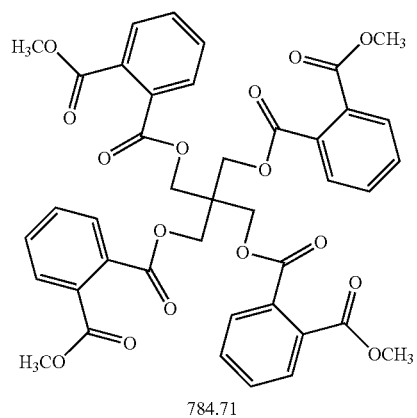
784.71
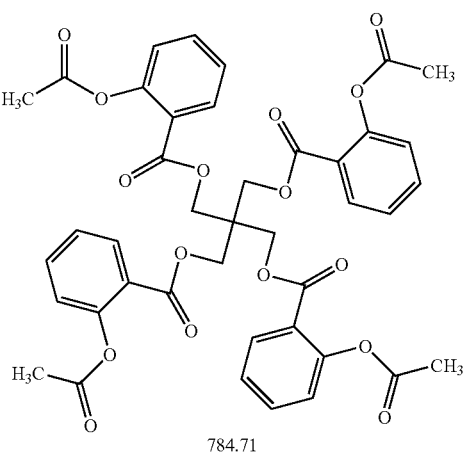
784.71
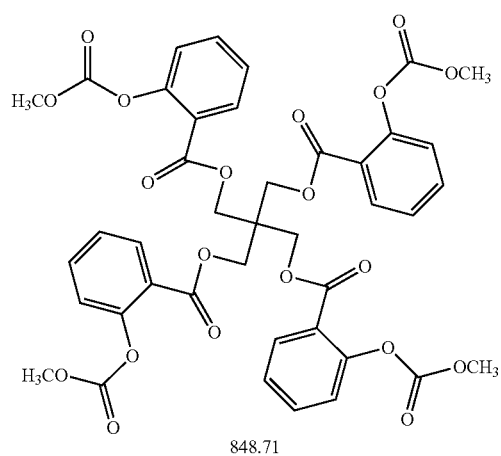
848.71
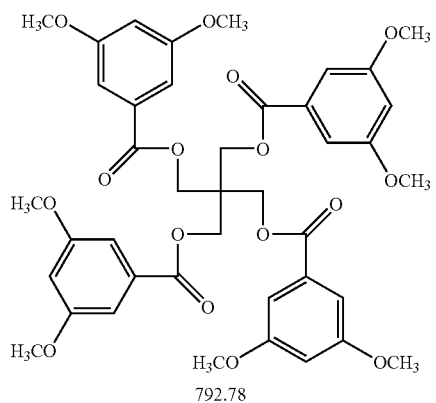
792.78
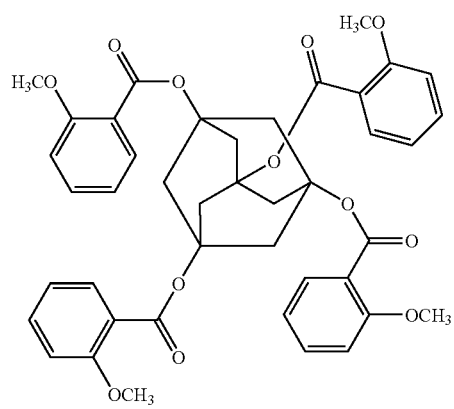
736.76
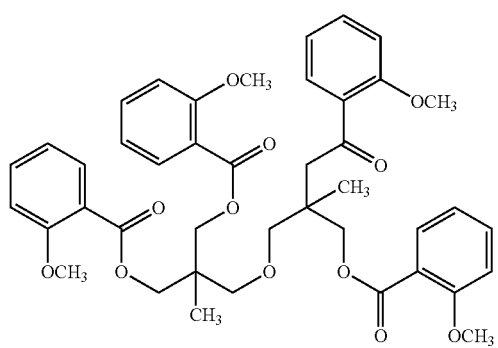
742.81

-continued
25
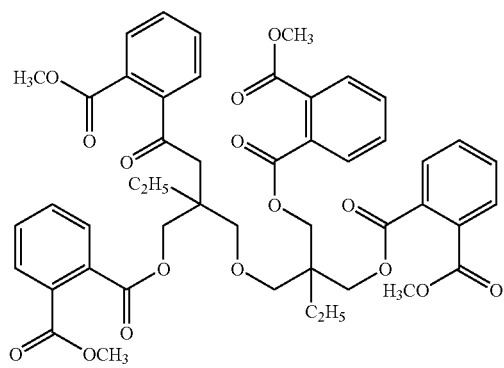
882.90
26
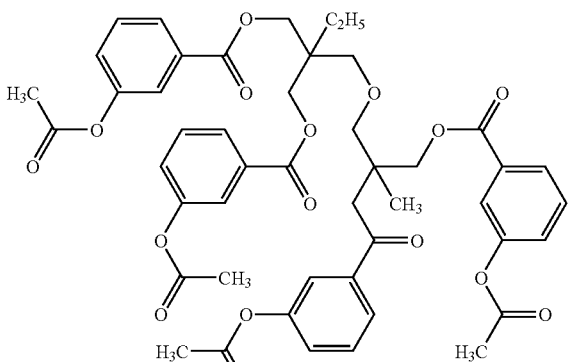
868.87
27
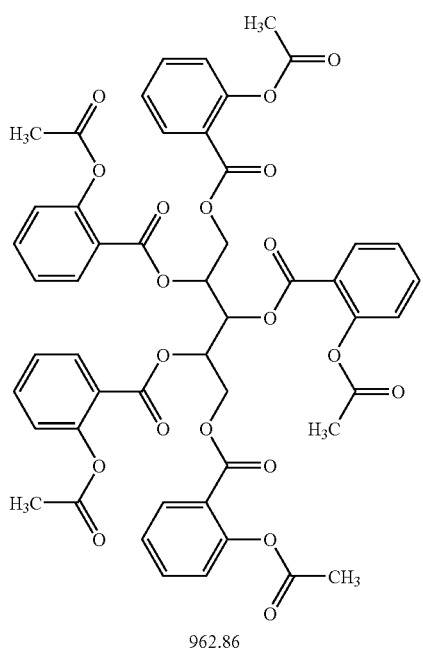
962.86
28
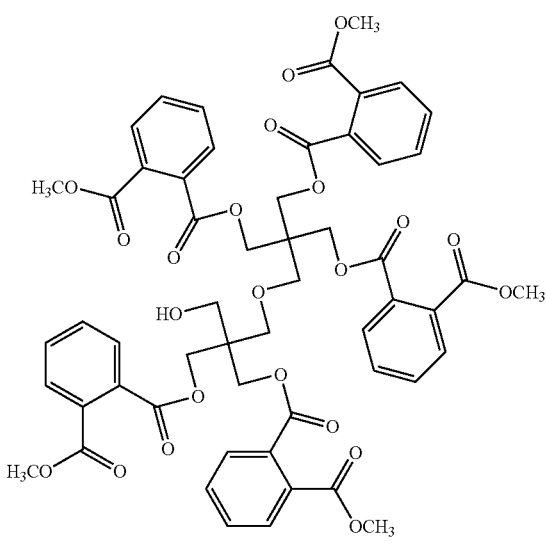
1064.99
29
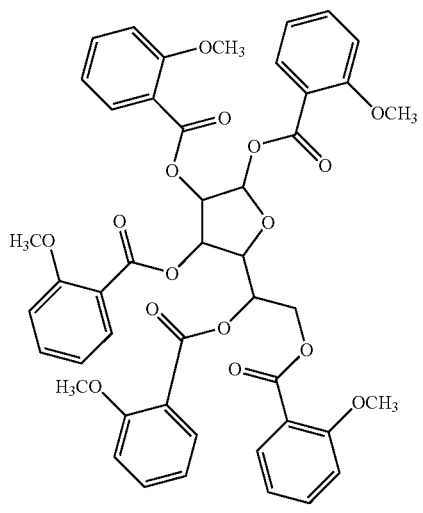
850.82
30
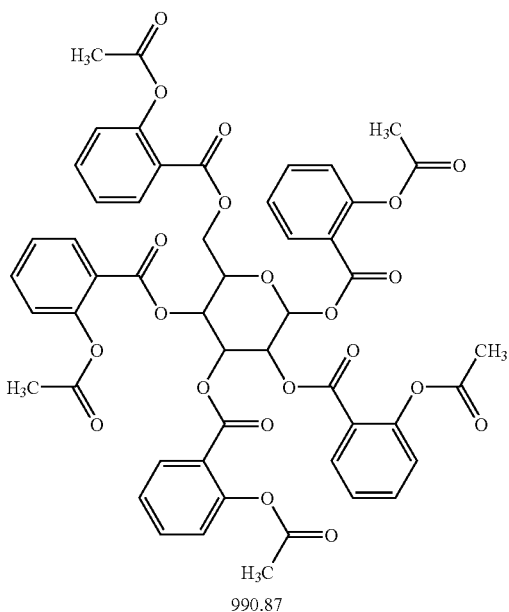
990.87

-continued
31
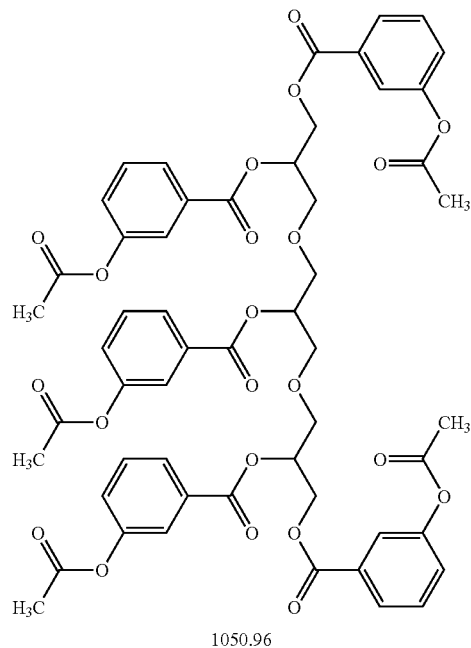
1050.96
32
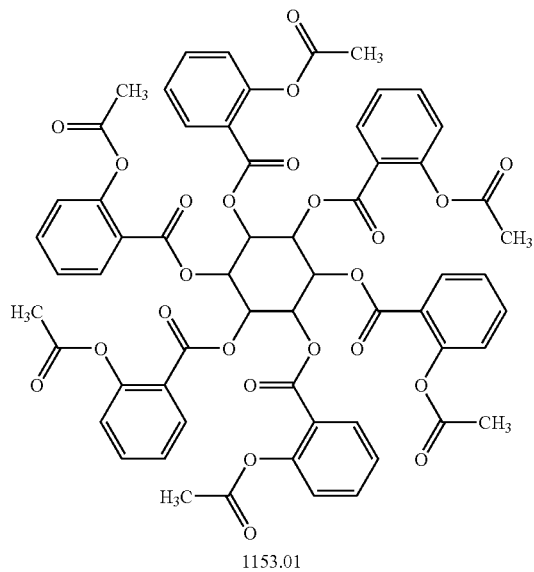
1153.01
33
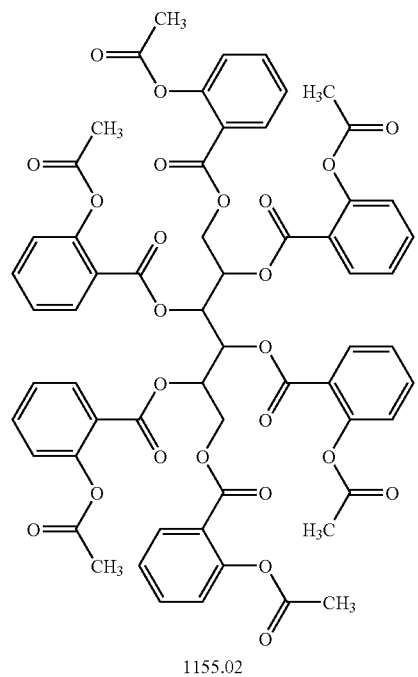
1155.02
34
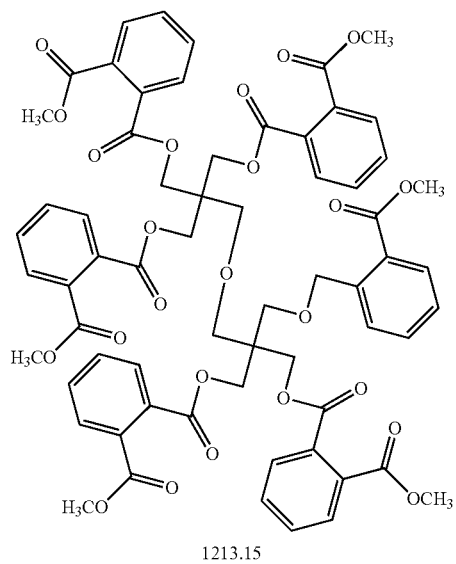
1213.15

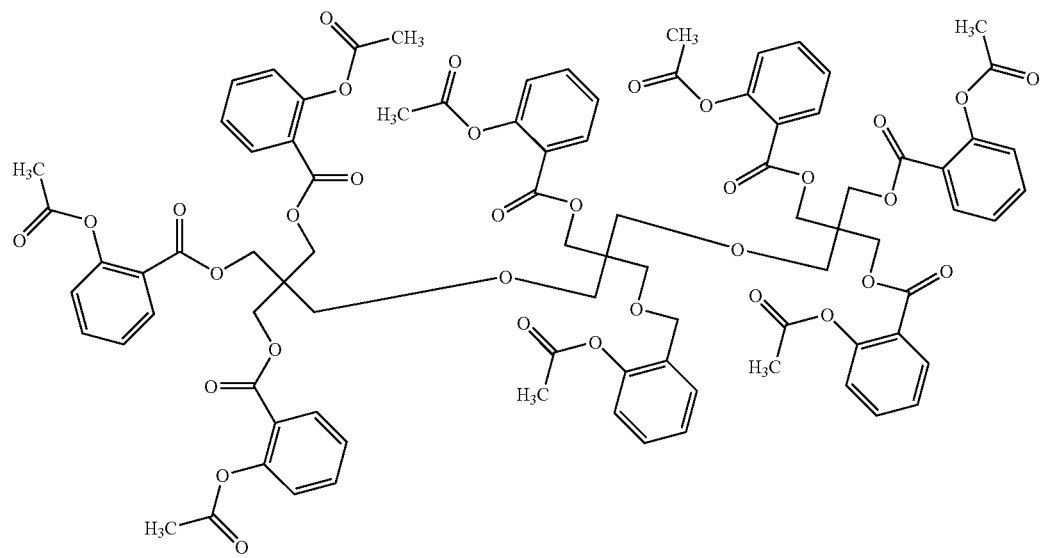
35
1669.59
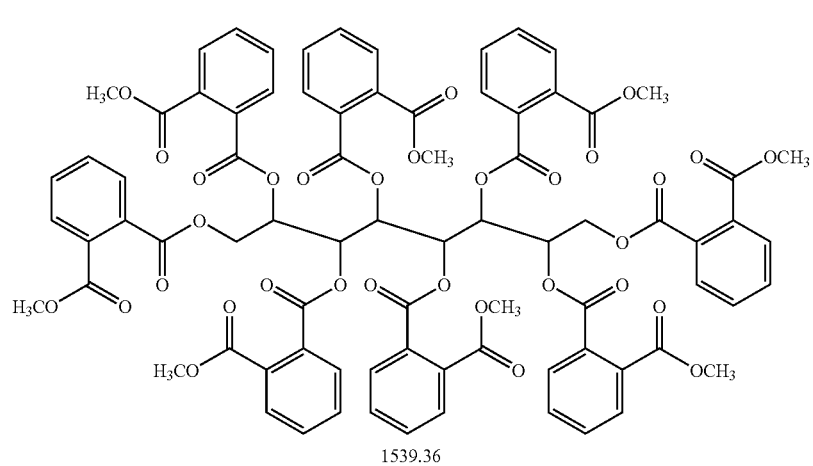
36
1539.36
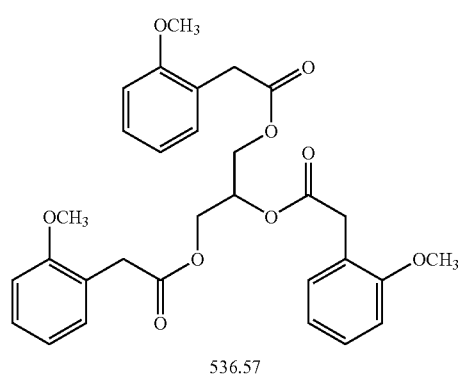
37
536.57
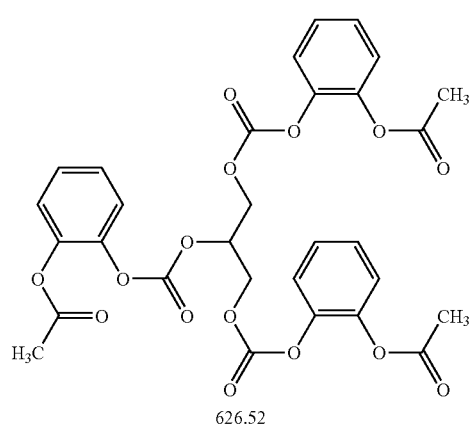
38
626.52

-continued
39
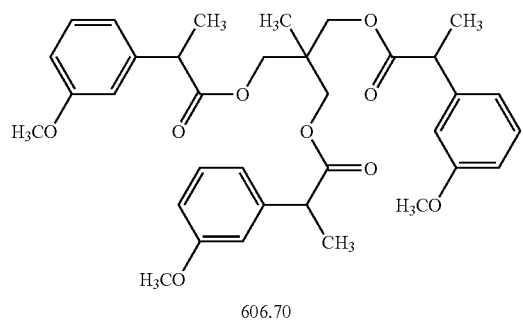
606.70
40
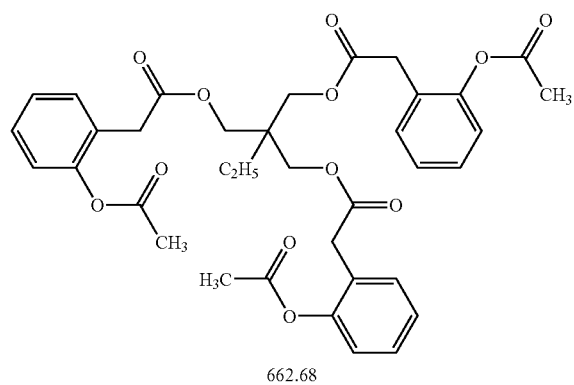
662.68
41
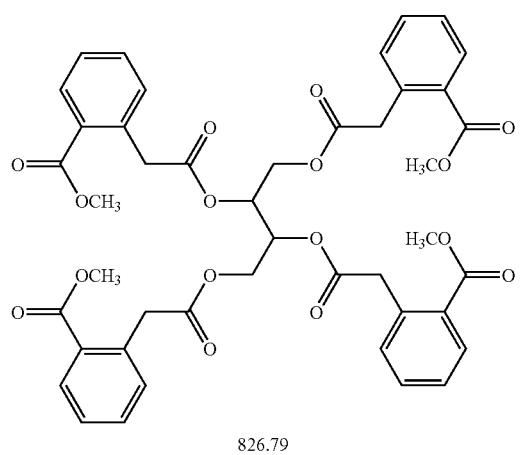
826.79
42
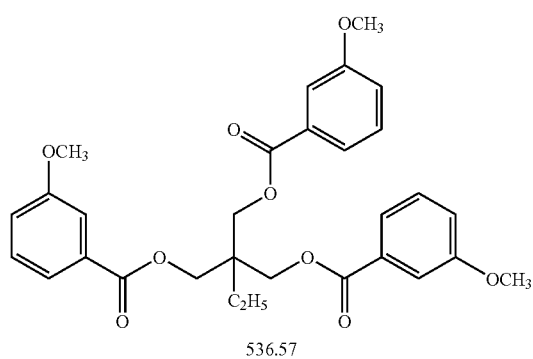
536.57
43
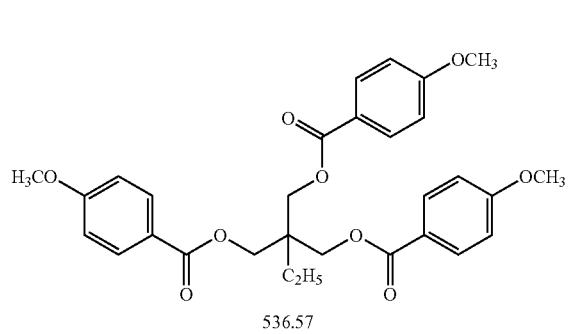
536.57
44
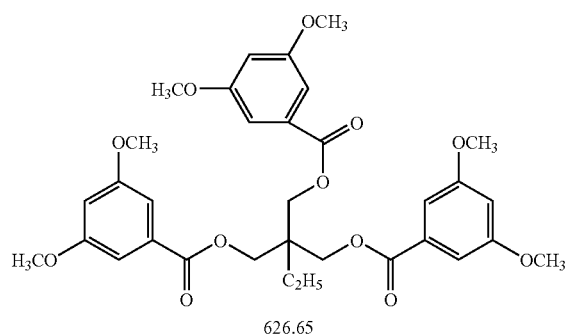
626.65
45
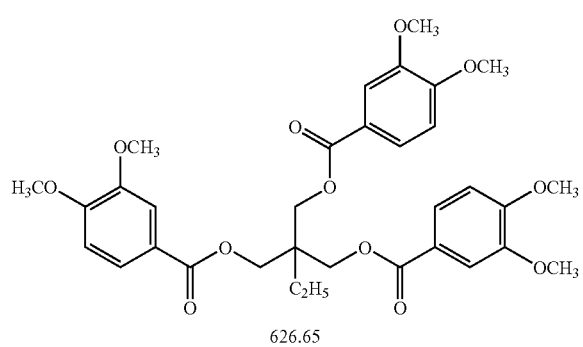
626.65
46
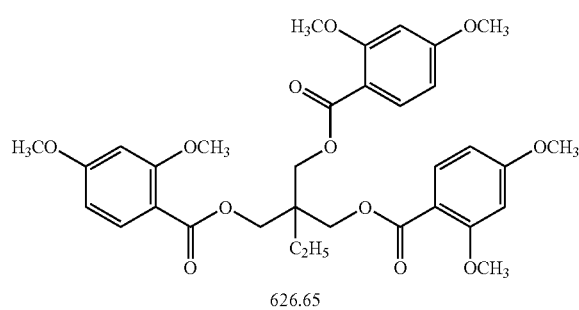
626.65

-continued
47
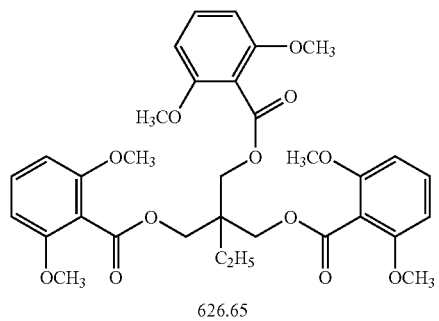
626.65
48
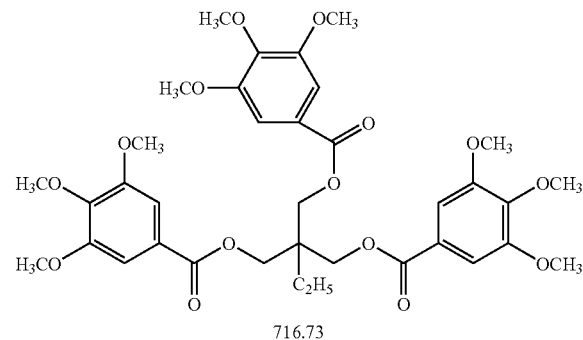
716.73
49
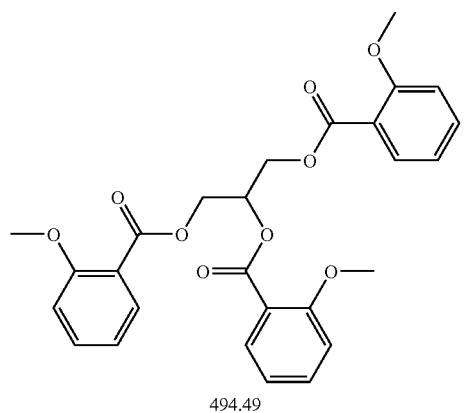
494.49
50
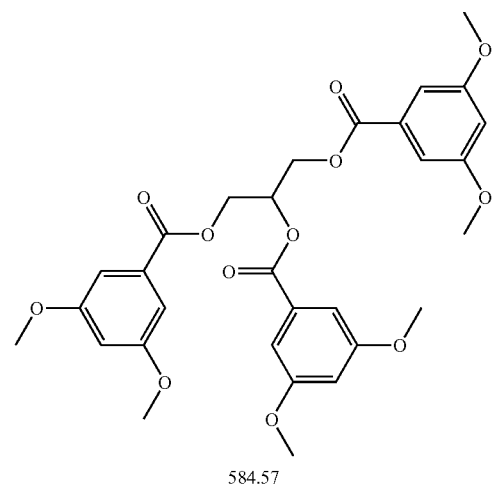
584.57
51
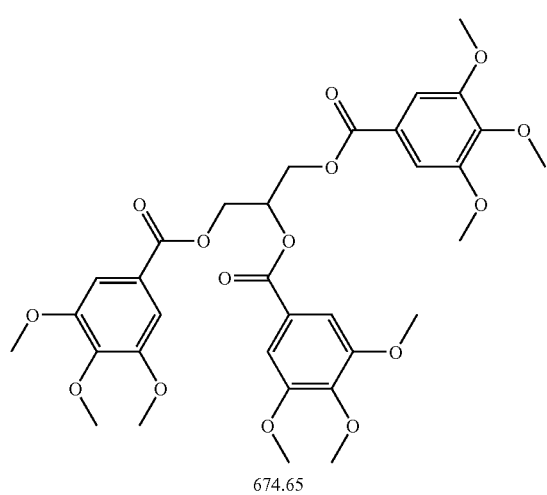
674.65
52
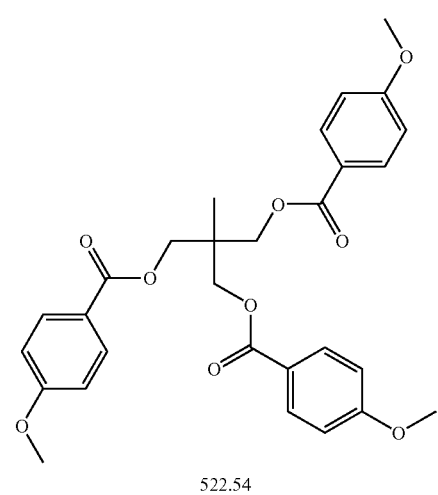
522.54

-continued
53
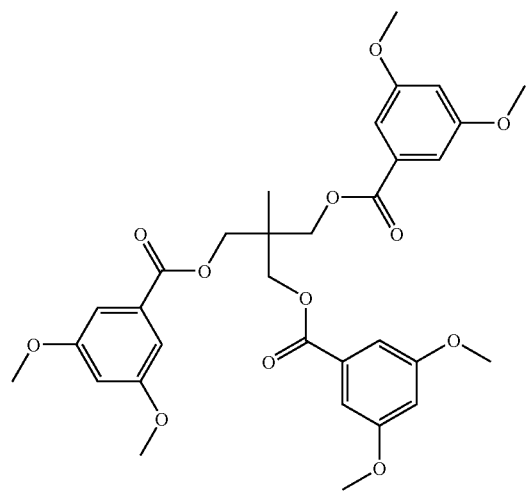
612.62
54
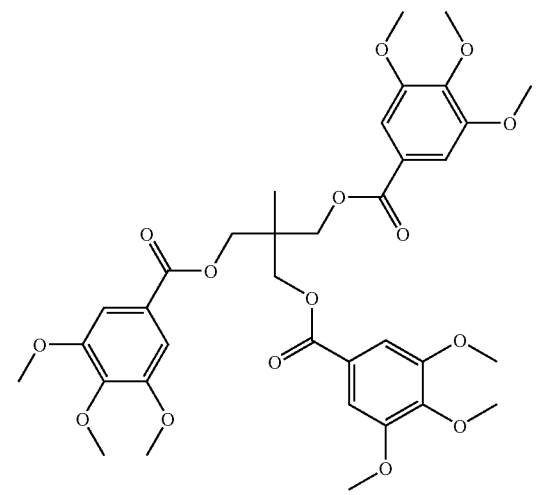
702.70
55
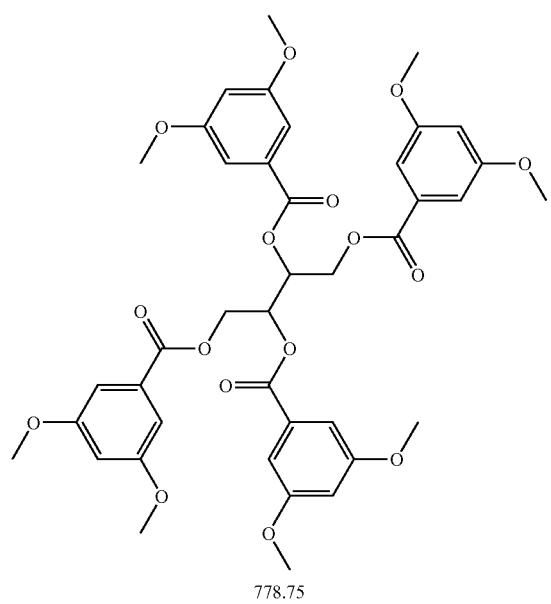
778.75
56
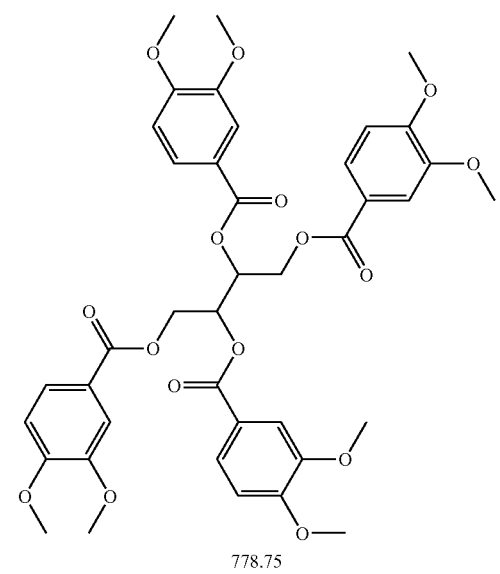
778.75
57
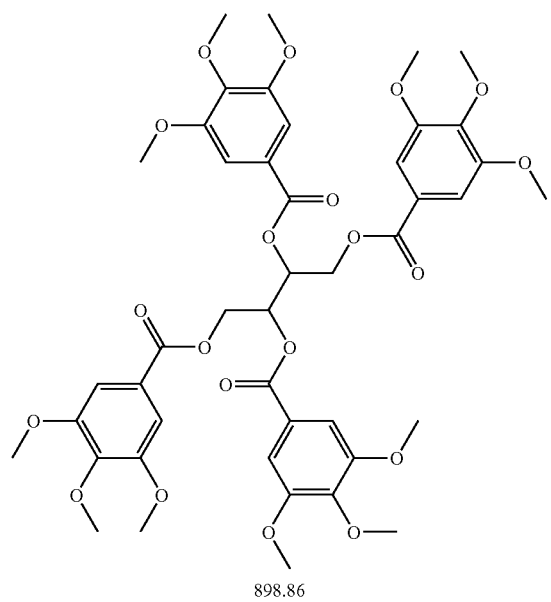
898.86
58
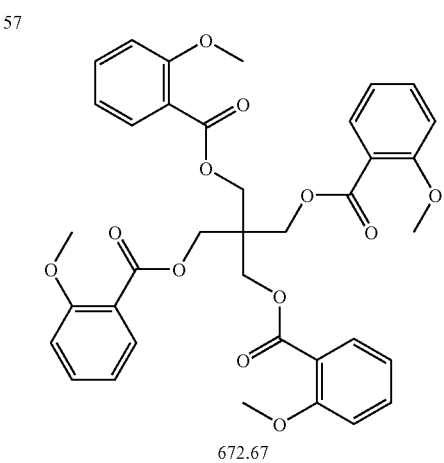
672.67

-continued
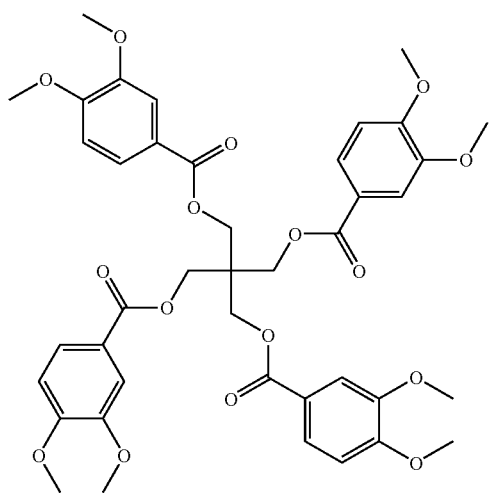
59
792.78
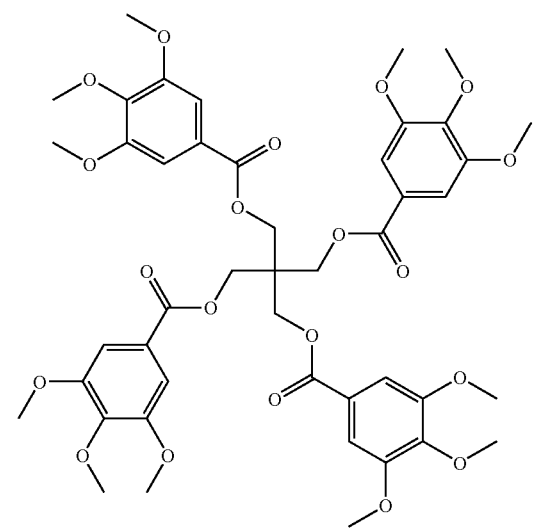
60
912.88
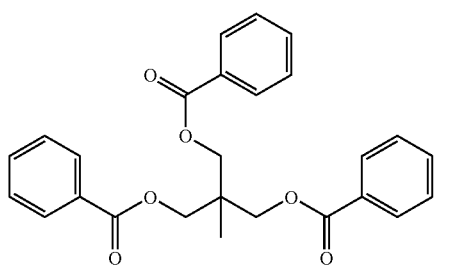
61
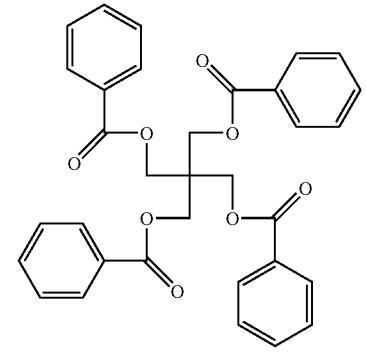
62
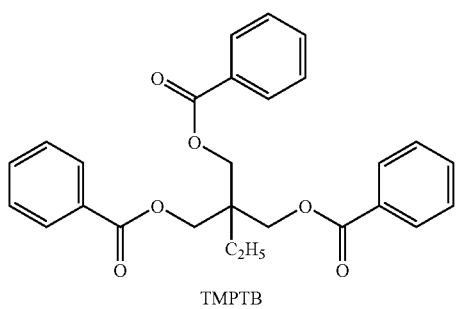
TMPTB
PETB
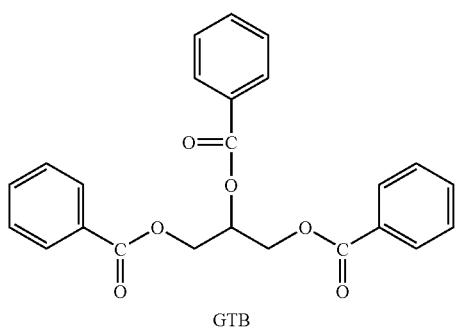
GTB It is preferable in the production of the optical film that the ester compound prepared from the organic acid represented by Formula 1 and the tri- or more-valent alcohol is contained as the plasticizer may be used in combination with another plasticizer.

The ester compound composed of the organic acid represented by Formula 1 and the tri- or more-valent alcohol has high compatibility with the cellulose ester and can be added at high adding ratio. Therefore, bleed out is not caused even when another plasticizer or additive is added, therefor the other kind of plasticizer and additive easily can be added according to necessity.

The other plasticizer which can be used in the invention is not specifically limited and is preferable to be selected from a polyvalent carboxylic acid ester type plasticizer, a glycolate type plasticizer, a phthalate type plasticizer, a fatty acid ester type plasticizer and a polyvalent alcohol ester type plasticizer though such the plasticizer is not specifically limited. When two or more kinds of plasticizer are used, at least one of them is preferably the polyvalent alcohol type plasticizer.

<<Retardation Controlling Agent>>

It is allowed that a liquid crystal layer is provided by forming an orientation layer on the optical film and the resultant film is treated to produce a polarization plate having the optical compensation ability by giving the retardation by combining the retardation derived from the optical film and that from the liquid crystal layer. Other than the above, a compound for controlling the retardation other than the compound represented by Formula B may be added to the cellulose ester film.

As the compound for controlling the retardation, an aromatic compound having two aromatic rings such as those described in European Patent 911,656A2 can be used.

It is allowed to use two or more kinds of aromatic compounds. Examples of the aromatic ring of the aromatic compound include an aromatic heterocyclic ring additionally to the aromatic hydrocarbon ring. The heterocyclic ring is particularly preferable and the heterocyclic ring is generally an unsaturated heterocyclic ring. Among the heterocyclic rings, a compound having a 1,3,5-triazine ring is particularly preferred.

The haze value of the optical film according to this invention is preferably less than 1% and more preferably less than 0.5%, since a haze of more than 1 influences on the properties of optical film. The haze value can be measured according to JIS K 7136.

<<Colorant>>

A colorant is preferably used in the invention. The colorant means a dye and a pigment, and the colorant is ones having an effect of making the image on the liquid crystal display to bluish tone, controlling the yellow index or lowering the haze in this invention.

An anthraquinone dye, an azo dye and a phthalocyanine pigment are effectively usable though various dyes and pigments can be used as the colorant. The concrete examples of preferable colorant are shown below.

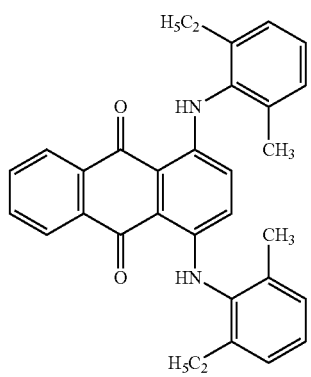

CR-1

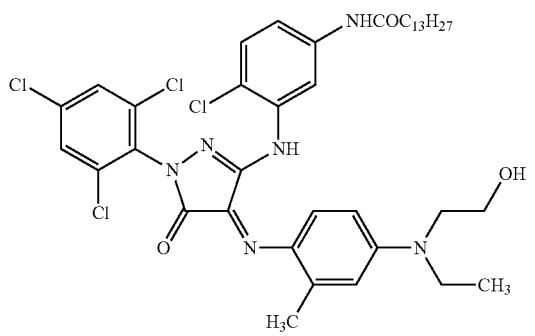

CR-2

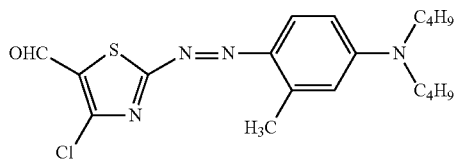

CR-3

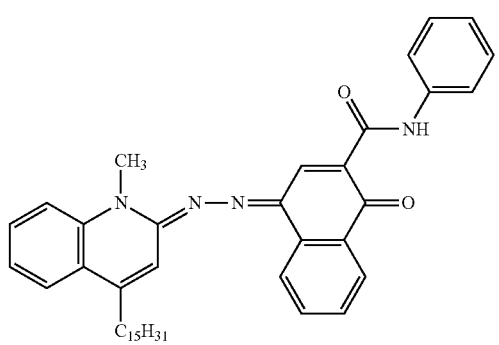

CR-4

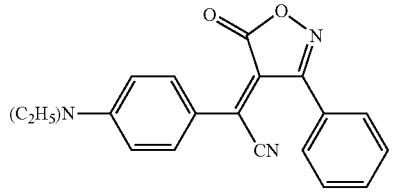

CR-5

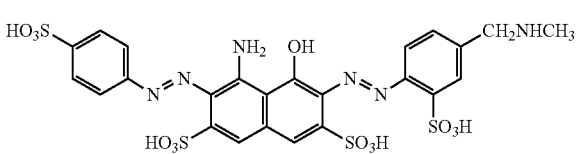

CR-6

CR-7
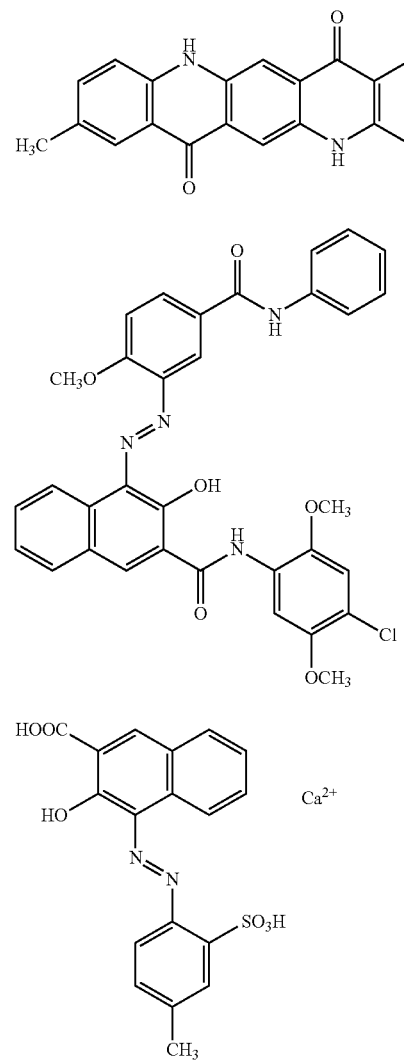
CR-8
CR-9
CR-10
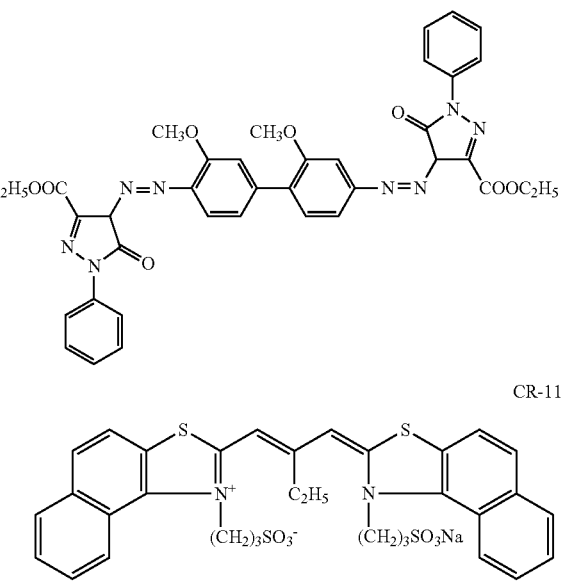
CR-11
CR-12
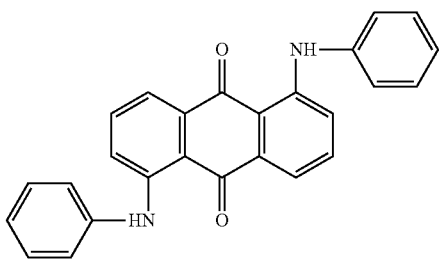
CR-13
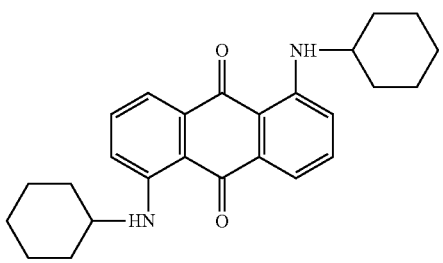
CR-14
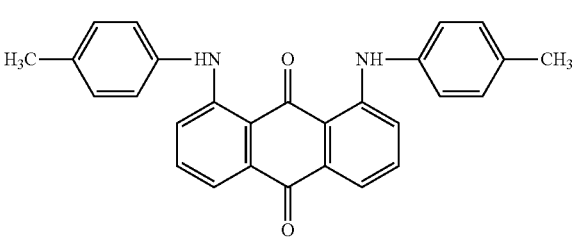
CR-15
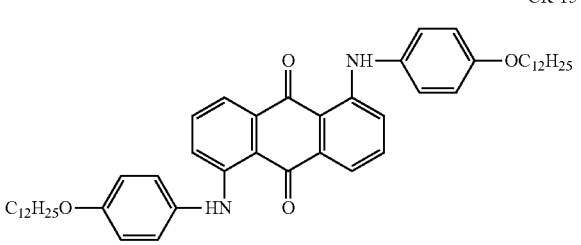
CR-16
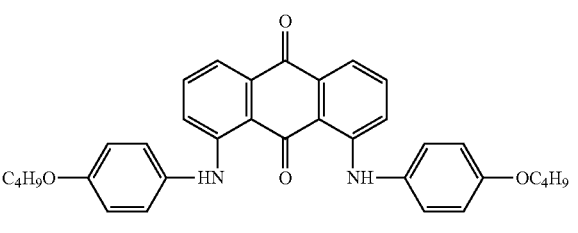
CR-17
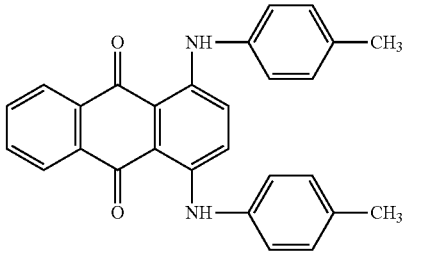

CR-18
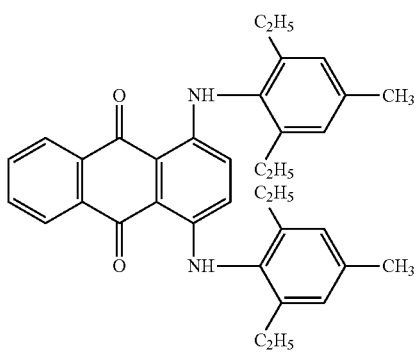

CR-19
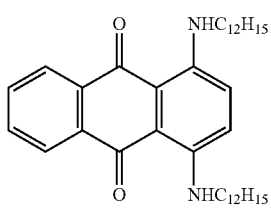

CR-20
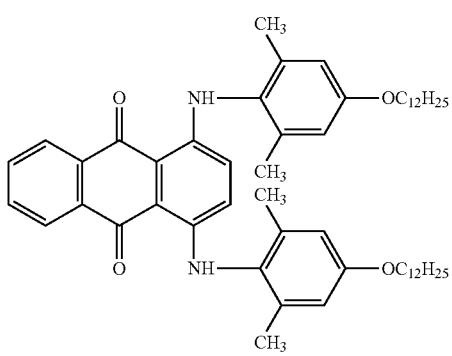

CR-21
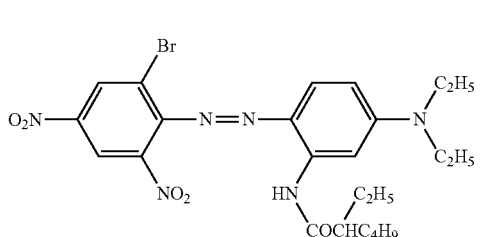

CR-22
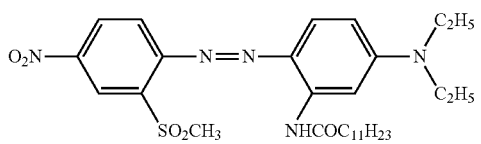

CR-23
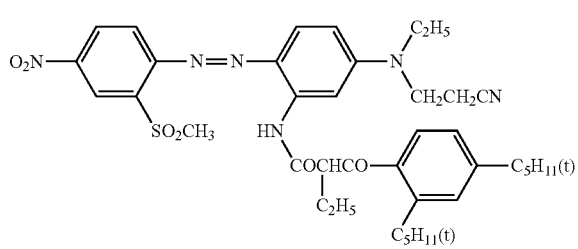

CR-24
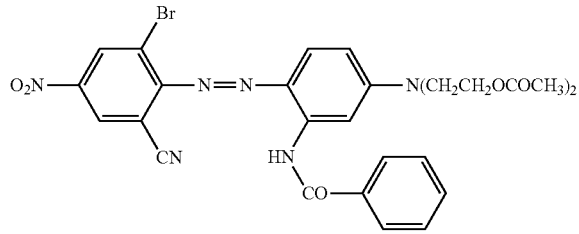

CR-25
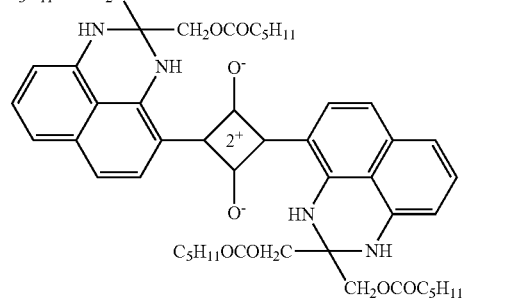

CR-26
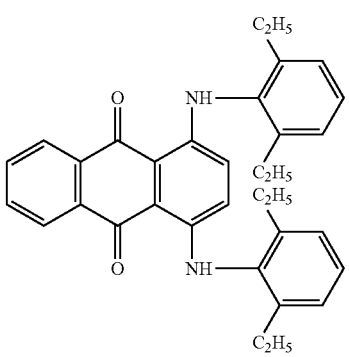

The adding amount of the colorant can be suitably selected according to the purpose, and preferably used from 0.1 to 100 ppm, more preferably from 0.5 to 20 ppm, and most preferably from 1 to 10 ppm, of the cellulose ester film.

<Formation of Cellulose Ester Film by Melt-casting Method>

It is required that occurrence of volatile component is slight or not in the melting and film formation processes to the raw materials of the optical film such as the cellulose ester, sugar ester compound, acryl type polymer, plasticizer and another additive because that is necessary for inhibiting or avoiding defects in the film of degradation of the surface flatness caused by occurrence of bubbles on the occasion of heating and melting of the raw materials.

The content of the volatile ingredient on the occasion of meting the film constitution materials is not more than 1%, preferably not more than 0.5%, further preferably not more than 0.2%, and still more preferably not more than 0.1%, by weight. The content of the volatile ingredient is determined by the weight reducing caused by heating from 30° to 250° C. measured by using a differential thermogravimeter TG/DTA200, manufactured by Seiko Electronics Inc.

The volatile ingredients such as the moisture and the solvent are preferably removed before the film formation or in the heating process. The volatile ingredient can be removed by a known method such as a heating method, a vacuum method and a vacuum heating method, and the removing treatment may be carried out under atmosphere of air or nitrogen gas as an inert gas. It is preferable for quality of the film that the drying treatment by the known method is carried out at a temperature range in which the film constitution materials are not decomposed.

The occurrence of the volatile ingredients can be reduced by drying before the film formation. The film constitution materials may be separated for drying into the resin and a mixture or a compatibly mixed matter of one or more kinds of the material other than the resin. The drying temperature is preferably not less than 70° C. When a material having glass transition point is contained in the materials to be dried, the drying point is preferably lower than the glass transition point because the materials are fused with together and made to be difficultly handled sometimes if the materials heated at a drying temperature higher than the glass transition point.

When plural materials each has glass transition point, the drying point is decided according to the lower glass transition point. The drying temperature is preferably not less than 70° C. and not more than (glass transition temperature −5° C.), and more preferably not less than 110° C. and not more than (glass transition temperature −20° C.). The drying time is preferably from 0.5 to 24, more preferably from 1 to 18, and further preferably from 1.5 to 12, hours.

When the drying temperature is too low, the removing ratio of the volatile ingredient is lowered and the time necessary for drying is excessively prolonged. The drying process may be separated into two or more steps, for example, the drying process may include a preliminary drying process for storing the materials and a drying process to be performed between just before to one week before of the film formation.

<<Melt-casting Method>>

The optical film is preferably produced by a melt-casting method. The method in which the materials are melted by heating without the use of the solvent such as methylene chloride used in a solution casting method can be classified in detail into a melt-extrusion method, a press-forming method, an inflation method, an extrusion method, a blow-forming method and a stretching-forming method. Among them, the melt-extrusion method is superior for obtaining a cellulose ester film excellent in the mechanical strength and the surface precision.

The film production method of the invention is described below according to the melt-extrusion method for example.

Figure 2:
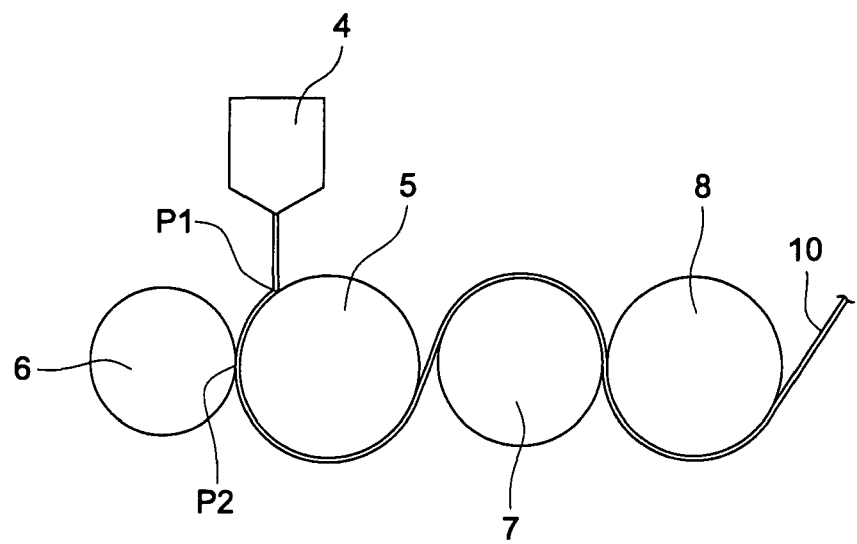
FIG. 2 shows an enlarged flow sheet of a principal part of the production equipment of FIG. 1.

FIG. 1 is a schematic flow sheet displaying the entire constitution of equipment for embodying the film production method of the cellulose ester film of the invention. FIG. 2 is enlarged drawing of the part of the casting die and the cooling roller.

In the production method of the cellulose ester film of FIGS. 1 and 2, the materials of film such as cellulose resin are mixed and melted and extruded onto a first cooling roller 5 through a extrusion die 4 by using a extruder 1 and then the melted material touched with the first cooling roller 5 is successively touched onto a second cooling roller 7, and a third cooling roller 8 for cooling and solidifying the material to form a film 10.

The film 10 peeled off by a peeling roller 9 is held at the both edge portions and stretched in the cross direction by a stretching apparatus 12 and then winded up by a winder 16. Moreover, a touching roller 6 for nipping the melted film to the surface of the first cooling roller 5 is provided.

The touching roller 6 has an elastic surface and forms a nipping portion between it and the first cooling roller 5. The detail of the touch roller 6 is described later.

The production method of the cellulose ester of the invention can be performed under the melt-extrusion condition similar to that applied for a thermoplastic resin such as polyester. It is preferable to previously dry the material. The drying is preferably carried out until the moisture content lowered by not more than 1,000 ppm and more preferably 200 ppm.

For example, cellulose ester type resin dried by hot air, vacuum or reduced pressure is melted at an extrusion temperature of from 200 to 300° C. using the extruder 1 and filtered by a leaf desk filter 2 for removing foreign matter.

It is preferable to prevent the oxidation decomposition of the materials by preventing the influence of oxygen or moisture by introducing the materials into the extruder 1 from a supplying hopper, not shown in the drawing, under vacuum, reduced pressure or inert gas atmosphere.

When the additive such as the plasticizer is not previously mixed, the additive may be kneaded at the half way of the extruder. A mixer such as a static mixer 3 is preferably used for uniformly mixing.

In the invention, it is preferable that the cellulose resin and an additive to be added according to necessity such as the plasticizer are previously mixed before the melting. It is more preferable that the cellulose resin is firstly mixed with a stabilizer. The mixing may be performed by a mixing machine or in the course of cellulose resin preparation as above mentioned. A V-type mixer, a usual mixer such as a conical screw type mixer, a horizontal cylinder type mixer, a Henschel mixer and a ribbon mixer is usable when the mixing machine is applied.

It is allowed that the film constitution materials are mixed and then directly melted by using the extruder 1 to form the film or the film constitution materials is once palletized and then melted in the extruder 1 to form the film. When the film constituting mixed material contains plural materials different from each other in the melting point, it is allowed that the mixed materials are once heated at a temperature at which the material having lower melting point is only melted so as to make a half-melted material in which the particles or powder of each of the components constituting the pellet are bonded by the melted material to form a half-melted material in a crunch chocolate-like state and then the half-melted material is put into the extruder 1 to form the film.

When a material easily decomposed by heat is contained, the method by directly forming the film without formation of the pellet or the method by forming the above crunch chocolate like half-melted material is preferably applied for reducing the time of melting process.

Various extruders available on the market can be used as the extruder 1, and a melt-kneading extruder is preferable which may be a mono-axial extruder or a bi-axial extruder. When the film is directly formed from the film constitution materials without formation of pellet, the bi-axial extruder is preferably used because suitable degree of kneading is necessary. However, the mono-axial extruder can be used since suitable kneading degree can be obtained by changing the shape of the screw to a kneading type screw such as Madoc type, unimelt type and Dulmadge type.

Both of the mono-axial and bi-axial extruders are also usable when the pellets or the crunch chocolate type half-melted material is used as the film constitution material.

The oxygen concentration in the extruder 1 and the cooling process after extrusion is preferably lowered by replacing by an inert gas such as nitrogen gas or reducing the air pressure.

The condition of the melting temperature of the film constitution materials in the extruder 1 is generally from the glass transition point Tg of the film to (Tg+100)° C. and preferable from (Tg+10)° C. to (Tg+90)° C. though the preferable condition is varied depending on the viscosity and the extruding amount of the film constitution materials and the thickness of the sheet to be formed. The viscosity of the melted material on the occasion of the extrusion is 10 to 100,000 pois and preferably from 100 to 10,000 pois.

The staying duration of the film constitution material in the extruder 1 is preferably shorter, and the duration is not more than 5 minutes, preferably not more than 3 minutes, and more preferably not more than 2 minutes. The staying duration can be reduced by controlling the supplying amount of the material and L/D (ratio of length to diameter of the screw), the rotation rate of the screw and the depth of the groove of the screw though the duration is influenced by the kind of extruder 1 and the extrusion condition.

The shape and rotation rate of the screw of extruder 1 is suitably decided according to the viscosity and extruding amount of the film constitution material. In the invention, the shearing rate in the extruder 1 is from 1/second to 10,000/second, preferably from 5/second to 1,000/second, and more preferably from 10/second to 100/second.

The extruder 1 to be used in the invention is available on the market as a common plastic formation machine.

The film constitution material extruded from the extruder 1 is transferred to the casting die 4 and extruded through the slit of the die in a form of film. The die 4 for producing a film or sheet can be used without any limitation.

As the material of the die 4, one sputtered or plated by hard chromium, chromium carbide, chromium nitride, titanium carbide, titanium carbide nitride, titanium nitride, super steel, ceramics such as tungsten carbide, aluminum oxide and chromium oxide, and treated on the surface by buffing, lapping by a grindstone of less than #1000 or shaving by a diamond grindstone of less than #1000 in the vertical direction to the flowing direction of resin, electro electrolytic polishing or electrolytic composite polishing is usable. The materials for the lip portion of the casting die 4 are the same as those for the casting die 4. The surface precision of the lip portion is preferably not more than 0.5 S and more preferably not more than 0.2 S.

Figure 3:
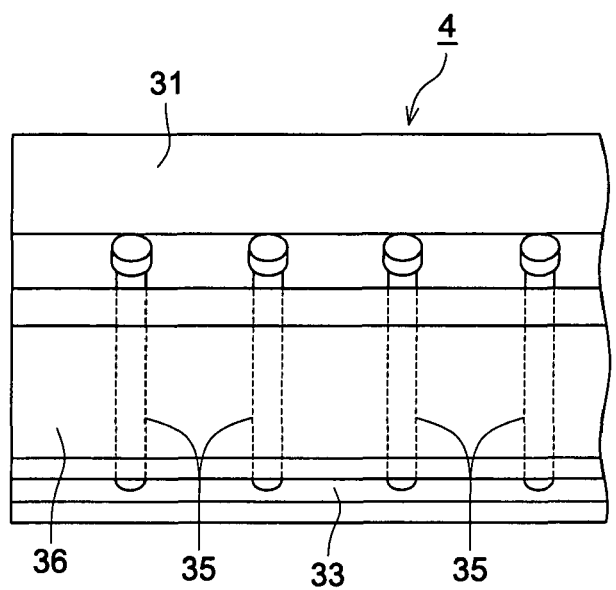
FIG. 3($a$) is the outlook of the principal part of a casting die and FIG. 3($b$) is the cross section of principal part of the casting die.
Figure 3:
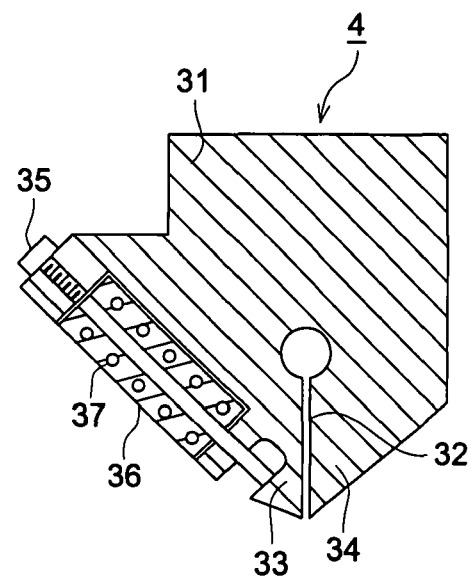

The slit of the casting die 4 is constituted so that the gap can be controlled. The constitution is displayed in FIG. 3. Among the pair of slit, one is a flexible lip 33 which has low rigidity and is easily deformed and the other is a fixed lip 34. Many heat bolts 35 are lined at a certain pitch in the cross direction of the lip 34 or along the direction of the length direction.

An electric heater 37 and a block having a cooling medium passageway are provided around the heat bolt 35 and each of the bolts 35 vertically passes through each of the blocks 36. The basic portion of the heat bolt 35 is fixed to the main body of the die 31 and the pointed top of the bolt is contacted onto the outer surface of the flexible lip 33.

The thickness of the film is controlled by deforming the flexible lip by expansion and contraction of the heat bolt 35 by rising and lowering of the temperature of the heating bolt by controlling power input to the electric heater 37 while constantly cooling the block 36 by air. It is possible to controlling the input power of ratio of turning on of the heater of the heat bolt by that a thickness meter is provided at a suitable position in the downstream of the die and the thickness of the web detected by the thickness meter is feedback to the controlling apparatus and the measured thickness is compared with the designated thickness information to generate compensation controlling signals.

The heat bolt preferably has a length of from 20 to 40 cm and a diameter of 7 to 14 mm and plural, for example several tens, of bolts are lined preferably at a pitch of from 20 to 40 mm. A gap controlling member principally composed of controlling bolts may be provided in stead of the heat bolts; the slit gap is controlled by moving the controlling bolts by hand to back and forth in the axis direction. The slit gap adjusted by the gap controlling member is usually from 200 to 1,000 μm and more preferably 400 to 600 μm.

The first to third cooling rollers are each made from a seamless steel tube which is finished as mirror surface at the surface thereof. Piping for passing cooling liquid is provided at the interior of the tube so that the heat from the film on the roller can be absorbed by the cooling liquid flowing in the piping.

The touching roller 6 touching with the first cooling roller 5 has elastic surface and is deformed corresponding to the surface of the first cooling roller 5 by pressure to the first cooling roller so as to form a nip between the first cooling roller 5.

Figure 4:
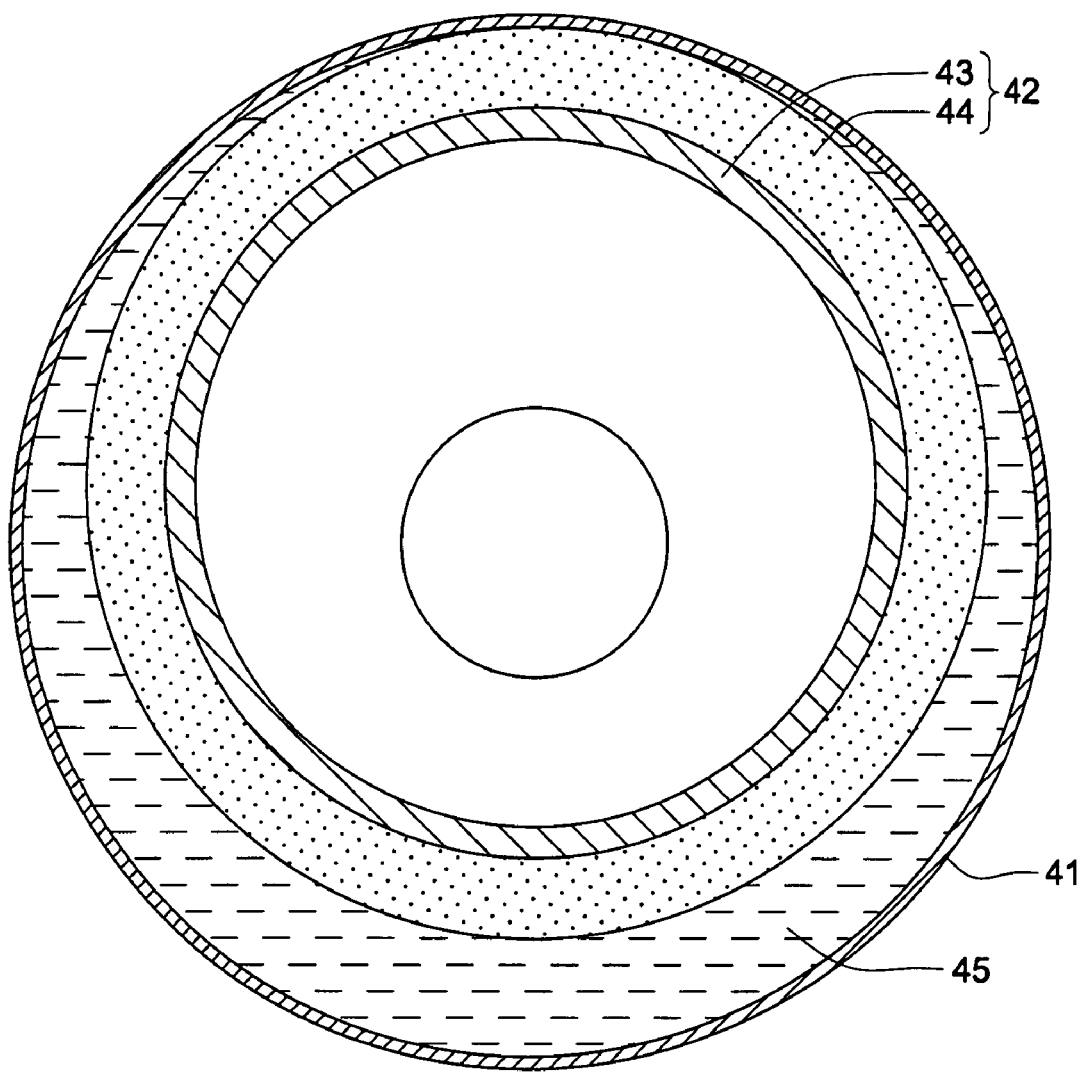
FIG. 4 shows the cross section of the first embodiment of the nip-rotating member.

FIG. 4 shows a schematic cross section of an embodiment the touch roller 6, hereinafter referred to as touch roller A. As is shown in drawing, the touch roller A comprises a flexible metal sleeve 41 and an elastic roller 42 provided in the metal sleeve.

The metal sleeve 41 is made from stainless steel having a thickness of 0.3 mm and has flexibility. Thickness too low causes insufficient strength and that too high causes insufficient elasticity. Therefore, the thickness of the metal sleeve is preferably from 0.1 to 1.5 mm. The elastic roller 42 is one made by providing an elastic layer 44 on the surface of an inner cylinder 43 to form a roller in which the inner cylinder is rotatable through a bearing.

When the touch roller A is pressed to the first cooling roller 5, the metal sleeve 41 is pressed by the elastic roller 42 to the first cooling roller 5, and the metal sleeve 41 and the elastic roller 42 are deformed according to the shape of the first cooling roller 5 to form the nip portion between the first cooling roller 5. In the metal sleeve 41, cooling water is flowed in the space formed between the metal sleeve 41 and the elastic roller 42.

Figure 5:
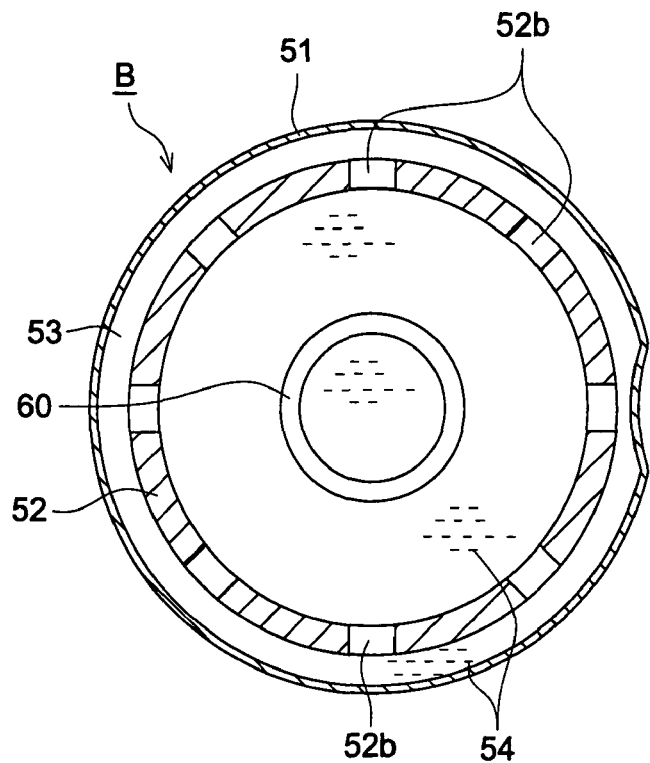
FIG. 5 shows the cross section at a plane vertical to the rotating axis of the second embodiment of the nip-rotating member.
Figure 6:
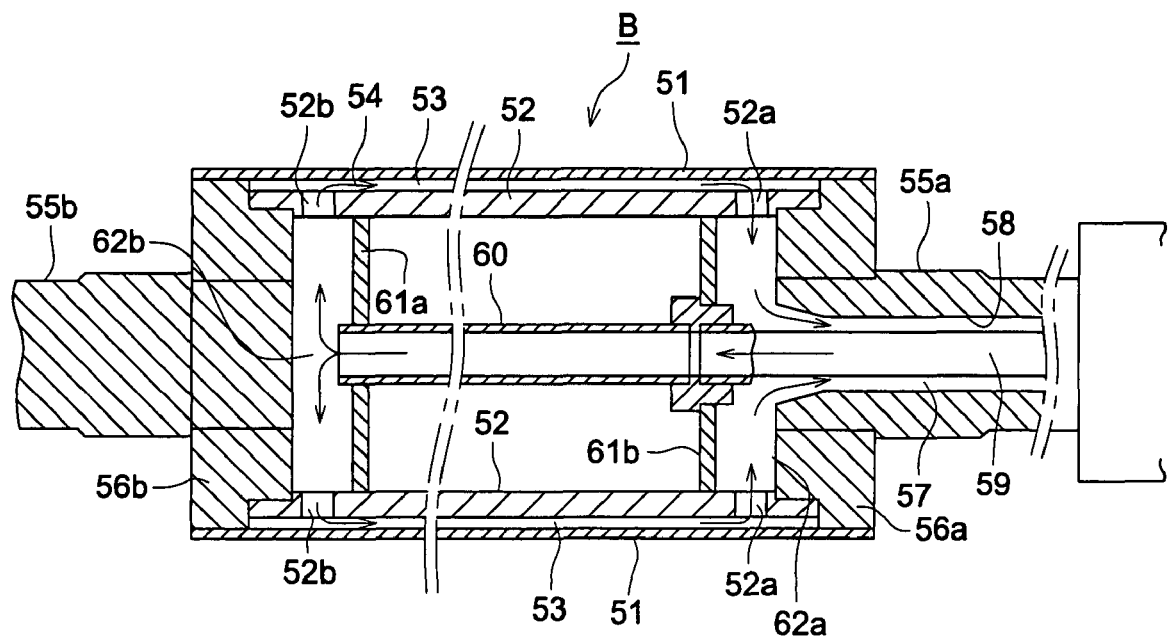
FIG. 6 shows the cross section at a plane including the rotating axis of the second embodiment of the nip-rotating member.

FIGS. 5 and 6 display a touch roller B as another embodiment of the touch roller. The touch roller B roughly composed of an outer cylinder 51 made from a seamless stainless steel having a thickness of 4 mm and a highly rigid inner metal cylinder 52 placed on the same axis in the interior of the outer metal cylinder 51. Cooling liquid 54 is flowed in the space between the outer cylinder 51 and the inner cylinder 52.

In detail, outer cylinder supporting flanges 56*a* and 56*b* are attached at the ends of the rotating axis 55*a* and 55*b*, and a thin metal outer cylinder 51 is provided between the outer circumferences of the outer cylinder supporting flange 56*a* and 56*b*.

A liquid supplying pipe 95 is provided on the same axis in the interior of the liquid exhausting hole 58 which is provided in the axis portion of one of the rotating axis 55*a* for forming a liquid returning path 57, and the liquid supplying pipe 59 is fixedly connected to a liquid axis cylinder 60 arranged at the axis portion in the thin metal outer cylinder 51.

Inner cylinder supporting flanges 61*a* and 61*b* are respectively attached at both ends of the liquid axis cylinder 60 and a metal inner cylinder 52 having a thickness of about 15 to 20 mm is extended from the outer circumferences of the inner cylinder supporting flange to the outer cylinder supporting flange 56*b* placed on the other side.

A cooling liquid flowing space 53 of about 10 mm, for example, is formed between the metal inner cylinder 52 and the thin metal outer cylinder 53, and a flow-in opening 52*a* and a flow-out opening 52 connected to a intermediate paths 62*a* and 62*b* formed by the liquid flowing space 53 and outside of the inner cylinder supporting flange are formed near both ends of the metal inner cylinder 52.

The outer cylinder 51 is thinned within the range in which the thin cylinder theory of elasticity dynamics can be applied for giving the softness and flexibility near the elasticity of rubber and restorability to the outer cylinder 51. The flexibility evaluated by the thin cylinder theory is expressed by thickness t/roller radius r and smaller t/r corresponds to higher flexibility. The optimum flexibility condition of the touch roller B can be obtained when t/r is not less than 0.03.

Usually used touch rollers have a roller diameter R of from 200 to 500 mm (roller diameter r is R/2) an effective roller width L of from 500 to 1,600 mm, and the shape thereof is long sideways since r/L<1.

The suitable range of the thickness t is not more than 150 mm×0.03=4.5 mm when the roller diameter is 300 mm and the effective roller width L is 1,200 mm. In a case in which the melted sheet having a width of 1.300 mm is nipped by applying an average line pressure of 98 N/cm, the corresponding spring constant is made equal to that of a rubber roller having the same shape by making thickness of the outer cylinder 51 to 3 mm, and the width of nip K at the nip portion between the outer cylinder 51 and the cooling roller is made about 9 mm which is near the nip width of 12 mm of the rubber roller. It is understood that the nipping can be carried out under similar conditions by both of the rollers. The bending in the nip width k is about 0.05 to 0.1 mm.

Though t/r is put t/r≦0.03 in the above, in the case of that roller diameter R is 200 to 500 mm, the range of 2 mm ≦t≦5 mm is considerably suitable for practical use since sufficient flexibility can be obtained and thinning of the cylinder can be easily carried out by machine processing. When the thickness is less than 2 mm, highly precise treatment cannot be performed by the elastic deformation on the occasion of processing.

For practical use, it is suitable that the thickness is proportionally increased with the roller diameter under the condition of t/r=about 0.03 though the converted value of 2 mm≦t≦5 mm to the general roller diameter is 0.008≦t/r≦0.05. For example, t is selected within the range of from 2 to 3 mm when the roller diameter R is 200, and from 4 to 5 mm when the roller diameter R is 500.

The touch roller A or B is pressed to the first cooling roller 1 by a pressing means not shown in the drawing. The value of F/W (line pressure) is set at a value within the range of from 9.8 to 147 N/cm, wherein F is the pressing force of the pressing means and W is the width of the film in the direction along the rotating axis of the first cooling roller 5.

In the embodiment of the invention, the flatness of the film is corrected during the passage of film through the nip formed between the touch roller A or B and the first cooling roller. Accordingly, the flatness of the film can be more surely corrected compared to the case of that the touch roller is made from a rigid material so as to not form any nip between the touch roller and the first cooling roller because the film is nipped for a longer time with lower pressure. When the line pressure is less than 9.8 N/cm, the die lines cannot be sufficiently disappeared.

When the line pressure is more than 147 N/cm, the film is difficultly passed through the nip and unevenness in the film thickness is caused.

The surface of the touch rollers A and B can be made to higher flat by constituting by metal compared to the roller having rubber surface so that the film higher in the flatness can be obtained. As the material of the elastic member 44 of the elastic roller 42, ethylenepropylene rubber, neoprene rubber and silicone rubber can be used.

It is important that the viscosity of the film on the occasion of nipping the film by the touch roller 6 is within a suitable range for sufficiently extinguishing the die lines by the touch roller 5. It is known that the variation of the viscosity of cellulose ester depending on the temperature is relatively large.

Consequently, it is important to set the temperature of the film on the occasion of nipping within a suitable range for setting the viscosity of the cellulose ester film within a suitable range at the time of nipping.

The temperature T of the film just before nipping the film by the touch roller 6 is preferably satisfied the relation of Tg<T<Tg+110° C., in which Tg is the glass transition temperature of the cellulose ester film. The viscosity of the film is excessively high when the film temperature T is lower than Tg so that the die lines cannot be corrected.

On the other hand, the film surface cannot be uniformly contacted to the roller when the film temperature T is higher than Tg+110° C. so that the die lines also cannot be corrected. The relation is preferably Tg+10° C.<T<Tg+90° C., and more preferably Tg+20° C.<T<Tg+70° C.

For suitably setting the temperature of film at the time of nipping within the suitable range, the length L along the rotation direction of the first cooling roller between a position P1 where the melted material extruded from the casting die 4 is contacted with the first cooling roller 5 and the nip portion formed by the first cooling roller and the touch roller 6 can be suitably controlled.

Examples of the preferable material for the first cooling roller 5 and the second cooling roller 7 are carbon steel, stainless steel and resin. The surface precision is preferably made higher and the surface roughness is not more than 0.3 S and more preferably not more than 0.01 S.

The above die line correction effect can be enhances by reducing the pressure at the portion of from the opening (lip) of the casting die 4 to the first cooling roller 5 to not more than 70 kPa. The reduced pressure is preferably from 50 to 70 kPa. The method for maintaining the pressure at the portion of from the opening (lip) of the casting die 4 to the first cooling roller 5 is not specifically limited and a method by covering around the casting die 4 and the roller by a pressured resistive member and reducing the pressure is applicable.

In such the occasion, the suction device is preferably heated by a heater so that the device does not become as a place on which the sublimated substance adheres. The sublimated substance cannot be effectively sucked when the sucking pressure is too low, therefore the sucking pressured should be suitably controlled.

The melted cellulose ester type resin is extruded from the extrusion die (T-die) 4 and cooled and solidified by successively contacting to the first cooling roller 5, the second cooling roller 7 and the third cooling roller 8 while transferring to obtain a non-stretched film 10 (cellulose ester resin).

In the embodiment of the invention displayed in FIG. 1, the non-stretched film 10 peeled off from the third cooling roller 8 by a peeling roller 9 is introduced into a stretching machine through a dancer roller (film tension controlling roller) and the film 10 is stretched in the cross direction (width direction) in the stretching machine. The molecules in the film are oriented by the stretching.

For stretching the film in the cross direction, a known tenter is preferably utilized. The stretching in the cross direction is preferable since the lamination with the polarizing film can be performed in the rolled state. The slow axis of the cellulose ester type resin film is formed in the cross direction by the stretching in the cross direction. The transmission axis of the polarization film is usually also in the cross direction. The contrast of the displaying image can be raised and the suitable viewing field angle of the liquid crystal display can be obtained by building-in a polarization plate in the liquid crystal display, which is prepared by laminating the polarization film and the optical film so that the transmission axis of the former and the slow axis of the later is placed in parallel.

The glass transition point Tg of the film constituting material can be controlled by varying the kind and the ratio of the materials. When the retardation film is made by the cellulose ester film, the Tg is preferably not less than 120° C. and more preferably not less than 135° C. In the liquid crystal display, the thermal environment of the film is varied by temperature rising of the apparatus itself such as temperature rising caused by the light source during the image displaying.

When the Tg of the film is lower than the environmental temperature of the film, the retardation value derived from the orientation state of the molecules fixed in the film by the stretching and the size of the film are largely varied at this time. When the Tg of the film is too high, the temperature for forming the film from the film constituting materials is raised so that the energy consumption for heating the film constituting materials is increased and the decomposition of the materials and coloring of the film caused by the decomposition tends to occur on the occasion of the film formation. Accordingly, the Tg is preferably not more than 250° C.

A known treatment such as a thermal fixation, cooling and relaxation treatments may be performed in the stretching process, and these treatments may be suitably controlled so that the objective optical film obtains required properties.

The above stretching process and the thermally fixing process are suitably selected and carried out for providing the function of retardation film for expanding the viewable field angle and the properties of the retardation film. When the stretching process and the thermally fixing process are contained, such the heating and pressing process is carried out before the stretching process and the thermally fixing process.

For combing the function of cellulose eater film to the retardation film produced from cellulose ester, controlling of the refractive index is required. The refractive index control can be carried out by the stretching operation and the stretching operation is preferable method. The stretching method is described below.

The required retardation $R_o$ and $R_{th}$ can be obtained and the flatness can be improved by stretching for 1.0 to 2.0 times in one direction of the cellulose resin and 1.01 to 2.5 times in the direction crossing in-face at right angle in the stretching process of the retardation film.

The $R_o$ is the retardation in-face which is the product of the thickness and the difference between the refractive index of in-face in the length direction MD and that of in the width direction TD. The $R_{th}$ is the retardation in the thickness direction, which is the product of the refractive index in-face (average of the index in the length direction MD and that in the width direction TD) and the thickness.

The stretching may be performed successively or simultaneously in the length direction and the direction crossing at right angle with that namely the width direction. At this time, sufficient retardation cannot be obtained when the stretching ratio in at least one direction is too small, and the stretching becomes impossible and breaking of the film is caused sometimes when the stretching ratio is too large.

The biaxial stretching in the two directions crossing at right angle with each other is an effective method for making the refractive indexes $n_x$, $n_y$ and $n_z$ being within the designated range. The $n_x$, $n_y$ and $n_z$ are each the refractive index in the length direction MD, in the width direction TD and in the thickness direction, respectively.

When the film is stretched in the melt-casting direction for example, excessively large shrinkage in the cross direction causes too large $n_z$ value. In such the case, the $n_z$ can be improved by inhibiting the shrinkage in the width direction or by stretching also in the width direction. When the film is stretched in the width direction, distribution of the refractive index is caused sometimes in the width direction.

The distribution of refractive index is sometimes appeared when the tenter method is applied. Such the phenomenon is caused by that shrinking force is generated at the central portion of the film by stretching the film in the width direction while fixing the edge portions of the film. It is considered that the phenomenon is that so called as bowing phenomenon. In such the case, the bowing phenomenon can be inhibited by stretching in the casting direction and the distribution of retardation in the width direction can be reduced. The fluctuation of the film thickness can be reduced by stretching in two axes directions crossing with each other at right angle. The excessively large variation in the film thickness causes unevenness of the retardation, and the problem of unevenness of color is caused sometimes when the film is used in the liquid crystal display.

The variation of the thickness of the cellulose ester film is preferably made within the range of ±3% and more preferably ±1%. The stretching in the two axis directions crossing with each other at right angle is effective to satisfy the above propose, and the final stretching degree in the two directions crossing at right angle is preferably from 1.0 to 2.0 times in the casting direction and 1.01 to 2.5 times in the width direction and that from 1.01 to 1.5 times in the casting direction and 1.05 to 2.0 times in the width direction are more preferably for obtaining the required retardation value.

When the absorption axis of the polarizer is in the length direction, the transmission axis of the polarizer is agreed with the width direction. It is preferable for obtaining the long shaped polarization plate that the retardation film is stretched so as to the slow axis is in the width direction.

When the cellulose ester film in which the positive double refractive index is generated by stress is used, the slow axis of the retardation film can be given in the width direction by stretching in the width direction in the above processing. In such the case, it is preferable that the slow axis of the retardation film is in the width direction for raising the displaying quality, and the following relation is preferably satisfied for obtaining the objective retardation value.

(Stretching ratio in width direction)>(stretching ratio in casting direction)

After the stretching, the edge portion of the film is slit off to make the width of the film into that of the product by a slitter 13 and knurling (embossing) is given on the both edges of the film by a knurling press composed of an embossing ring 14 and a back roller 15 and then the cellulose ester film is winded up by a winder 16 into a form of bulk roll F. Occurrence of adhering and scratches in the bulk roll F of the film can be prevented by the knurling.

The knurling can be given to the film by heating or pressing by the metal ring having projection patterns on the side thereof. The both edge portions of the film where the film is held by clips are usually deformed so as cannot to be used as the film product; therefore such the portions are slit off and reused as the material of the film.

In the winding process, the film is winded up on a winding roller while the shortest distance between outer circumstance surface of the cylindrically rolled up film and that of a mobile transfer roller arranged just before the rolled up film is constantly held. A means for removing or reducing the surface potential of the film such as an n electricity removing blower is provided before the winding roller.

Usually used winders may be applied in the production of the cellulose ester film of the invention and the winding can be carried out by a constant tension method, a constant torque method, a taper tension method and a programmed tension control method for constantly holding the inner stress. The method having a winding tension at the initial time of winding of from 90.2 to 300.8 N/m is preferred.

In the winding up process of the invention, the film is preferably winded at a temperature of from 20 to 30° C. and a relative humidity of from 20 to 60%. The resistivity of the retardation in the thickness direction $R_{th}$ against humidity variation is raised by controlling the temperature and the humidity in the film winding process into the above range.

A temperature of less than 20° C. is not preferred since wrinkles are caused and the quality of the film is lowered so that the film cannot be practically used. A temperature exceeding 30° C. is also not preferable since wrinkles are caused and the quality of the film is lowered so that the film cannot be practically used.

The humidity in the winding process of the film is less than 20% RH is not preferable since the film is easily electrified and the quality of the film is lowered so that the film cannot be practically used. The humidity in the winding process of the film of more than 60% RH is not preferable since the winding quality, occurrence of adhesion and the transfer suitability of the film are degrade.

The winding up core for winding up the cellulose ester film into the rolled-shape may be a cylindrical core made from any material, and is preferably a hollow plastic core. The plastic material may be any kind of plastics as long as a heat resistive plastic capable of withstanding the temperature for heating treatment, and phenol resin, xylene resin, melamine resin, polyester resin and epoxy resin can be cited.

Thermo-curable resins strengthen by filler such as glass fibers are preferred. For example, a hollow plastic core made from FRP and having an outer diameter of 6 inches (one inch is 2.54 cm) and an inner diameter of 5 inches is used.

The winding time of the film on the winding core is preferably not less than 100 and more preferably not less than 500, the thickness of winded film is preferably not less than 5 cm, the length of the film is preferably from 500 to 10,000 m, and the width of the film is preferably from 1 to 5 m and more preferably from 1.5 to 4 m.

It is also preferable that a large width film is prepared and slit before the winding up for obtaining 2 or 3 rolled films.

The both edged portions of the film, where the film is held by the clips, silt off in the film forming process is crushed and pelletized according necessity, and may be reused as the material for the same or different kind of film.

<Optical Film>

The cellulose ester film prepared by a method of this invention can be used as an optical film such as a polarization plate protective film or a retardation film in the liquid crystal display.

<<Polarization Plate Protection Film>>

The thickness of the polarization plate protection film is preferably from 10 to 500 μm. The thickness is more preferably form 20 to 150 μm and particularly preferably from 25 to 90 μm. When the polarization protection film is too thick, the thickness of the polarization plate becomes excessively large so that such plate is not suited for the purpose of thin and light when that is used in a not book personal computer or a mobile type electronics devices.

On the other hand, the retardation is difficultly obtained when the polarization plate protection film is thin, and humidity permeability of the film rises so that the ability of the film to protect the polarizer from the humidity is sometimes lowered.

When the fast axis or the slow axis of the polarization plate protection film exists in in-face of the film and the angle made by the axis and the casting direction is θ1, the θ1 is preferably made an angle of from −1° to +1° and preferably from −0.5° to +0.5°. Particularly, the angle is preferably from −0.1° to 0.1° when the retardation ability is given to the film.

The θ1 can be defined as the orientation angle and the θ1 can be measured by using an automatic double refract meter KOBRA-21ADH manufactured by Oji Scientific Instruments.

The θ1 satisfying the above relation contributes for obtaining high luminance and preventing or inhibiting light leak of the displayed image and for high fidelity color reproduction in a color liquid crystal display.

When the cellulose ester film of the invention is used as the polarization plate protection film, the production method of the polarization plate is not specifically limited and usual method such as a roll to roll method can be applied.

A method is applicable, in which the above obtained cellulose ester film is treated by an alkali and is pasted as the polarization palate protection film by using a completely saponified polyvinyl alcohol solution on both sides of a polarizer which is prepared by immersing and stretching a polyvinyl alcohol film in an iodine solution, and the polarization plate protection film of the invention is directly pasted on the polarizer at least one side of the polarization plate.

The optical film according to this invention can be used as a polarization plate protection film on the other side. Cellulose ester films having a thickness of from 10 to 150 μm which are produced by the solution casting method and available on the market such as Konica Minolta TAC KC8UX2M, KC4UX, KC5UX, KC4UY, KC8UY, KC12UR, KC8UCR-3, KC8UCR-4, KC8URC-5, KC4CR, KC4UE, KC8UE, KC8UY-HA and KC8UX-RHA each manufactured by Konica Minolta Opt Inc., a polyester film, a cyclic olefin type rein film such as ZEONOR Film manufactured by Nihon Zeon Corp., and ARTON FILM manufactured by JSR Corp. are usable.

An easily adhering treatment described in JP-A 6-94915 and 6-118232 may be applied in stead of the above alkali treatment for the polarization plate preparation. A corona discharge treatment and a plasma treatment are also applicable.

The polarization plate is constituted by the polarizer and the protection film for protecting the both surfaces of the polarizer, and also can be constituted by pasting the protection film on one side of the polarization plate and a separation film on the other side. The protection film and the separation film are used for protecting the polarization plate on the occasion of shipping or examination of the products.

In such the case, the protection film is pasted for protecting the surface of the polarization plate and is applied on the side of the polarization plate opposite to the side to be pasted to the liquid crystal plate. The separable film is used for covering the adhesion layer to be pasted to the liquid crystal plate and applied on the side of the surface of the polarization plate to be pasted to liquid crystal cell.

The polarizer as the principal constituting element of the polarization plate is an element through which light having a polarized wave face in a certain direction only can be permeated, and a poly(vinyl alcohol) type polarization film is preferably used as typical polarizer. The polarizer is prepared by dying a poly(vinyl alcohol) type film such as a film of poly(vinyl alcohol) and an ethylene-modified poly(vinyl alcohol)

having a ethylene unit content of from 1 to 4 mole-percent, a polymerization degree of from 2,000 to 4,000 and a saponification degree of from 99.0 to 99.99 mole-percent by iodine or a dichromatic dye.

The polarizer is preferable one prepared by mono-axially stretching the poly(vinyl alcohol) and dyeing or one prepared by dyeing and mono-axially stretching and then preferably treated by a boron compound for giving durability.

The polarization plate is formed by pasting the one side of the optical film according to this invention onto the surface of the polarizer. The pasting is preferably carried out by an aqueous adhesive principally composed of completely saponified poly(vinyl alcohol). The thickness of the polarizer is preferably from 5 to 30 μm.

<<Retardation Film>>

The optical film of this invention also can be preferably applied as a retardation film. When the retardation film is used in multi-domain VA mode, the image quality is contributed by placing the retardation film so that the θ1 of the fast axis of the retardation film is arranged in the above region. The polarization plate and the liquid crystal display in MVA mode can take the constitution shown in FIG. 7, for example.

Figure 7:
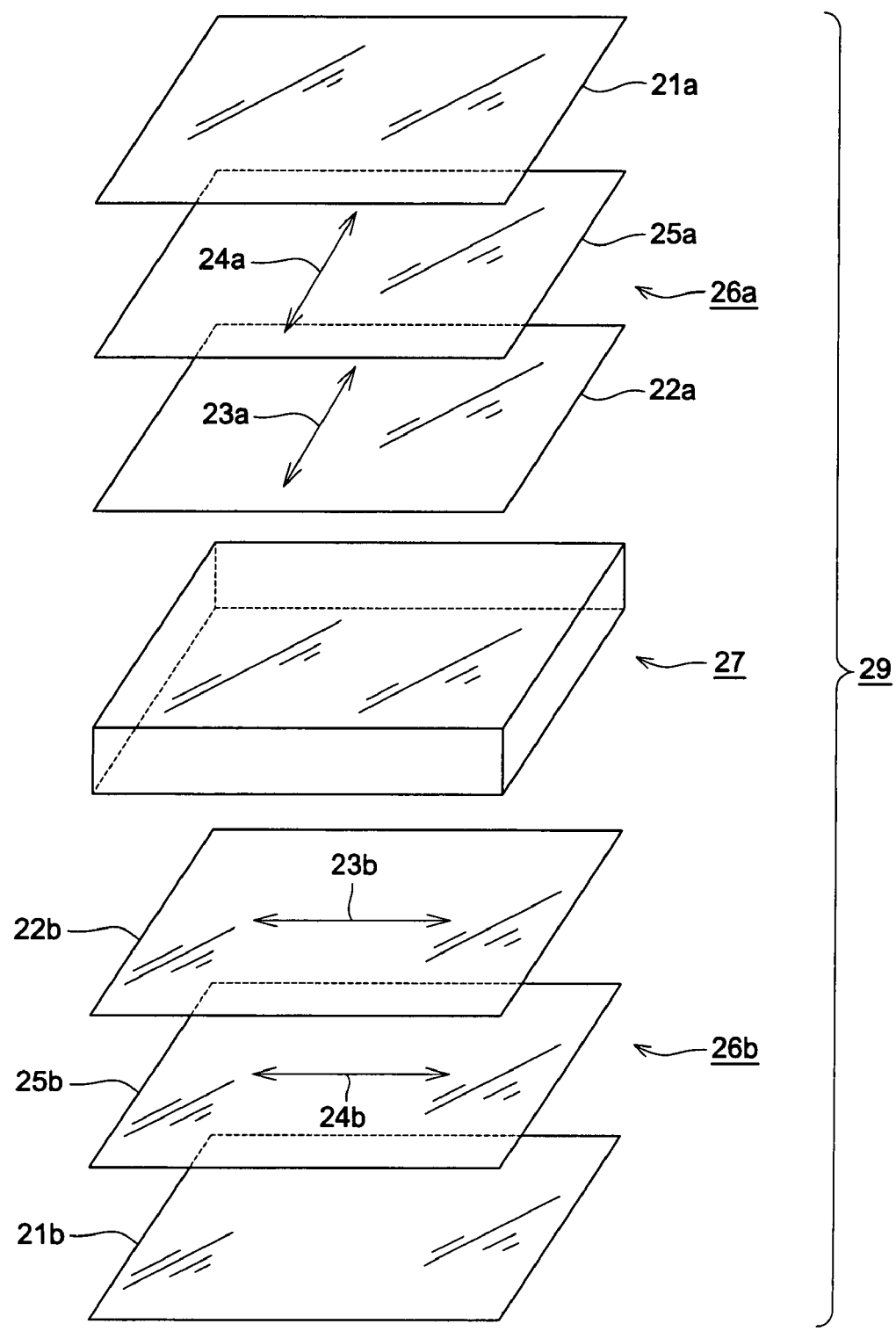
FIG. 7 is an oblique analyzing view showing out line of the constitution of a liquid crystal display.

In FIG. 7, 21a and 21b are the protection film, 22a and 22b are the retardation film, 23a and 23b are the slow axis of the film, 24a and 24b are the direction of transmission axis of the polarizer, 26a and 16b are the polarization plate, 27 is the liquid crystal cell and 29 is the liquid crystal display.

The distribution of the retardation $R_o$ in the in-face direction of the cellulose ester film is preferably controlled so as to be not more than 5%, more preferably not more than 2% and particularly preferably not more than 1.5%. The distribution of the retardation $R_{th}$ in the thickness of the film is preferably controlled so as to be not more than 10%, more preferably not more than 2%, and particularly preferably not more than 1.5%.

In the retardation film, the variation distribution of the retardation value is preferably smaller, and the small variation distribution of the retardation value is preferable for preventing unevenness of the color when the polarization plate including the retardation film is used in the liquid crystal display.

For controlling the retardation film so that the film has the retardation value suited for raising the displaying quality of the liquid crystal cell in the VA mode or TN mode, particularly for suitably using in the MVA mode by dividing the VA mode into multi-domain, it is required that the value of in-face retardation $R_o$ is made to be within the range of from 30 nm to 95 nm, and the value of retardation $R_{th}$ in the thickness direction is made to be within the range of from 70 nm to 400 nm.

The in-face retardation $R_o$ principally compensates the light leak caused by occurrence of aberration from the cross nicol state of the two polarization plates when the displaying face is observed from an oblique direction to the normal line of the displaying face even when the two polarization plates are arranged on each sides of the liquid crystal cell as shown in FIG. 7 in cross nicol stat according to observation from the direction of the normal line.

The retardation in the thickness direction principally contributes to compensate the double refraction observed when the displaying face is viewed from the oblique direction when the liquid crystal cell in the TN mode, AV mode or particularly in the MVA mode displays a black image.

When the liquid crystal display has the constitution in which two polarization plates are each arranged on both sides of the liquid crystal cell as shown in FIG. 7, 22a and 22b in the drawing may partially charge the retardation $R_{th}$ in the thickness direction, and it is preferable that the two polarization plates satisfy the above condition and the sum of the thickness direction retardation $R_{th}$ of them is preferably within the range of from 140 nm to 500 nm.

In such the case, it is preferable that the in-face retardation $R_o$ and the thickness direction $R_{th}$ of 22a and 22b are each the same, respectively, for raising the industrial productive efficiency of the polarization plate. It is particularly preferable that the polarization plate has an in-face retardation $R_o$, value of from 35 nm to 65 nm and a thickness direction retardation $R_{th}$ value of from 90 nm to 180 nm and is used for the MVA mode liquid crystal cell of the constitution of FIG. 7.

In the liquid crystal display, when a TAC film available on the market having an in-face retardation $R_o$ of from 0 to 4 nm and a thickness direction retardation $R_{th}$ of from 20 to 50 nm is used as the polarization plate protection film at the position of 22b in FIG. 7 for example, the retardation film to be arranged at 22a in FIG. 7 for example is one having a in-face retardation $R_o$ of from 30 nm to 95 nm and a thickness direction retardation $R_{th}$ of from 140 nm to 400 nm. Such the constitution raises the displaying quality and is preferable for the productivity of the film.

It is generally required for obtaining stable optical properties that the retardation film is generally required that the variation in the retardation values of $R_o$ and $R_{th}$ are small. Particularly in liquid crystal display in double refraction mode, the variation of these valued cause unevenness of image sometimes.

The effect of the invention on the production is enhanced when a long length film of 100 m or more is produced and further effect can be obtained accompanied with the prolongation of the film such as 1,500 m, 2,500 m, 5,000 m and 10,000 m.

<Liquid Crystal Display>

The polarization plate containing the polarization plate protection film (functioning also as retardation film) can be realizes high displaying quality and is suitable for the multi-domain type liquid crystal display and particularly suitable for the multi-domain type liquid crystal display in the double refraction mode.

The polarization plate of the invention can be used in MVA (multi-domain vertical alignment) mode, PVA (patterned vertical alignment) mode, CPA (continuous pinwheel alignment) mode, OCB (optical compensated bend) mode and ISP mode, and the use the polarization plate is not specifically limited to the mode and the arrangement thereof.

The liquid crystal display being applied as the apparatus for displaying color images and moving images, and high fidelity moving images which do not cause eyestrain can be displayed by improving in the displaying quality, the contrast and in the durability of the polarization plate by the invention.

In the liquid crystal display having at least the polarization plate which contains the retardation film, one sheet of the polarization plate including the optical film according to this invention (polarization plate protection film) is provided to the liquid crystal cell or two sheets of that are arrange on both sides of the liquid crystal cell. In such the case, the displaying quality can be improved by using the polarization plate so that the side of the protection film of the polarization plate is faced to the liquid crystal cell of the liquid crystal display. In FIG. 7, the films 22a and 22b are each faced to the liquid crystal cell of the liquid crystal display.

The optical film according to this invention (polarization plate protection film) can optically compensate the liquid crystal cell in such the constitution.

When the polarization plate of the invention is used in the liquid crystal display, the polarization plate of the invention is used as at least one of polarization plates of the liquid crystal display. The liquid crystal display improved in the displaying quality and excellent in the viewing field angle can be provided by the use of the polarization plate of the invention.

EXAMPLES

The invention is described below referring examples; the invention is not limited to the examples.

Example 1

<Synthesis of Cellulose Ester>

Six kinds of cellulose ester were synthesized in which substituting degree of acetyl group, that of propionyl group and that of butyryl group were varied as follows. The synthesis was carried out referring Example B in WO 92/05213 and controlling the adding amount of propionic acid, butyric acid or acetic acid.

| | |
|---|---|
| C-1 | Acetyl group substitution degree: 1.30 |
| | Propionyl group substitution degree: 1.30 |
| | Total acyl group substitution degree: 2.60 |
| C-2 | Acetyl group substitution degree: 1.40 |
| | Propionyl group substitution degree: 1.40 |
| | Total acyl group substitution degree: 2.80 |
| C-3 | Acetyl group substitution degree: 1.30 |
| | Propionyl group substitution degree: 1.25 |
| | Total acyl group substitution degree: 2.55 |
| C-4 | Acetyl group substitution degree: 1.50 |
| | Propionyl group substitution degree: 1.20 |
| | Total acyl group substitution degree: 2.70 |
| C-5 | Acetyl group substitution degree: 0.20 |
| | Propionyl group substitution degree: 2.60 |
| | Total acyl group substitution degree: 2.80 |
| C-6 | Acetyl group substitution degree: 1.45 |
| | Butyryl group substitution degree: 1.35 |
| | Total acyl group substitution degree: 2.80 |

The substitution degrees in the obtained cellulose esters are calculated according to ASTM-D817-96.

<Synthesis of Acryl Polymers AP1 to AP8>

<<Synthesis of AP1 to AP6>>

In a glass flask on which a stirrer, two dropping funnels, a gas introducing pipe and a thermometer were attached, 40 g of a solution monomer, kinds and ratios of which are listed in Table 1, 3.0 g of chain-transfer agent of mercaptopropionic acid and 30 g of toluene were charged and the temperature of the system was raised by 90° C. Then 60 g of a mixture of monomer, kinds and ratios of which are listed in Table 1, was dropped spending 3 hours from one of the dropping funnel and 0.6 g of azobisisobutylonitlile dissolved in 14 g of toluene was simultaneously dropped from the other dropping funnel spending 3 hours.

After that, 0.6 g of azobisisobutylonitlile dissolved in 56 g of toluene was further dropped spending 2 hours. After completion of the dropping the reaction was further continued for 2 hours. Thus AP1 was obtained.

AP2 to AP6 and AP6a were obtained in the same manner as in AP1 except that the amount of the chain-transfer agent of mercaptopropionic acid was varied.

The weight average molecular weight of each of AP1 to AP6 and AP6a measured by the following method is listed in Table 1.

MA, MMA, HEMA and HEA in Table 1 are each abbreviation of the following compounds.

MA: Methyl acrylate
MMA: Methyl methacrylate
HEMA: 2-hydroxyethyl methacrylate
HEA: 2-hydroxyethyl acrylate (Measurement of Molecular Weight)

The weight average molecular weight was measured by high speed liquid chromatography.

The measuring conditions are as follows.
Solvent: Methylene chloride
Column: Shodex K806, K805 and K803G, each manufactured by Showa Denko K.K. were connected for use.
Sample concentration: 0.1 weight-percent
Detector: RI Model 504 manufactured by GL Sciences Inc.
Pump: L6000 manufactured by Hitachi Ltd.
Flowing rate: 1.0 ml/min
Calibration curve: A calibration curve prepared by 13 samples of Standard polystyrene, manufactured by Tosoh Corp., having an Mw of from 1,000,000 to 500. Thirteen samples each having the molecular weight about at equal interval were used.

<<Synthesis of AP7 to AP9>>

Bulk polymerization was carried out according to the polymerization method described in JP-A 2000-128911. In a glass flask on which a stirrer, a nitrogen gas introducing pipe, a thermometer, a material inputting opening and a reflux cooler were attached, the following methyl methacrylate was charged as a monomer and the atmosphere in the flask was replaced by nitrogen gas by introducing nitrogen gas and then the following thioglycerol was added while stirring.

After the addition of thioglycerol, polymerization was carried out for 4 hours, and then the temperature of the contents was lowered by room temperature and 20% by weight of a 5 weight-percent tetrahydrofuran solution of benzoquinone was added to stop the polymerization. The content was transferred to an evaporator and tetrahydrofuran, remaining monomer and remaining thioglycerol were eliminated at 80° C. under reduced pressure. Thus acryl polymer PA7 to PA9 was obtained, respectively.

TABLE 1

—(Xa)m—(Xb)n—(Xc)p—

| Compound name | Xa | m | Xb | n | Xc | p | Mw |
|---|---|---|---|---|---|---|---|
| AP1 | MMA | 80 | HEMA | 10 | MA | 10 | 8,000 |
| AP2 | MMA | 80 | HEMA | 15 | MA | 5 | 12,000 |
| AP3 | MMA | 90 | HEA | 10 | | 0 | 7,000 |
| AP4 | MMA | 80 | HEA | 20 | | 0 | 21,000 |
| AP5 | MMA | 85 | HEMA | 15 | | 0 | 13,000 |
| AP6 | MMA | 90 | HEMA | 10 | | 0 | 8,000 |
| AP6a | MMA | 75 | HEA | 25 | | 0 | 70,000 |

—(Ya)k—(Yb)q—

| Compound name | Ya | k | Yb | q | Mw |
|---|---|---|---|---|---|
| AP7 | MMA | 100 | | 0 | 500 |
| AP8 | MMA | 100 | | 0 | 1,000 |
| AP9 | MMA | 100 | | 0 | 3,000 |

MA: Methyl acrylate
MMA: Methyl methacrylate
HEMA: 2-hydroxyethyl methacrylate
HEA: 2-hydroxyethyl acrylate (Preparation of Cellulose Ester Film 101)

The above obtained cellulose ester C-1 was thermally treated at 130° C. for 1 hour in dried air and cooled by standing in dried air. To 88 parts by weight of the dried cellulose ester resin, 8 parts by weight of the sugar ester compound, 4 parts by weight of the acryl type polymer and 0.5% by weight of antioxidant AO-1 were added and mixed and pelettized at 230° C. by heating in an extruder and cooled by standing.

Thus obtained pellets were dried for eliminating moisture at 80° C. for 5 hours using a hot air dryer in which air was passed. Then the pellets was melt and extruded by a mono-axial extruder, manufactured by Mitsubishi Heavy Industries Ltd., having a coat hunger type T-die having a lip width of 1.5 m to form a cellulose ester film. In the extruder, the screw diameter was 90 mm and the material of the T-die was tungsten carbide.

The film formation by extrusion was carried out in a clean room of class 1000 or less at a melting temperature of 250° C. and a T-die temperature of 245° C. The obtained film was stretched for 1.10 times in the length direction and then stretched for 1.20 times in the width direction by a tenter machine. Thus a cellulose ester film having a thickness of 80 μm, a length of 3,000 m and a width of 1.5 m was obtained.

The film was subjected a knurling treatment having a width of 1 cm and an average height of 8 μm on both edges of the film and winded up to prepare optical film 101.

Polarization protection films according to the invention 102 to 153 and comparative films 154 to 156 were prepared in the same manner as in the above sample 101 except that the additives and the amount thereof were varied as described in Tables 2 to 5.

In samples 135 and 136, the stretching ratio in the length direction, that in the width direction and the thickness were each varied to 1.20 times, 1.70 times and 40 μm.

The adding amount of the cellulose ester was controlled so that the total of the solid components of the additives was to be 100. An additive being liquid at room temperature was added by a feeder just before the entrance of the bi-axial extruder.

The amount of the colorant is described in ppm to the cellulose ester. The additives and UV absorbents used in the samples were as follows.

AO-1: IRGANOX 1010

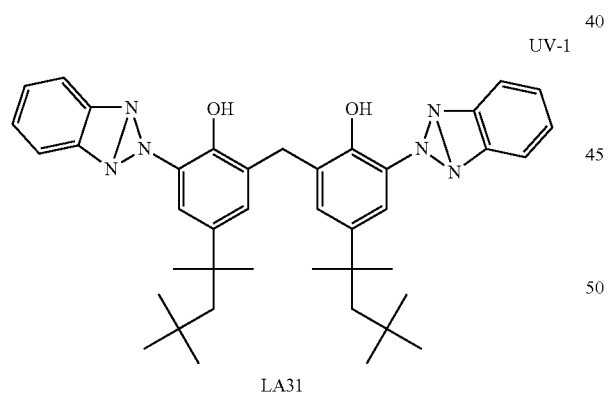
LA31

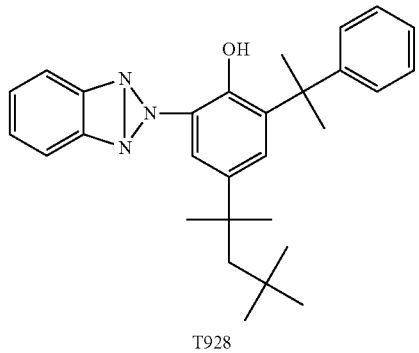
T928

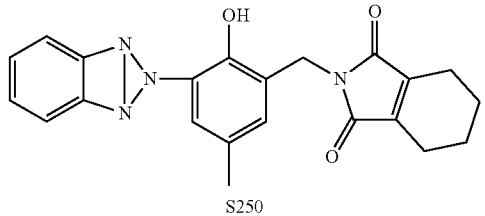
S250

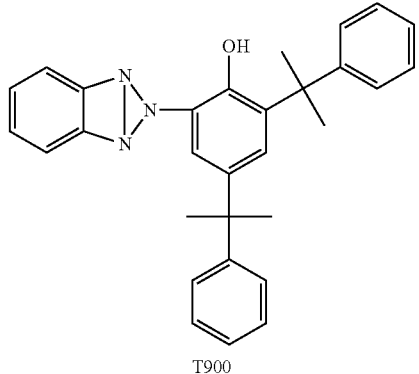
T900

TABLE 2

| | Cellulose ester | Sugar ester compound Kind | *1 | Acryl type polymer Kind | *1 | Antioxidant, Anti-degradation agent First Kind | *1 | Second Kind | *1 | Layer thickness (μm) | |
|---|---|---|---|---|---|---|---|---|---|---|---|
| 101 | C-1 | Compound 1 | 8 | AP1 | 4 | | | | | 80 | Inventive |
| 102 | C-1 | Compound 2 | 8 | AP1 | 4 | | | | | 80 | Inventive |
| 103 | C-1 | Compound 3 | 8 | AP1 | 4 | | | | | 80 | Inventive |
| 104 | C-1 | Compound 4 | 8 | AP1 | 4 | | | | | 80 | Inventive |

TABLE 2-continued

| | Cellulose ester | Sugar ester compound Kind | *1 | Acryl type polymer Kind | *1 | Antioxidant, Anti-degradation agent First Kind | *1 | Second Kind | *1 | Layer thickness (μm) | |
|---|---|---|---|---|---|---|---|---|---|---|---|
| 105 | C-1 | Compound 5 | 8 | AP1 | 4 | | | | | 80 | Inventive |
| 106 | C-1 | Compound 1 | 8 | AP1 | 4 | | | | | 80 | Inventive |
| 107 | C-1 | Compound 7 | 8 | AP1 | 4 | | | | | 80 | Inventive |
| 108 | C-1 | Compound 8 | 8 | AP1 | 4 | | | | | 80 | Inventive |
| 109 | C-1 | Compound 9 | 8 | AP1 | 4 | | | | | 80 | Inventive |
| 110 | C-1 | Compound 10 | 8 | AP1 | 4 | | | | | 80 | Inventive |
| 111 | C-1 | Compound 3 | 8 | AP1 | 4 | | | | | 80 | Inventive |
| 112 | C-1 | Compound 3 | 8 | AP2 | 4 | | | | | 80 | Inventive |
| 113 | C-1 | Compound 3 | 8 | AP3 | 4 | | | | | 80 | Inventive |
| 114 | C-1 | Compound 3 | 8 | AP4 | 4 | | | | | 80 | Inventive |
| 115 | C-1 | Compound 3 | 8 | AP5 | 4 | | | | | 80 | Inventive |
| 116 | C-1 | Compound 3 | 8 | AP6 | 4 | | | | | 80 | Inventive |
| 117 | C-1 | Compound 3 | 8 | AP6a | 2 | | | | | 80 | Inventive |
| 118 | C-1 | Compound 3 | 8 | AP7 | 4 | | | | | 80 | Inventive |
| 119 | C-1 | Compound 3 | 8 | AP8 | 4 | | | | | 80 | Inventive |
| 120 | C-1 | Compound 3 | 8 | AP9 | 4 | | | | | 80 | Inventive |
| 121 | C-5 | Compound 3 | 4 | AP1 | 4 | 103 | 0.3 | | | 80 | Inventive |
| 122 | C-5 | Compound 3 | 8 | AP1 | 4 | | | | | 80 | Inventive |
| 123 | C-6 | Compound 3 | 4 | AP1 | 4 | 103 | 0.3 | | | 80 | Inventive |
| 124 | C-6 | Compound 3 | 8 | AP1 | 4 | | | | | 80 | Inventive |
| 125 | C-6 | Compound 4 | 4 | AP2 | 2 | | | | | 80 | Inventive |
| 126 | C-1 | Compound 3 | 4 | AP1 | 8 | | | | | 80 | Inventive |
| 127 | C-1 | Compound 3 | 12 | AP1 | 8 | | | | | 80 | Inventive |

*1: Adding amount (Parts by weight)

TABLE 3

| | Cellulose ester | Sugar ester compound Kind | *1 | Acryl type polymer Kind | *1 | Antioxidant, Anti-degradation agent First Kind | *1 | Second Kind | *1 | Layer thickness (μm) | |
|---|---|---|---|---|---|---|---|---|---|---|---|
| 128 | C-1 | Compound 3 | 8 | AP1 | 4 | GSY-P101 | 1 | | | 80 | Inventive |
| 129 | C-1 | Compound 3 | 8 | AP1 | 4 | GSY-P101 | 0.5 | | | 80 | Inventive |
| 130 | C-1 | Compound 3 | 8 | AP1 | 4 | Sumilizer GP | 0.5 | | | 80 | Inventive |
| 131 | C-1 | Compound 3 | 8 | AP1 | 4 | (R)-103 | 1 | | | 80 | Inventive |
| 132 | C-1 | Compound 3 | 8 | AP1 | 4 | (R)-103 | 0.8 | | | 80 | Inventive |
| 133 | C-1 | Compound 3 | 8 | AP1 | 4 | (R)-103 | 0.5 | | | 80 | Inventive |
| 134 | C-4 | Compound 3 | 8 | AP1 | 4 | | | | | 80 | Inventive |
| 135 | C-4 | Compound 3 | 6 | AP1 | 4 | | | | | 40 | Inventive |
| 136 | C-4 | Compound 3 | 6 | AP1 | 4 | | | | | 40 | Inventive |
| 137 | C-1 | Compound 3 | 8 | AP1 | 4 | GSY-P101 | 0.25 | 105 | 0.3 | 80 | Inventive |
| 138 | C-1 | Compound 3 | 8 | AP1 | 4 | GSY-P101 | 0.25 | 108 | 0.6 | 80 | Inventive |
| 139 | C-1 | Compound 3 | 8 | AP1 | 4 | Sumilizer GP | 0.25 | 103 | 0.3 | 80 | Inventive |
| 140 | C-1 | Compound 3 | 8 | AP1 | 4 | GSY-P101 | 0.25 | 111 | 0.75 | 80 | Inventive |
| 141 | C-1 | Compound 3 | 8 | AP1 | 4 | Sumilizer GP | 0.25 | 145 | 0.5 | 80 | Inventive |
| 142 | C-1 | Compound 3 | 8 | AP1 | 4 | Sumilizer GS | 0.5 | GSY-P101 | 0.25 | 80 | Inventive |
| 143 | C-1 | Compound 3 | 8 | AP1 | 4 | Sumilizer GS | 0.5 | | | 80 | Inventive |
| 144 | C-1 | Compound 3 | 8 | AP1 | 4 | Sumilizer GS | 0.25 | | | 80 | Inventive |
| 145 | C-1 | Compound 3 | 8 | AP1 | 4 | | | | | 80 | Inventive |
| 146 | C-1 | Compound 3 | 8 | AP1 | 4 | | | | | 80 | Inventive |
| 147 | C-1 | Compound 3 | 8 | AP1 | 4 | | | | | 80 | Inventive |
| 148 | C-2 | Compound 3 | 8 | AP1 | 4 | 108 | 0.3 | GSY-P101 | 0.25 | 80 | Inventive |
| 149 | C-2 | Compound 3 | 8 | AP1 | 4 | Sumilizer GS | 0.5 | GSY-P101 | 0.25 | 80 | Inventive |
| 150 | C-3 | Compound 3 | 8 | AP1 | 4 | 138 | 0.3 | GSY-P101 | 0.25 | 80 | Inventive |
| 151 | C-3 | Compound 3 | 8 | AP1 | 4 | Sumilizer GM | 0.5 | GSY-P101 | 0.25 | 80 | Inventive |
| 152 | C-3 | Compound 3 | 8 | AP1 | 4 | Sumilizer GS | 0.5 | GSY-P101 | 0.25 | 80 | Inventive |
| 153 | C-3 | Compound 3 | 8 | AP1 | 4 | Sumilizer GS | 0.5 | GSY-P101 | 0.25 | 80 | Inventive |
| 154 | C-1 | | | | | | | | | 80 | Comparative |
| 155 | C-1 | | | AP1 | 4 | | | | | 80 | Comparative |
| 156 | C-1 | Compound 1 | 8 | | | | | | | 80 | Comparative |

*1: Adding amount (Parts by weight)

TABLE 4

| | Plasticizer | | UV absorbent | | Colorant | | |
|---|---|---|---|---|---|---|---|
| | Kind | Adding amount (Parts by weight) | Kind | Adding amount (Parts by weight) | Kind | Adding amount (ppm) | |
| 101 | | | | | | | Inventive |
| 102 | | | | | | | Inventive |
| 103 | TMPTB | 4 | | | | | Inventive |
| 104 | | | | | | | Inventive |
| 105 | | | | | | | Inventive |
| 106 | TMPTB | 4 | | | | | Inventive |
| 107 | | | | | | | Inventive |
| 108 | | | | | | | Inventive |
| 109 | | | | | | | Inventive |
| 110 | | | | | | | Inventive |
| 111 | | | | | | | Inventive |
| 112 | | | | | | | Inventive |
| 113 | | | | | | | Inventive |
| 114 | TMPTB | 4 | | | | | Inventive |
| 115 | | | | | | | Inventive |
| 116 | | | | | | | Inventive |
| 117 | | | | | | | Inventive |
| 118 | | | | | | | Inventive |
| 119 | TMPTB | 8 | | | | | Inventive |
| 120 | | | | | | | Inventive |
| 121 | | | | | | | Inventive |
| 122 | | | LA31 | 1.2 | CR-13 | 5 | Inventive |
| 123 | | | | | CR-13 | 5 | Inventive |
| 124 | | | LA31 | 1.2 | CR-13 | 5 | Inventive |
| 125 | | | LA31 | 1.2 | CR-13 | 5 | Inventive |
| 126 | | | | | | | Inventive |
| 127 | | | | | | | Inventive |
| 128 | | | | | | | Inventive |
| 129 | | | | | | | Inventive |
| 130 | | | | | | | Inventive |

TABLE 5

| | Plasticizer | | UV absorbent | | Colorant | | |
|---|---|---|---|---|---|---|---|
| | Kind | Adding amount (Parts by weight) | Kind | Adding amount (Parts by weight) | Kind | Adding amount (ppm) | |
| 131 | | | | | | | Inventive |
| 132 | | | | | | | Inventive |
| 133 | | | | | | | Inventive |
| 134 | | | | | | | Inventive |
| 135 | TMPTB | 8 | | | | | Inventive |
| 136 | GTB | 8 | | | | | Inventive |
| 137 | | | | | | | Inventive |
| 138 | | | LA31 | 1.2 | | | Inventive |
| 139 | | | T928 | 1.5 | | | Inventive |
| 140 | | | S250 | 3.2 | | | Inventive |
| 141 | | | T900 | 1.5 | | | Inventive |
| 142 | | | LA31 | 1.2 | | | Inventive |
| 143 | | | | | | | Inventive |
| 144 | | | | | | | Inventive |
| 145 | | | | | CR-18 | 10 | Inventive |
| 146 | | | | | CR-18 | 5 | Inventive |
| 147 | | | | | CR-13 | 5 | Inventive |
| 148 | | | LA31 | 1.2 | | | Inventive |
| 149 | | | LA31 | 1.2 | CR-18 | 5 | Inventive |
| 150 | | | LA31 | 1.2 | | | Inventive |
| 151 | | | LA31 | 1.2 | CR-18 | 5 | Inventive |
| 152 | | | S250 | 3.2 | CR-18 | 5 | Inventive |
| 153 | | | T900 | 1.5 | CR-18 | 5 | Inventive |
| 154 | TMPTB | 12 | | | | | Comparative |
| 155 | GTB | 8 | | | | | Comparative |
| 156 | TMPTB | 4 | | | | | Comparative |

<YI Value of Coloring Index>

YI (yellow index) prescribed in JIS K 7103 of the film was measured by U-3200, manufactured by Hitachi Ltd., and calculated according to the following formula $$YI = (1.28X - 1.06Z)/Y$$

In the above, X, Y and Z are tristimulus values of the light source color prescribed in JIS Z 879.

<Transparency>

The transparency of each of the films was evaluated by the haze thereof. The haze of each of the samples was measured by a haze meter (1001DP manufactured by Nippon Denshoku Industries Co., Ltd.) and expressed in terms of the value of a film of 80 μm.

The haze values were classified into the following ranks.

A: Less than 0.5%
B: 0.5 to less than 1.0%
C: 1.0 to less than 1.5%
D: 1.5 to less than 2.0%
E: Not less than 2.0%

<Fluctuation of Retardation $R_{th}$>

The fluctuation of the retardation $R_{th}$ was expressed by the variation coefficient CV of retardation values measured at an interval of 1 cm on the width direction on the film. Automatic three-dimensional double refractive measurement was carried out at 23° C., 55% RH and a wavelength of 590 nm using an automatic double refractometer KOBURA-21ADH, manufactured by Oji Scientific Instruments, at an interval of 1 cm along the width direction of the film.

The standard deviation of the values of the in-face and thickness direction was determined by (n-1) method. The variation coefficient shown below was calculated as the index of the distribution of the retardation. At the actual measurement, n was set at 130.

Variation coefficient (CV)=
Standard variation/Average retardation

A: Fluctuation (CV) was less than 1.5%
B: Fluctuation (CV) was 1.5% to less than 5%
C: Fluctuation (CV) was 5% to less than 10%
D: Fluctuation (CV) was not less than 10%

<Variation of Retardation Depending on Temperature Variations>

The retardation values of each of the films measured at the following various temperatures were measured and the variation of them was determined as $R_{th}(a)$.

The sample was conditioned at 23° C. and 20% RH for 5 hours and the $R_{th}$ value was measured under the same condition; the value was referred to as $R_{th}(b)$, and the same sample was further conditioned at 23° C. and 80% RH for 5 hours and the $R_{th}$ value was measured under the same condition; the value was referred to as $R_{th}(c)$. The $R_{th}(a)$ was determined by the following formula.

$$R_{th}(a)=[R_{th}(b)-R_{th}(c)]$$

After that the conditioned sample was subjected to measurement at 23° C. and 20% RH for confirming that the above variation was reversible.

It is understood from Table 6 that the polarization plate protection films 101 to 153 each containing the compound having the furanose structure and the pyranose structure and the acryl type polymer according to the invention are improved at the same time in the index of coloring of YI value, the unevenness of retardation in the width direction and the variation of the retardation value depending on the variation of the humidity.

Example 2

<Preparation of Polarization Plate and Evaluation>

The above-prepared polarization protection films 101 to 156 were subjected to the following alkali saponifying treatment to prepare polarization plates. Then the polarization plates were each built-in the liquid crystal display, and the contrast and the viewing angle of the display were evaluated.

<<Alkali Saponifying Treatment>>

| Saponifying process | 2M-NaOH | 50° C. | 90 seconds |
| Washing process | Water | 30° C. | 45 seconds |
| Neutralizing process 10 weight-percent | HCl | 30° C. | 45 seconds |
| Washing Process | Water | 30° C. | 45 seconds |

The treatments were carried out in the order of the saponification, washing, neutralization and washing and then drying at 80° C. was performed.

<<Preparation of Polarization Plates P101 to P156>>

Long polyvinyl alcohol film having a thickness of 180 μm was immersed in 100 parts by weight of aqueous solution containing 1 part by weight of iodine and 4 parts by weight of boric acid and stretched for 5 times in the transferring direction at 50° C. to prepare a polarization layer. Each of the alkali saponified polarization protection films 101 to 156 was pasted on one side of the above polarization layer using a 5% aqueous solution of completely saponified poly(vinyl alcohol), and alkali saponified KC8UX, manufactured by Konica Minolta Opt Inc., was pasted the same manner on the other side of the polarization layer and then dried to prepare polarization plates P101 to P156.

<<Preparation of Liquid Crystal Display>>

The polarization plate on the viewing side of a VA type liquid crystal display of 15-type Display VL-150SD, manufactured by Fujitsu Ltd., was peeled off and each of the above prepared polarization plates P101 to P156 was pasted on the glass surface of the liquid crystal cell (AV type) to prepare liquid crystal displays 101 to 156. The polarization plate was pasted so that the absorption axis of the polarization plate is agreed with that of the previously pasted polarization plate.

<Contrast Unevenness of Front View>

The back light of each of the displays was continuously turned on for 1 week at 23° C. and 55% RH and then measurement was carried out. The luminance of the white image and that of black image displayed on the display were measured from the normal line direction of the displaying face by EZ-Contrast 160D, manufactured by ELDIM Co., and the ratio of them is defined as the front view contrast.

Front view contrast=(Luminance of white image measured from the normal line direction of the display)/(Luminance of black image measured from the normal line direction of the display)

The front view contrast was measured at optional five points on the liquid crystal and evaluated according to the following norms.

A: The fluctuation of the front view contrast was 0 to less than 5% and the unevenness was small.

B: The fluctuation of the front view contrast was 5 to less than 10% and some degree of unevenness was observed.

C: The fluctuation of the front view contrast was 10% or more and unevenness was large.

<Variation of Viewing Field Angle>

It was visually evaluated that the viewing field angle of the display was varied or not depending on the humidity condition. The display was evaluated after standing for 5 hours under the condition of 23° C. and 20% RH, 23° C. and 55% RH or 23° C. and 80% RH. The evaluation was carried out according to the following norms.

A: Variation of the viewing field angle was not observed.

B: Variation of the viewing field angle causes no problem in the practical use.

C: Some degree of the variation of viewing field angle was observed.

D: Variation of the viewing field angle was observed.

Results of the evaluation are listed in Table 6

TABLE 6

| | YI value | Fluctuation of $R_{th}$ | Rth (a) | Transparency | Contrast unevenness | Viewing field angle variation | |
|---|---|---|---|---|---|---|---|
| 101 | 4.4 | B | 17 | B | A | B | Inv. |
| 102 | 4.4 | B | 17 | B | A | B | Inv. |
| 103 | 4.5 | A | 15 | B | A | B | Inv. |
| 104 | 4.3 | B | 18 | B | A | B | Inv. |
| 105 | 4.4 | B | 17 | B | A | B | Inv. |
| 106 | 4.5 | A | 15 | B | A | B | Inv. |
| 107 | 4.4 | B | 17 | B | A | B | Inv. |
| 108 | 4.4 | A | 17 | B | A | B | Inv. |
| 109 | 4.3 | B | 16 | B | A | B | Inv. |
| 110 | 4.2 | B | 15 | B | A | B | Inv. |
| 111 | 4.3 | B | 16 | B | A | B | Inv. |
| 112 | 4.4 | B | 17 | B | A | B | Inv. |
| 113 | 4.5 | B | 16 | B | A | B | Inv. |
| 114 | 4.6 | A | 15 | B | A | B | Inv. |
| 115 | 4.4 | B | 17 | B | A | B | Inv. |
| 116 | 4.3 | C | 14 | B | A | B | Inv. |
| 117 | 4.9 | B | 18 | B | A | B | Inv. |
| 118 | 4.6 | B | 15 | B | A | B | Inv. |
| 119 | 4.9 | A | 15 | B | A | B | Inv. |
| 120 | 4.9 | B | 17 | B | A | B | Inv. |
| 121 | 4.8 | B | 18 | B | A | B | Inv. |
| 122 | 4.2 | B | 17 | B | A | B | Inv. |
| 123 | 3.7 | B | 12 | B | A | B | Inv. |
| 124 | 4.1 | B | 14 | B | A | B | Inv. |
| 125 | 4.3 | B | 16 | B | A | B | Inv. |
| 126 | 4.3 | B | 15 | B | A | B | Inv. |
| 127 | 4.4 | B | 16 | B | A | B | Inv. |
| 128 | 3.8 | A | 9 | A | A | A | Inv. |
| 129 | 4.0 | B | 10 | A | A | A | Inv. |
| 130 | 4.1 | B | 10 | B | A | A | Inv. |
| 131 | 3.8 | A | 9 | A | A | A | Inv. |
| 132 | 3.9 | B | 10 | B | A | A | Inv. |
| 133 | 4.0 | B | 10 | B | A | A | Inv. |
| 134 | 3.7 | A | 14 | A | A | B | Inv. |
| 135 | 3.9 | B | 15 | A | A | B | Inv. |
| 136 | 4.0 | B | 15 | B | A | B | Inv. |
| 137 | 3.6 | B | 6 | A | A | A | Inv. |
| 138 | 3.0 | A | 7 | A | A | A | Inv. |
| 139 | 3.2 | B | 6 | A | A | A | Inv. |
| 140 | 3.3 | A | 7 | A | A | A | Inv. |
| 141 | 3.2 | B | 6 | A | A | A | Inv. |

TABLE 6-continued

| | YI value | Fluctuation of $R_{th}$ | Rth (a) | Trans-parency | Contrast unevenness | Viewing field angle variation | |
|---|---|---|---|---|---|---|---|
| 142 | 3.0 | A | 5 | A | A | A | Inv. |
| 143 | 3.8 | B | 8 | A | A | A | Inv. |
| 144 | 4.1 | B | 10 | A | A | A | Inv. |
| 145 | 3.3 | B | 14 | B | A | B | Inv. |
| 146 | 3.7 | B | 15 | B | A | B | Inv. |
| 147 | 3.5 | B | 15 | B | A | B | Inv. |
| 148 | 3.1 | B | 7 | A | A | A | Inv. |
| 149 | 3.2 | B | 6 | A | A | A | Inv. |
| 150 | 3.1 | A | 7 | A | A | A | Inv. |
| 151 | 3.0 | A | 8 | A | A | A | Inv. |
| 152 | 3.0 | A | 7 | A | A | A | Inv. |
| 153 | 3.0 | B | 7 | A | A | A | Inv. |
| 154 | 13.6 | D | 35 | E | C | D | Comp. |
| 155 | 9.6 | D | 30 | D | B | C | Comp. |
| 156 | 8.9 | D | 25 | D | A | C | Comp. |

Inv.: Inventive,
Comp.: Comparative

It was confirmed that the displays 101 to 153 according to the invention shows the front view contrast without unevenness and excellent stable displaying ability without the viewing field angle variation depending on the humidity condition compared with the comparative liquid crystal displays 154 through 156.

The invention claimed is:

1. A method of preparing an optical film comprising steps of preparing a mixture of components, preparing a film by melt-cast method, and drying the film, wherein the component comprises;

a cellulose ester, a sugar ester compound formed by esterification of a sugar compound composed of 1 to 12 structures selected from a furanose structure and a pyranose structure, an acryl resin, and an anti-oxidant, wherein an amount of the sugar ester compound is 0.5 to 35% by weight of the cellulose ester, and the anti-oxidant is a compound having partial structure represented by one of Formulas C-1, C-2, C-3, C-4 and C-5 in a molecule,

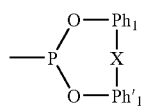

Formula C-1 wherein, $Ph_1$ and $Ph'_1$ are independently a phenylene group which may be substituted by a phenyl group, an alkyl group having 1 to 8 carbon atoms, a cycloalkyl group having 5 to 8 carbon atoms, an alkylcycloalkyl group having 6 to 12 or an aralkyl group having 7 to 12 carbon atom, and X is a single bond, a sulfur atom or a —$CHR_6$— group, $R_6$ is a hydrogen atom, an alkyl group having 1 to 8 carbon atoms, or a cycloalkyl group having 5 to 8 carbon atoms,

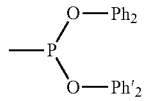

Formula C-2 wherein, $Ph_2$ and $Ph'_2$ are independently a phenyl group or a biphenyl group each of which may be substituted by an alkyl group having 1 to 8 carbon atoms, a cycloalkyl group having 5 to 8, an alkylcycloalkyl group having 6 to 12 carbon atoms or an aralkyl having 7 to 12 carbon atoms,

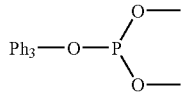

Formula C-3 wherein $Ph_3$ is a phenyl group or a biphenyl group each of which may be substituted by an alkyl group having 1 to 8 carbon atoms, a cycloalkyl group having 5 to 8, an alkylcycloalkyl group having 6 to 12 carbon atoms or an aralkyl having 7 to 12 carbon atoms,

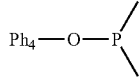

Formula C-4 wherein $Ph_4$ is an alkyl group having 1 to 20 carbon atoms or a phenyl group each of which may be substituted by an alkyl group having 1 to 8 carbon atoms, a cycloalkyl group having 5 to 8, an alkylcycloalkyl group having 6 to 12 carbon atoms or an aralkyl having 7 to 12 carbon atoms, and

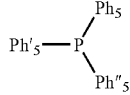

Formula C-5 wherein $Ph_5$, $Ph'_5$ and $Ph''_5$ are each an alkyl group having 1 to 20 carbon atoms or a phenyl group each of which may be substituted by an alkyl group having 1 to 8 carbon atoms, a cycloalkyl group having 5 to 8, an alkylcycloalkyl group having 6 to 12 carbon atoms or an aralkyl having 7 to 12 carbon atoms.

2. The method of claim 1, wherein the acryl resin has a weight average molecular weight of 500 to 70,000.

3. The method of claim 1, wherein an amount of the acryl resin is 0.5 to 35% by weight of the cellulose ester.

4. The method of claim 3, wherein an amount of the acryl resin is 1 to 30% by weight of the cellulose ester.

5. The method of claim 1, wherein the cellulose ester satisfies conditions A1 and A2 simultaneously;

$$2.0 \leq X+Y \leq 3.0 \quad \text{A1}$$

$$0.3 \leq Y \leq 3.0 \quad \text{A2}$$

wherein X is a substitution degree of acetyl group and Y is that of propionyl group or butyryl group.

6. The method of claim 1, wherein the sugar compound is composed both of a furanose structure and a pyranose structure.

7. The method of claim 1, wherein the sugar ester compound is sucrose.

8. The method of claim 1, wherein the anti-oxidant is a hindered amine compound.

9. The method of claim 1, wherein the component further comprises a colorant.

10. The method of claim 9, wherein the colorant is an anthraquinone dye, an azo dye or a phthalocyanine pigment.

11. The method of claim 1, wherein the method comprises steps of making pellets of the component and the pelletized component is melt and cast.

12. The method of claim 1, wherein the method comprises step of stretching a cast resin.

13. The method of claim 12, wherein the stretching is biaxial stretching.

14. The method of claim 13, wherein a stretching degree is from 1.0 to 2.0 times in casting direction and 1.01 to 2.5 times in width direction.

* * * * *